(12) United States Patent
McCann et al.

(10) Patent No.: US 10,997,562 B2
(45) Date of Patent: May 4, 2021

(54) SYNCHRONIZED CONVERSATION-CENTRIC MESSAGE LIST AND MESSAGE READING PANE

(71) Applicant: Microsoft Technology Licensing, LLC, Redmond, WA (US)

(72) Inventors: Robert Emmett McCann, Seattle, WA (US); Michael Anthony Affronti, Seattle, WA (US); Andrew Russell Brauninger, Seattle, WA (US); Jorge Pereira, Seattle, WA (US); James J. Edelen, IV, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 15/605,004

(22) Filed: May 25, 2017

(65) Prior Publication Data

US 2017/0262810 A1     Sep. 14, 2017

Related U.S. Application Data

(63) Continuation of application No. 12/142,927, filed on Jun. 20, 2008, now Pat. No. 9,665,850.

(51) Int. Cl.
*G06Q 10/10* (2012.01)

(52) U.S. Cl.
CPC .................. *G06Q 10/107* (2013.01)

(58) Field of Classification Search
CPC .. G06F 3/0482; G06F 3/0481; G06F 3/04842; G06F 2203/04803;

(Continued)

(56) References Cited

U.S. PATENT DOCUMENTS

| 3,946,911 A | 3/1976 | Morane et al. |
| RE31,515 E | 2/1984 | Heldt |

(Continued)

FOREIGN PATENT DOCUMENTS

| AU | 2005203411 | 3/2006 |
| AU | 2006284908 B2 | 3/2011 |

(Continued)

OTHER PUBLICATIONS

US 9,658,743 B2, 05/2017, Satterfield et al. (withdrawn)

(Continued)

*Primary Examiner* — Di Xiao

(57) ABSTRACT

Technologies are described herein for a user interface uniting two primary components, a list view and a reading pane, within a message reading application. Technologies are also described for synchronizing status and parameters between the two primary user interface components. In particular, a user interface for reading messages can represent all components of a conversation with both a list view for presenting a message map, and a reading pane for presenting a content view. The list view can present a list of messages grouped by conversation. The reading pane window can contain smaller windows or frames. Each of the smaller windows or frames can contain a message within a given conversation. Synchronization provided between the list view and a reading pane can allow message selection in one of the user interface components to cause display and selection of the corresponding message in the other user interface component.

20 Claims, 5 Drawing Sheets

(58) Field of Classification Search
CPC ............ G06F 3/04845; G06F 3/04817; G06F 3/04847; G06F 3/0488; G06F 3/04883; G06F 3/04886; G06F 9/451; G06F 17/2247; G06F 3/1454; G06F 16/2282; G06F 17/246; G06F 3/04815; G06F 3/0486; G06F 16/93; G06F 17/212; G06F 17/245; G06F 2203/04806; G06F 16/2228; G06F 16/248; G06F 17/24; G06F 17/2705; G06F 3/017; G06F 3/14; G06F 7/544; G06F 16/951; G06F 17/2235; G06F 2203/04105; G06F 3/03547

See application file for complete search history.

(56) References Cited

U.S. PATENT DOCUMENTS

| | | |
|---|---|---|
| 4,815,029 A | 3/1989 | Barker et al. |
| 4,823,283 A | 4/1989 | Diehm et al. |
| 5,023,907 A | 6/1991 | Johnson et al. |
| 5,057,836 A | 10/1991 | Inaba |
| 5,129,057 A | 7/1992 | Strope et al. |
| 5,134,915 A | 8/1992 | Fukano et al. |
| 5,155,806 A | 10/1992 | Hoeber et al. |
| 5,204,897 A | 4/1993 | Wyman |
| 5,220,675 A | 6/1993 | Pawader et al. |
| 5,243,697 A | 9/1993 | Hoeber et al. |
| 5,247,438 A | 9/1993 | Subas et al. |
| 5,305,435 A | 4/1994 | Bronson |
| 5,307,086 A | 4/1994 | Griffin et al. |
| 5,323,314 A | 6/1994 | Baber et al. |
| 5,377,354 A | 12/1994 | Scannell et al. |
| 5,412,772 A | 5/1995 | Monson |
| 5,414,809 A | 5/1995 | Hogan et al. |
| 5,457,476 A | 10/1995 | Jenson |
| 5,461,708 A | 10/1995 | Kahn |
| 5,475,805 A | 12/1995 | Murata |
| 5,500,936 A | 3/1996 | Allen et al. |
| 5,502,805 A | 3/1996 | Anderson et al. |
| 5,519,606 A | 5/1996 | Frid-Nielsen et al. |
| 5,533,184 A | 7/1996 | Malcolm |
| 5,559,875 A | 9/1996 | Bieselin et al. |
| 5,559,944 A | 9/1996 | Ono |
| 5,570,109 A | 10/1996 | Jenson |
| 5,581,677 A | 12/1996 | Myers et al. |
| 5,588,107 A | 12/1996 | Bowdon et al. |
| 5,592,602 A | 1/1997 | Edmunds |
| 5,596,694 A | 1/1997 | Capps |
| 5,598,557 A | 1/1997 | Doner et al. |
| 5,625,783 A | 4/1997 | Ezekiel et al. |
| 5,634,100 A | 5/1997 | Capps |
| 5,634,128 A | 5/1997 | Messina |
| 5,638,504 A | 6/1997 | Scott et al. |
| 5,644,737 A | 7/1997 | Tuniman et al. |
| 5,659,693 A | 8/1997 | Hansen et al. |
| 5,664,127 A | 9/1997 | Anderson et al. |
| 5,664,208 A | 9/1997 | Pavley et al. |
| 5,671,412 A | 9/1997 | Christiano |
| 5,673,403 A | 9/1997 | Brown et al. |
| 5,694,610 A | 12/1997 | Habib et al. |
| 5,721,847 A | 2/1998 | Johnson |
| 5,734,915 A | 3/1998 | Roewer |
| 5,751,373 A | 5/1998 | Ohyama et al. |
| 5,760,768 A | 6/1998 | Gram |
| 5,760,773 A | 6/1998 | Berman et al. |
| 5,761,646 A | 6/1998 | Frid-Nielsen et al. |
| 5,764,960 A | 6/1998 | Perks et al. |
| 5,778,402 A | 7/1998 | Gipson |
| 5,778,404 A | 7/1998 | Capps et al. |
| 5,787,295 A | 7/1998 | Nakao |
| 5,793,365 A | 8/1998 | Tang et al. |
| 5,796,393 A | 8/1998 | MacNaughton et al. |
| 5,805,167 A | 9/1998 | van Cruyningen |
| 5,812,132 A | 9/1998 | Goldstein |
| 5,821,936 A | 10/1998 | Shaffer et al. |
| 5,828,367 A | 10/1998 | Kuga |
| 5,828,376 A | 10/1998 | Solimene et al. |
| 5,838,321 A | 11/1998 | Wolf |
| 5,842,009 A | 11/1998 | Borovoy et al. |
| 5,844,558 A | 12/1998 | Kumar et al. |
| 5,844,572 A | 12/1998 | Schott |
| 5,844,588 A | 12/1998 | Anderson |
| 5,850,561 A | 12/1998 | Church |
| 5,851,644 A | 12/1998 | McArdle et al. |
| 5,855,006 A | 12/1998 | Huemoeller et al. |
| 5,864,848 A | 1/1999 | Horvitz et al. |
| 5,872,973 A | 2/1999 | Mitchell et al. |
| 5,873,108 A | 2/1999 | Goyal et al. |
| 5,874,953 A | 2/1999 | Webster et al. |
| 5,874,956 A | 2/1999 | LaHood et al. |
| 5,884,572 A | 3/1999 | Kawaguchi |
| 5,885,006 A | 3/1999 | Sheedy |
| 5,893,073 A | 4/1999 | Kasso et al. |
| 5,893,125 A | 4/1999 | Shostak |
| 5,895,476 A | 4/1999 | Orr et al. |
| 5,898,436 A | 4/1999 | Stewart et al. |
| 5,899,979 A | 5/1999 | Miller et al. |
| 5,903,902 A | 5/1999 | Orr et al. |
| 5,905,863 A | 5/1999 | Knowles et al. |
| 5,910,895 A | 6/1999 | Proskauer et al. |
| 5,914,714 A | 6/1999 | Brown |
| 5,917,489 A | 6/1999 | Thurlow et al. |
| 5,924,089 A | 7/1999 | Mocek et al. |
| 5,926,806 A | 7/1999 | Marshall et al. |
| 5,936,625 A | 8/1999 | Kahl et al. |
| 5,937,160 A | 8/1999 | Davis et al. |
| 5,940,078 A | 8/1999 | Nagarajayya et al. |
| 5,940,847 A | 8/1999 | Fein et al. |
| 5,943,051 A | 8/1999 | Onda et al. |
| 5,956,737 A | 9/1999 | King et al. |
| 5,960,406 A | 9/1999 | Rasansky et al. |
| 5,963,938 A | 10/1999 | Wilson |
| 5,970,466 A | 10/1999 | Detjen et al. |
| 5,999,173 A | 12/1999 | Ubillos |
| 5,999,730 A | 12/1999 | Lewis |
| 5,999,938 A | 12/1999 | Bliss et al. |
| 6,002,395 A | 12/1999 | Wagner et al. |
| 6,008,806 A | 12/1999 | Nakajima et al. |
| 6,012,075 A | 1/2000 | Fein et al. |
| 6,016,478 A | 1/2000 | Zhang et al. |
| 6,018,343 A | 1/2000 | Wang et al. |
| 6,034,683 A | 3/2000 | Mansour et al. |
| 6,038,395 A | 3/2000 | Chow et al. |
| 6,038,542 A | 3/2000 | Ruckdashel |
| 6,043,816 A | 3/2000 | Williams et al. |
| 6,057,836 A | 5/2000 | Kavalam et al. |
| 6,065,026 A | 5/2000 | Cornelia et al. |
| 6,067,087 A | 5/2000 | Krauss et al. |
| 6,067,551 A | 5/2000 | Brown et al. |
| 6,072,492 A | 6/2000 | Schagen et al. |
| 6,073,110 A | 6/2000 | Rhodes et al. |
| 6,073,142 A | 6/2000 | Geiger |
| 6,085,206 A | 7/2000 | Domini et al. |
| 6,088,707 A | 7/2000 | Bates et al. |
| 6,092,103 A | 7/2000 | Pritsch |
| 6,101,480 A | 8/2000 | Conmy et al. |
| 6,107,869 A | 8/2000 | Horiguchi et al. |
| 6,115,777 A | 9/2000 | Zahir et al. |
| 6,122,075 A | 9/2000 | Yamada et al. |
| 6,133,915 A | 10/2000 | Arcuri et al. |
| 6,137,488 A | 10/2000 | Kraft |
| 6,154,740 A | 11/2000 | Shah |
| 6,154,755 A | 11/2000 | Dellert et al. |
| 6,160,554 A | 12/2000 | Krause |
| 6,175,363 B1 | 1/2001 | Williams et al. |
| 6,188,401 B1 | 2/2001 | Peyer |
| 6,188,403 B1 | 2/2001 | Sacerdoti et al. |
| 6,189,024 B1 | 2/2001 | Bauersfeld et al. |
| 6,189,146 B1 | 2/2001 | Misra et al. |
| 6,192,381 B1 | 2/2001 | Stiegmeier et al. |
| 6,195,094 B1 | 2/2001 | Celebiler |
| 6,199,102 B1 | 3/2001 | Cobb |
| 6,211,879 B1 | 4/2001 | Soohoo |

(56) References Cited

U.S. PATENT DOCUMENTS

| | | |
|---|---|---|
| 6,216,122 B1 | 4/2001 | Elson |
| 6,219,670 B1 | 4/2001 | Mocek et al. |
| 6,222,540 B1 | 4/2001 | Sacerdoti et al. |
| 6,230,173 B1 | 5/2001 | Ferrel et al. |
| 6,230,309 B1 | 5/2001 | Turner et al. |
| 6,232,971 B1 | 5/2001 | Haynes |
| 6,236,396 B1 | 5/2001 | Jenson et al. |
| 6,237,135 B1 | 5/2001 | Timbol |
| 6,239,798 B1 | 5/2001 | Ludolph et al. |
| 6,256,628 B1 | 7/2001 | Dobson et al. |
| 6,269,341 B1 | 7/2001 | Redcay, Jr. |
| 6,272,488 B1 | 8/2001 | Chang et al. |
| 6,278,450 B1 | 8/2001 | Arcuri et al. |
| 6,289,317 B1 | 9/2001 | Peterson |
| 6,307,544 B1 | 10/2001 | Harding |
| 6,307,574 B1 | 10/2001 | Ashe |
| 6,311,194 B1 | 10/2001 | Sheth et al. |
| 6,311,195 B1 | 10/2001 | Hachiya et al. |
| 6,313,854 B1 | 11/2001 | Gibson |
| 6,323,883 B1 | 11/2001 | Minoura et al. |
| 6,326,962 B1 | 12/2001 | Szabo |
| 6,327,046 B1 | 12/2001 | Miyamoto et al. |
| 6,330,577 B1 | 12/2001 | Kim |
| 6,330,578 B1 | 12/2001 | Savin et al. |
| 6,330,589 B1 | 12/2001 | Kennedy |
| 6,341,277 B1 | 1/2002 | Coden et al. |
| 6,342,901 B1 | 1/2002 | Adler et al. |
| 6,353,451 B1 | 3/2002 | Teibel et al. |
| 6,356,893 B1 | 3/2002 | Itakura et al. |
| 6,359,634 B1 | 3/2002 | Cragun et al. |
| 6,369,840 B1 | 4/2002 | Barnett et al. |
| 6,373,507 B1 | 4/2002 | Camara et al. |
| 6,374,304 B1 | 4/2002 | Chiasi |
| 6,381,740 B1 | 4/2002 | Miller et al. |
| 6,384,849 B1 | 5/2002 | Morcos et al. |
| 6,385,769 B1 | 5/2002 | Lewallen et al. |
| 6,405,216 B1 | 6/2002 | Minnaert et al. |
| 6,424,829 B1 | 7/2002 | Kraft |
| 6,429,882 B1 | 8/2002 | Abdelnur et al. |
| 6,430,563 B1 | 8/2002 | Fritz et al. |
| 6,433,801 B1 | 8/2002 | Moon et al. |
| 6,433,831 B1 | 8/2002 | Dinwiddie et al. |
| 6,434,598 B1 | 8/2002 | Gish |
| 6,442,527 B1 | 8/2002 | Worthington |
| 6,446,118 B1 | 9/2002 | Gottleib |
| 6,456,304 B1 | 9/2002 | Angiulo et al. |
| 6,457,062 B1 | 9/2002 | Pivowar et al. |
| 6,459,441 B1 | 10/2002 | Perroux et al. |
| 6,466,236 B1 | 10/2002 | Pivowar et al. |
| 6,466,240 B1 * | 10/2002 | Maslov ............... G06F 8/34 715/234 |
| 6,469,722 B1 | 10/2002 | Kineo et al. |
| 6,469,723 B1 | 10/2002 | Gould |
| 6,476,828 B1 | 11/2002 | Burkett et al. |
| 6,480,865 B1 | 11/2002 | Lee et al. |
| 6,483,624 B1 | 11/2002 | Otani et al. |
| 6,484,180 B1 | 11/2002 | Lyons et al. |
| 6,493,006 B1 | 12/2002 | Gourdol et al. |
| 6,493,007 B1 | 12/2002 | Pang |
| 6,493,731 B1 | 12/2002 | Jones et al. |
| 6,507,845 B1 | 1/2003 | Cohen et al. |
| 6,529,918 B2 | 3/2003 | Takahashi |
| 6,546,417 B1 | 4/2003 | Baker |
| 6,564,377 B1 | 5/2003 | Jayasimha et al. |
| 6,567,509 B1 | 5/2003 | Gusler et al. |
| 6,567,846 B1 | 5/2003 | Garg et al. |
| 6,570,596 B2 | 5/2003 | Frederiksen |
| 6,570,890 B1 | 5/2003 | Keenan et al. |
| 6,578,192 B1 | 6/2003 | Boehme et al. |
| 6,583,798 B1 | 6/2003 | Hoek et al. |
| 6,584,501 B1 | 6/2003 | Cartsonis et al. |
| 6,584,504 B1 | 6/2003 | Choe |
| 6,587,118 B1 | 7/2003 | Yoneda |
| 6,603,493 B1 | 8/2003 | Lovell et al. |
| 6,618,732 B1 | 9/2003 | White et al. |
| 6,621,504 B1 | 9/2003 | Nadas et al. |
| 6,621,508 B1 | 9/2003 | Shiraishi et al. |
| 6,624,831 B1 | 9/2003 | Shahine et al. |
| 6,633,867 B1 | 10/2003 | Kraft et al. |
| 6,635,089 B1 | 10/2003 | Burkett et al. |
| 6,639,611 B1 | 10/2003 | Leduc |
| 6,654,791 B1 | 11/2003 | Bates et al. |
| 6,664,983 B2 | 12/2003 | Ludolph |
| 6,680,749 B1 | 1/2004 | Anderson et al. |
| 6,686,938 B1 | 2/2004 | Jobs et al. |
| 6,691,281 B1 | 2/2004 | Sorge et al. |
| 6,701,513 B1 | 3/2004 | Bailey |
| 6,707,454 B1 | 3/2004 | Barg |
| 6,707,476 B1 | 3/2004 | Hochstedler |
| 6,708,205 B2 | 3/2004 | Sheldon et al. |
| 6,721,402 B2 | 4/2004 | Usami |
| 6,725,228 B1 | 4/2004 | Clark et al. |
| 6,727,919 B1 | 4/2004 | Reder et al. |
| 6,732,330 B1 | 5/2004 | Claussen et al. |
| 6,734,880 B2 | 5/2004 | Chang et al. |
| 6,750,850 B2 | 6/2004 | O'Leary |
| 6,750,890 B1 | 6/2004 | Sugimoto |
| 6,753,887 B2 | 6/2004 | Carolan et al. |
| 6,778,990 B2 | 8/2004 | Garcia et al. |
| 6,785,866 B1 | 8/2004 | Lewis et al. |
| 6,785,868 B1 | 8/2004 | Raff |
| 6,789,107 B1 | 9/2004 | Bates et al. |
| 6,799,095 B1 | 9/2004 | Owen et al. |
| 6,816,904 B1 | 11/2004 | Ludwig et al. |
| 6,825,859 B1 | 11/2004 | Severenuk et al. |
| 6,826,727 B1 | 11/2004 | Mohr et al. |
| 6,826,729 B1 | 11/2004 | Giesen et al. |
| 6,832,244 B1 | 12/2004 | Raghunandan |
| 6,847,989 B1 | 1/2005 | Chastain et al. |
| 6,850,255 B2 | 2/2005 | Muschetto |
| 6,857,103 B1 | 2/2005 | Wason |
| 6,871,195 B2 | 3/2005 | Ryan et al. |
| 6,882,353 B2 | 4/2005 | Nettles et al. |
| 6,882,354 B1 | 4/2005 | Nielsen |
| 6,892,193 B2 | 5/2005 | Bolle et al. |
| 6,892,196 B1 | 5/2005 | Hughes |
| 6,895,426 B1 | 5/2005 | Cortright et al. |
| 6,904,449 B1 | 6/2005 | Quinones |
| 6,906,717 B2 | 6/2005 | Couckuyt et al. |
| 6,907,423 B2 | 6/2005 | Weil et al. |
| 6,915,492 B2 | 7/2005 | Kurtenbach et al. |
| 6,924,797 B1 | 8/2005 | MacPhail |
| 6,925,605 B2 | 8/2005 | Bates et al. |
| 6,928,610 B2 | 8/2005 | Brintzenhofe et al. |
| 6,928,613 B1 | 8/2005 | Ishii |
| 6,931,623 B2 | 8/2005 | Vermeire et al. |
| 6,934,740 B1 | 8/2005 | Lawande et al. |
| 6,941,304 B2 | 9/2005 | Gainey |
| 6,956,429 B1 | 10/2005 | Elbanhawy |
| 6,964,025 B2 | 11/2005 | Angiulo et al. |
| 6,981,209 B1 | 12/2005 | Parikh et al. |
| 6,983,889 B2 | 1/2006 | Alles |
| 6,988,241 B1 | 1/2006 | Guttman et al. |
| 6,990,637 B2 | 1/2006 | Anthony et al. |
| 6,990,652 B1 | 1/2006 | Parthasarathy et al. |
| 6,990,654 B2 | 1/2006 | Carroll, Jr. |
| 6,993,711 B1 | 1/2006 | Tanaka et al. |
| 7,016,864 B1 | 3/2006 | Notz et al. |
| 7,027,463 B2 | 4/2006 | Mathew et al. |
| 7,032,210 B2 | 4/2006 | Alloing et al. |
| 7,039,596 B1 | 5/2006 | Lu |
| 7,039,863 B1 | 5/2006 | Caro et al. |
| 7,044,363 B2 | 5/2006 | Silverbrook et al. |
| 7,046,848 B1 | 5/2006 | Olcott |
| 7,051,276 B1 | 5/2006 | Mogilevsky et al. |
| 7,069,538 B1 | 6/2006 | Renshaw |
| 7,085,757 B2 | 8/2006 | Dettinger |
| 7,085,999 B2 | 8/2006 | Maeda et al. |
| 7,086,006 B2 | 8/2006 | Subramanian et al. |
| 7,093,162 B2 | 8/2006 | Barga et al. |
| 7,096,218 B2 | 8/2006 | Schirmer et al. |
| 7,103,849 B2 | 9/2006 | Aikawa |
| 7,107,525 B2 | 9/2006 | Purvis |
| 7,107,544 B1 | 9/2006 | Luke |

(56) References Cited

U.S. PATENT DOCUMENTS

| | | | |
|---|---|---|---|
| 7,110,936 B2 | 9/2006 | Hiew et al. | |
| 7,111,238 B1 | 9/2006 | Kuppusamy et al. | |
| 7,113,941 B2 | 9/2006 | Arend | |
| 7,117,370 B2 | 10/2006 | Khan et al. | |
| 7,117,436 B1 | 10/2006 | O'Rourke et al. | |
| 7,120,868 B2 | 10/2006 | Salesin et al. | |
| 7,134,095 B1 | 11/2006 | Smith et al. | |
| 7,149,983 B1 | 12/2006 | Robertson et al. | |
| 7,152,207 B1 | 12/2006 | Underwood et al. | |
| 7,174,361 B1 | 2/2007 | Paas | |
| 7,181,697 B2 | 2/2007 | Tai et al. | |
| 7,188,073 B1 | 3/2007 | Tam et al. | |
| 7,188,158 B1 | 3/2007 | Stanton et al. | |
| 7,188,317 B1 | 3/2007 | Hazel | |
| 7,200,636 B2 | 4/2007 | Harding | |
| 7,206,813 B2 | 4/2007 | Dunbar | |
| 7,206,814 B2 | 4/2007 | Kirsch | |
| 7,207,953 B1 | 4/2007 | Goicaj | |
| 7,212,208 B2 | 5/2007 | Khozai | |
| 7,216,301 B2 | 5/2007 | Moehrle | |
| 7,216,302 B2 | 5/2007 | Rodden et al. | |
| 7,218,976 B2 | 5/2007 | Minagawa | |
| 7,219,305 B2 | 5/2007 | Jennings | |
| 7,225,244 B2 | 5/2007 | Reynolds et al. | |
| 7,234,132 B2 | 6/2007 | Lam | |
| 7,240,323 B1 | 7/2007 | Desai et al. | |
| 7,246,311 B2 | 7/2007 | Bargeron et al. | |
| 7,249,325 B1 | 7/2007 | Donaldson | |
| 7,251,610 B2 | 7/2007 | Alban et al. | |
| 7,251,640 B2 | 7/2007 | Baumard | |
| 7,263,668 B1 | 8/2007 | Lentz | |
| 7,272,789 B2 | 9/2007 | O'Brien | |
| 7,277,572 B2 | 10/2007 | MacInnes et al. | |
| 7,281,245 B2 | 10/2007 | Reynar et al. | |
| 7,287,233 B2 | 10/2007 | Arend | |
| 7,290,033 B1 | 10/2007 | Goldman et al. | |
| 7,296,241 B2 | 11/2007 | Oshiro et al. | |
| 7,318,203 B2 | 1/2008 | Purves et al. | |
| 7,325,204 B2 | 1/2008 | Rogers | |
| 7,328,409 B2 | 2/2008 | Awada et al. | |
| 7,337,185 B2 | 2/2008 | Ellis et al. | |
| 7,346,705 B2 | 3/2008 | Hullot et al. | |
| 7,346,769 B2 | 3/2008 | Forlenza et al. | |
| 7,356,537 B2 | 4/2008 | Reynar et al. | |
| 7,356,772 B2 | 4/2008 | Brownholtz et al. | |
| 7,360,174 B2 | 4/2008 | Grossman et al. | |
| 7,362,311 B2 | 4/2008 | Filner et al. | |
| 7,370,282 B2 | 5/2008 | Cary | |
| 7,380,236 B2 | 5/2008 | Hawley | |
| 7,386,535 B1 | 6/2008 | Kalucha et al. | |
| 7,386,835 B1 | 6/2008 | Desai et al. | |
| 7,392,249 B1 | 6/2008 | Harris et al. | |
| 7,395,221 B2 | 7/2008 | Doss et al. | |
| 7,395,500 B2 | 7/2008 | Whittle et al. | |
| 7,395,540 B2 | 7/2008 | Rogers | |
| 7,421,660 B2 | 9/2008 | Charnock et al. | |
| 7,421,690 B2 | 9/2008 | Forstall et al. | |
| 7,426,713 B2 | 9/2008 | Duggan et al. | |
| 7,461,077 B1 | 12/2008 | Greenwood | |
| 7,464,343 B2 | 12/2008 | Shaw et al. | |
| 7,469,385 B2 | 12/2008 | Harper et al. | |
| 7,472,117 B2 | 12/2008 | Dettinger et al. | |
| 7,472,374 B1 | 12/2008 | Dillman et al. | |
| 7,484,213 B2 | 1/2009 | Mathew et al. | |
| 7,499,907 B2 | 3/2009 | Brown et al. | |
| 7,505,954 B2 | 3/2009 | Heidloff et al. | |
| 7,509,328 B2 | 3/2009 | Weiss et al. | |
| 7,516,186 B1 * | 4/2009 | Borghetti | G06Q 10/107 707/999.104 |
| 7,530,029 B2 | 5/2009 | Satterfield et al. | |
| 7,555,707 B1 | 6/2009 | Labarge et al. | |
| 7,565,403 B2 | 7/2009 | Horvitz et al. | |
| 7,567,964 B2 | 7/2009 | Brice et al. | |
| 7,584,253 B2 | 9/2009 | Curbow et al. | |
| 7,595,722 B2 | 9/2009 | Heimermann et al. | |
| 7,610,575 B2 | 10/2009 | Sproule | |
| 7,624,339 B1 | 11/2009 | Engel et al. | |
| 7,627,561 B2 | 12/2009 | Pell et al. | |
| 7,632,311 B2 | 12/2009 | Seedhom et al. | |
| 7,640,506 B2 | 12/2009 | Pratley et al. | |
| 7,661,075 B2 | 2/2010 | Lahdesmaki | |
| 7,664,821 B1 | 2/2010 | Ancin et al. | |
| 7,676,767 B2 | 3/2010 | Hofmeister et al. | |
| 7,681,149 B2 | 3/2010 | Lahdesmaki | |
| 7,685,116 B2 | 3/2010 | Pell et al. | |
| 7,703,036 B2 | 4/2010 | Satterfield et al. | |
| 7,707,255 B2 | 4/2010 | Satterfield et al. | |
| 7,711,742 B2 | 5/2010 | Bennett et al. | |
| 7,716,593 B2 | 5/2010 | Durazo et al. | |
| 7,739,259 B2 | 6/2010 | Hartwell et al. | |
| 7,747,966 B2 | 6/2010 | Leukart et al. | |
| 7,769,698 B2 | 8/2010 | Matic | |
| 7,779,386 B2 | 8/2010 | Seitz et al. | |
| 7,788,598 B2 | 8/2010 | Bansal et al. | |
| 7,802,199 B2 | 9/2010 | Shneerson et al. | |
| 7,827,546 B1 | 11/2010 | Jones et al. | |
| 7,831,902 B2 | 11/2010 | Sourov et al. | |
| 7,853,877 B2 | 12/2010 | Giesen et al. | |
| 7,856,596 B2 | 12/2010 | Crider et al. | |
| 7,860,901 B2 | 12/2010 | Cheng et al. | |
| 7,865,868 B2 | 1/2011 | Falzone Schwaw et al. | |
| 7,870,465 B2 | 1/2011 | VerSteeg | |
| 7,886,290 B2 | 2/2011 | Dhanjal et al. | |
| 7,895,531 B2 | 2/2011 | Radtke et al. | |
| 7,908,580 B2 | 3/2011 | Stubbs et al. | |
| 7,925,621 B2 | 4/2011 | Sikchi et al. | |
| 7,949,963 B1 | 5/2011 | Pham et al. | |
| 8,046,683 B2 | 10/2011 | Larcheveque et al. | |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,171,417 B2 | 5/2012 | Bamford et al. | |
| 8,201,103 B2 | 6/2012 | Dukhon et al. | |
| 8,239,882 B2 | 8/2012 | Dhanjal et al. | |
| 8,243,017 B2 | 8/2012 | Brodersen et al. | |
| 8,255,828 B2 | 8/2012 | Harris et al. | |
| 8,285,806 B2 | 10/2012 | Yu | |
| 8,302,014 B2 | 10/2012 | Lezama Guadarrama et al. | |
| 8,402,096 B2 | 3/2013 | Affronti | |
| 8,479,122 B2 | 7/2013 | Hotelling et al. | |
| 8,484,578 B2 | 7/2013 | Gordner et al. | |
| 8,605,090 B2 | 12/2013 | Garg et al. | |
| 8,627,222 B2 | 1/2014 | Hartwell et al. | |
| 8,627,562 B2 | 1/2014 | Sutter et al. | |
| 8,638,333 B2 | 1/2014 | Garg et al. | |
| 8,689,137 B2 | 4/2014 | McCormack et al. | |
| 8,749,122 B2 | 6/2014 | Aratake | |
| 8,762,880 B2 | 6/2014 | Dukhon et al. | |
| 8,799,353 B2 | 8/2014 | Larsson et al. | |
| 8,799,808 B2 | 8/2014 | Satterfield et al. | |
| 8,839,139 B2 | 9/2014 | Leukart et al. | |
| 8,904,287 B2 | 12/2014 | Kumar et al. | |
| 9,015,621 B2 | 4/2015 | Dean et al. | |
| 9,015,624 B2 | 4/2015 | Radtke et al. | |
| 9,046,983 B2 | 6/2015 | Zhao et al. | |
| 9,098,473 B2 | 8/2015 | Dukhon et al. | |
| 9,098,837 B2 | 8/2015 | Hill et al. | |
| 9,182,885 B2 | 11/2015 | Ruscher et al. | |
| 9,223,477 B2 | 12/2015 | Harris et al. | |
| 9,304,658 B2 | 4/2016 | Mercer | |
| 9,542,667 B2 | 1/2017 | Taboada et al. | |
| 9,588,781 B2 | 3/2017 | Larsson et al. | |
| 9,665,850 B2 | 5/2017 | McCann et al. | |
| 9,690,450 B2 | 6/2017 | Satterfield et al. | |
| 9,715,678 B2 | 7/2017 | Hill et al. | |
| 9,727,989 B2 | 8/2017 | Garg et al. | |
| 9,762,637 B2 | 9/2017 | Bullotta et al. | |
| 10,248,687 B2 | 4/2019 | Hartwell et al. | |
| 10,437,431 B2 | 10/2019 | Harris et al. | |
| 2001/0014900 A1 | 8/2001 | Brauer et al. | |
| 2001/0032220 A1 | 10/2001 | Ven Hoff | |
| 2001/0034762 A1 | 10/2001 | Jacobs et al. | |
| 2001/0035882 A1 | 11/2001 | Stoakley et al. | |
| 2001/0038395 A1 | 11/2001 | Holtzblatt et al. | |

(56) References Cited

U.S. PATENT DOCUMENTS

| | | |
|---|---|---|
| 2001/0040627 A1 | 11/2001 | Obradovich |
| 2001/0044736 A1 | 11/2001 | Jacobs et al. |
| 2001/0044741 A1 | 11/2001 | Jacobs et al. |
| 2001/0049677 A1 | 12/2001 | Talib et al. |
| 2002/0004734 A1 | 1/2002 | Nishizawa |
| 2002/0007380 A1 | 1/2002 | Bauchot et al. |
| 2002/0013562 A1 | 1/2002 | Mizutani |
| 2002/0023134 A1 | 2/2002 | Roskowski et al. |
| 2002/0024638 A1 | 2/2002 | Hidari et al. |
| 2002/0029247 A1 | 3/2002 | Kawamoto |
| 2002/0036662 A1 | 3/2002 | Gauthier et al. |
| 2002/0037754 A1 | 3/2002 | Hama et al. |
| 2002/0052721 A1 | 5/2002 | Ruff et al. |
| 2002/0052880 A1 | 5/2002 | Fruensgaard et al. |
| 2002/0052916 A1 | 5/2002 | Kloba et al. |
| 2002/0054101 A1 | 5/2002 | Beatty |
| 2002/0054128 A1 | 5/2002 | Lau et al. |
| 2002/0063734 A1 | 5/2002 | Khalfay et al. |
| 2002/0070977 A1 | 6/2002 | Morcos et al. |
| 2002/0073091 A1 | 6/2002 | Jain et al. |
| 2002/0073156 A1 | 6/2002 | Newman |
| 2002/0075330 A1 | 6/2002 | Rosenzweig et al. |
| 2002/0078143 A1 | 6/2002 | De Boor et al. |
| 2002/0083054 A1 | 6/2002 | Peltonen et al. |
| 2002/0083097 A1 | 6/2002 | Warrington |
| 2002/0089543 A1 | 7/2002 | Ostergaard et al. |
| 2002/0091697 A1 | 7/2002 | Huang et al. |
| 2002/0091739 A1 | 7/2002 | Ferlitsch et al. |
| 2002/0097266 A1 | 7/2002 | Hachiya et al. |
| 2002/0099775 A1 | 7/2002 | Gupta et al. |
| 2002/0099777 A1 | 7/2002 | Gupta et al. |
| 2002/0116208 A1 | 8/2002 | Chirnomas |
| 2002/0116508 A1 | 8/2002 | Khan et al. |
| 2002/0120695 A1 | 8/2002 | Engstrom |
| 2002/0120702 A1 | 8/2002 | Schiavone et al. |
| 2002/0122071 A1 | 9/2002 | Camera et al. |
| 2002/0123984 A1 | 9/2002 | Prakash |
| 2002/0123991 A1 | 9/2002 | Asami |
| 2002/0125942 A1 | 9/2002 | Dunnebacke et al. |
| 2002/0129052 A1 | 9/2002 | Glazer et al. |
| 2002/0133557 A1 | 9/2002 | Winarski |
| 2002/0135621 A1 | 9/2002 | Angiulo et al. |
| 2002/0140731 A1 | 10/2002 | Subramaniam et al. |
| 2002/0140733 A1 | 10/2002 | Edlund et al. |
| 2002/0140740 A1 | 10/2002 | Chen |
| 2002/0149623 A1 | 10/2002 | West et al. |
| 2002/0149629 A1 | 10/2002 | Craycroft et al. |
| 2002/0154178 A1 | 10/2002 | Barnett et al. |
| 2002/0156815 A1 | 10/2002 | Davia |
| 2002/0158876 A1 | 10/2002 | Janssen |
| 2002/0163538 A1 | 11/2002 | Shteyn |
| 2002/0175938 A1 | 11/2002 | Hackworth |
| 2002/0175955 A1 | 11/2002 | Gourdol et al. |
| 2002/0184611 A1 | 12/2002 | Endejan |
| 2002/0186257 A1 | 12/2002 | Cadiz et al. |
| 2002/0188515 A1 | 12/2002 | Nakata et al. |
| 2002/0188632 A1 | 12/2002 | Su |
| 2002/0196293 A1 | 12/2002 | Suppan et al. |
| 2003/0005051 A1 | 1/2003 | Gottlieb |
| 2003/0005056 A1 | 1/2003 | Yamamoto et al. |
| 2003/0009455 A1 | 1/2003 | Carlson et al. |
| 2003/0011564 A1 | 1/2003 | Ushino et al. |
| 2003/0011638 A1 | 1/2003 | Chung |
| 2003/0011639 A1 | 1/2003 | Webb |
| 2003/0014421 A1 | 1/2003 | Jung |
| 2003/0014490 A1 | 1/2003 | Bates et al. |
| 2003/0016248 A1 | 1/2003 | Hayes Ubillos |
| 2003/0020267 A1 | 1/2003 | Scholz |
| 2003/0022700 A1 | 1/2003 | Wang |
| 2003/0025732 A1 | 2/2003 | Prichard |
| 2003/0025737 A1 | 2/2003 | Breinberg |
| 2003/0028560 A1 | 2/2003 | Kudrolli et al. |
| 2003/0035012 A1 | 2/2003 | Kurtenbach et al. |
| 2003/0035917 A1 | 2/2003 | Hyman |
| 2003/0038832 A1 | 2/2003 | Sobol |
| 2003/0043200 A1 | 3/2003 | Faieta et al. |
| 2003/0043211 A1 | 3/2003 | Kremer et al. |
| 2003/0046528 A1 | 3/2003 | Haitani et al. |
| 2003/0048302 A1 | 3/2003 | Quan |
| 2003/0050986 A1 | 3/2003 | Matthews et al. |
| 2000/0069892 | 4/2003 | Hind et al. |
| 2003/0064707 A1 | 4/2003 | Voneyama |
| 2003/0066025 A1 | 4/2003 | Garner et al. |
| 2003/0069900 A1 | 4/2003 | Hind et al. |
| 2003/0070143 A1 | 4/2003 | Maslov |
| 2003/0084035 A1 | 5/2003 | Emerick |
| 2003/0090528 A1 | 5/2003 | Masuda et al. |
| 2003/0093490 A1 | 5/2003 | Yamamoto et al. |
| 2003/0097361 A1 | 5/2003 | Huang et al. |
| 2003/0097640 A1 | 5/2003 | Abrams et al. |
| 2003/0098891 A1 | 5/2003 | Molander |
| 2003/0101065 A1 | 5/2003 | Rohall et al. |
| 2003/0106024 A1 | 6/2003 | Silverbrook et al. |
| 2003/0110191 A1 | 6/2003 | Handsaker et al. |
| 2003/0112278 A1 | 6/2003 | Driskell |
| 2003/0128243 A1 | 7/2003 | Okamoto |
| 2003/0132972 A1 | 7/2003 | Pang |
| 2003/0135825 A1 | 7/2003 | Gertner et al. |
| 2003/0140009 A1 | 7/2003 | Namba et al. |
| 2003/0154254 A1 | 8/2003 | Awasthi |
| 2003/0156140 A1 | 8/2003 | Watanabe |
| 2003/0160821 A1 | 8/2003 | Yoon |
| 2003/0163455 A1 | 8/2003 | Dettinger et al. |
| 2003/0163537 A1 | 8/2003 | Rohall et al. |
| 2003/0167310 A1 | 9/2003 | Moody et al. |
| 2003/0167315 A1 | 9/2003 | Chowdhry et al. |
| 2003/0169284 A1 | 9/2003 | Dettinger et al. |
| 2003/0177190 A1 | 9/2003 | Moody et al. |
| 2003/0184585 A1 | 10/2003 | Lin et al. |
| 2003/0187586 A1 | 10/2003 | Katzenmaier et al. |
| 2003/0187937 A1 | 10/2003 | Yao et al. |
| 2003/0195937 A1 | 10/2003 | Kircher et al. |
| 2003/0200267 A1 | 10/2003 | Garrigues |
| 2003/0206646 A1 | 11/2003 | Brackett |
| 2003/0218611 A1 | 11/2003 | Ben-Tovim et al. |
| 2003/0220138 A1 | 11/2003 | Walker et al. |
| 2003/0225823 A1 | 12/2003 | Meeuwissen et al. |
| 2003/0225853 A1 | 12/2003 | Wang et al. |
| 2003/0226106 A1 | 12/2003 | McKellar et al. |
| 2003/0227481 A1 | 12/2003 | Arend et al. |
| 2003/0227487 A1 | 12/2003 | Hugh |
| 2003/0229668 A1 | 12/2003 | Malik |
| 2003/0229673 A1 | 12/2003 | Malik |
| 2003/0233419 A1 | 12/2003 | Beringer |
| 2004/0002941 A1 | 1/2004 | Thorne et al. |
| 2004/0003351 A1 | 1/2004 | Sommerer et al. |
| 2004/0006570 A1 | 1/2004 | Gelb |
| 2004/0010513 A1 | 1/2004 | Scherr |
| 2004/0010933 A1 | 1/2004 | Mertens et al. |
| 2004/0012633 A1 | 1/2004 | Helt |
| 2004/0021647 A1 | 2/2004 | Iwema |
| 2004/0024824 A1 | 2/2004 | Ferguson et al. |
| 2004/0027473 A1 | 2/2004 | Suzuki |
| 2004/0030993 A1 | 2/2004 | Huey et al. |
| 2004/0044735 A1 | 3/2004 | Hoblit |
| 2004/0056894 A1 | 3/2004 | Zaika et al. |
| 2004/0061713 A1 | 4/2004 | Jennings |
| 2004/0068695 A1 | 4/2004 | Daniell et al. |
| 2004/0073503 A1 | 4/2004 | Morales et al. |
| 2004/0083432 A1 | 4/2004 | Kawamura et al. |
| 2004/0088359 A1 | 5/2004 | Simpson |
| 2004/0090315 A1 | 5/2004 | Mackjust et al. |
| 2004/0093290 A1 | 5/2004 | Doss et al. |
| 2004/0100504 A1 | 5/2004 | Sommer |
| 2004/0100505 A1 | 5/2004 | Cazier |
| 2004/0107197 A1 | 6/2004 | Shen et al. |
| 2004/0109025 A1 | 6/2004 | Hullot et al. |
| 2004/0109033 A1 | 6/2004 | Vienneau et al. |
| 2004/0117451 A1 | 6/2004 | Chung |
| 2004/0119755 A1 | 6/2004 | Guibourge |
| 2004/0119760 A1 | 6/2004 | Grossman et al. |
| 2004/0122789 A1 | 6/2004 | Ostertag et al. |
| 2004/0125142 A1 | 7/2004 | Mock et al. |
| 2004/0128275 A1 | 7/2004 | Moehrle |

(56) References Cited

U.S. PATENT DOCUMENTS

| | | |
|---|---|---|
| 2004/0133854 A1 | 7/2004 | Black |
| 2004/0135805 A1 | 7/2004 | Gottsacker et al. |
| 2004/0135811 A1 | 7/2004 | Pickering et al. |
| 2004/0139435 A1 | 7/2004 | Cui et al. |
| 2004/0142720 A1 | 7/2004 | Smethers |
| 2004/0150668 A1 | 8/2004 | Myers et al. |
| 2004/0153373 A1 | 8/2004 | Song et al. |
| 2004/0153968 A1 | 8/2004 | Ching et al. |
| 2004/0153973 A1 | 8/2004 | Horowitz |
| 2004/0164983 A1 | 8/2004 | Khozai |
| 2004/0168153 A1 | 8/2004 | Marvin |
| 2004/0181471 A1 | 9/2004 | Rogers |
| 2004/0186775 A1 | 9/2004 | Margiloff et al. |
| 2004/0189694 A1 | 9/2004 | Kurtz et al. |
| 2004/0192440 A1 | 9/2004 | Evans et al. |
| 2004/0196309 A1 | 10/2004 | Hawkins |
| 2004/0205536 A1 | 10/2004 | Newman et al. |
| 2004/0212640 A1 | 10/2004 | Mann |
| 2004/0215612 A1 | 10/2004 | Brody |
| 2004/0221234 A1 | 11/2004 | Imai |
| 2004/0221309 A1 | 11/2004 | Zaner |
| 2004/0230508 A1 | 11/2004 | Minnis et al. |
| 2004/0230906 A1 | 11/2004 | Pik et al. |
| 2004/0233239 A1 | 11/2004 | Lahdesmaki |
| 2004/0236796 A1 | 11/2004 | Bhatt et al. |
| 2004/0239700 A1 | 12/2004 | Baschy |
| 2004/0240902 A1 | 12/2004 | Dalal et al. |
| 2004/0243938 A1 | 12/2004 | Weise et al. |
| 2004/0254928 A1 | 12/2004 | Vronay |
| 2004/0260756 A1 | 12/2004 | Forstall et al. |
| 2004/0261013 A1 | 12/2004 | Wynn et al. |
| 2004/0268231 A1 | 12/2004 | Tunning |
| 2004/0268235 A1 | 12/2004 | Wason |
| 2004/0268259 A1 | 12/2004 | Rockey et al. |
| 2004/0268270 A1 | 12/2004 | Hill et al. |
| 2005/0004989 A1 | 1/2005 | Satterfield et al. |
| 2005/0004990 A1 | 1/2005 | Durazo et al. |
| 2005/0005235 A1 | 1/2005 | Satterfield et al. |
| 2005/0005249 A1 | 1/2005 | Hill et al. |
| 2005/0010871 A1 | 1/2005 | Ruthfield et al. |
| 2005/0015361 A1 | 1/2005 | Payton et al. |
| 2005/0015364 A1 | 1/2005 | Payton |
| 2005/0021504 A1 | 1/2005 | Atchison |
| 2005/0021521 A1 | 1/2005 | Wycoff |
| 2005/0022116 A1 | 1/2005 | Bowman et al. |
| 2005/0027779 A1 | 2/2005 | Schinner |
| 2005/0033614 A1 | 2/2005 | Lettovsky et al. |
| 2005/0033811 A1 | 2/2005 | Bhogal et al. |
| 2005/0039142 A1 | 2/2005 | Jalon et al. |
| 2005/0043015 A1 | 2/2005 | Muramatsu |
| 2005/0044500 A1 | 2/2005 | Orimoto et al. |
| 2005/0055449 A1 | 3/2005 | Rappold, III |
| 2005/0057584 A1 | 3/2005 | Gruen et al. |
| 2005/0060337 A1 | 3/2005 | Chou et al. |
| 2005/0065966 A1 | 3/2005 | Diab |
| 2005/0071242 A1 | 3/2005 | Allen et al. |
| 2005/0086135 A1 | 4/2005 | Lu |
| 2005/0088359 A1 | 4/2005 | Lynch et al. |
| 2005/0091576 A1 | 4/2005 | Relyea et al. |
| 2005/0097465 A1 | 5/2005 | Giesen et al. |
| 2005/0097511 A1 | 5/2005 | Bergman et al. |
| 2005/0108348 A1 | 5/2005 | Lee |
| 2005/0108734 A1 | 5/2005 | Need et al. |
| 2005/0114778 A1 | 5/2005 | Bramson et al. |
| 2005/0114781 A1 | 5/2005 | Brownholtz et al. |
| 2005/0117179 A1 | 6/2005 | Ito et al. |
| 2005/0132010 A1 | 6/2005 | Muller |
| 2005/0132053 A1 | 6/2005 | Roth et al. |
| 2005/0137873 A1 | 6/2005 | Liu |
| 2005/0138552 A1 | 6/2005 | Venolia |
| 2005/0138576 A1 | 6/2005 | Baumert et al. |
| 2005/0144157 A1 | 6/2005 | Moody et al. |
| 2005/0144241 A1 | 6/2005 | Stata et al. |
| 2005/0144284 A1 | 6/2005 | Ludwig et al. |
| 2005/0144560 A1 | 6/2005 | Gruen et al. |
| 2005/0144568 A1 | 6/2005 | Gruen et al. |
| 2005/0144572 A1 | 6/2005 | Wattenberg et al. |
| 2005/0154765 A1 | 7/2005 | Seitz et al. |
| 2005/0172262 A1 | 8/2005 | Lalwani |
| 2005/0177789 A1 | 8/2005 | Abbar et al. |
| 2005/0183008 A1 | 8/2005 | Crider et al. |
| 2005/0185920 A1 | 8/2005 | Harper et al. |
| 2005/0188043 A1 | 8/2005 | Cortright et al. |
| 2005/0198573 A1 | 9/2005 | Ali et al. |
| 2005/0203975 A1 | 9/2005 | Jindal et al. |
| 2005/0216863 A1 | 9/2005 | Schumacher et al. |
| 2005/0222985 A1 | 10/2005 | Buchheit et al. |
| 2005/0223057 A1 | 10/2005 | Buchheit et al. |
| 2005/0223066 A1 | 10/2005 | Buchheit et al. |
| 2005/0223329 A1 | 10/2005 | Schwartz et al. |
| 2005/0234910 A1 | 10/2005 | Buchheit et al. |
| 2005/0240902 A1 | 10/2005 | Bunker et al. |
| 2005/0251757 A1 | 11/2005 | Farn |
| 2005/0256867 A1 | 11/2005 | Walther et al. |
| 2005/0278656 A1 | 12/2005 | Goldthwaite et al. |
| 2005/0289109 A1 | 12/2005 | Arrouye et al. |
| 2005/0289156 A1 | 12/2005 | Maryka et al. |
| 2005/0289158 A1 | 12/2005 | Weiss et al. |
| 2005/0289159 A1 | 12/2005 | Hadley et al. |
| 2006/0015816 A1 | 1/2006 | Kuehner et al. |
| 2006/0020962 A1 | 1/2006 | Stark |
| 2006/0026033 A1 | 2/2006 | Brydon |
| 2006/0026145 A1 | 2/2006 | Beringer et al. |
| 2006/0026213 A1 | 2/2006 | Yaskin et al. |
| 2006/0026242 A1 | 2/2006 | Kuhlmann |
| 2006/0036580 A1 | 2/2006 | Stata et al. |
| 2006/0036945 A1 | 2/2006 | Radtke et al. |
| 2006/0036946 A1 | 2/2006 | Radtke et al. |
| 2006/0036950 A1 | 2/2006 | Himberger et al. |
| 2006/0036964 A1 | 2/2006 | Satterfield et al. |
| 2006/0036965 A1 | 2/2006 | Harris et al. |
| 2006/0041545 A1 | 2/2006 | Heidloff et al. |
| 2006/0047644 A1 | 3/2006 | Bocking et al. |
| 2006/0053383 A1 | 3/2006 | Gauthier et al. |
| 2006/0059035 A1 | 3/2006 | Kraft et al. |
| 2006/0061738 A1 | 3/2006 | Rizzo |
| 2006/0064434 A1 | 3/2006 | Gilbert et al. |
| 2006/0069604 A1 | 3/2006 | Leukart et al. |
| 2006/0069684 A1 | 3/2006 | Vadlamani et al. |
| 2006/0069686 A1 | 3/2006 | Beyda et al. |
| 2006/0074844 A1 | 4/2006 | Frankel et al. |
| 2006/0080303 A1 | 4/2006 | Sargent et al. |
| 2006/0080363 A1 | 4/2006 | Vadlamani et al. |
| 2006/0080468 A1 | 4/2006 | Vadlamani et al. |
| 2006/0085502 A1 | 4/2006 | Sundararajan et al. |
| 2006/0095865 A1 | 5/2006 | Rostom |
| 2006/0101051 A1 | 5/2006 | Carr et al. |
| 2006/0101350 A1 | 5/2006 | Scott |
| 2006/0111931 A1 | 5/2006 | Johnson et al. |
| 2006/0117249 A1 | 6/2006 | Hu et al. |
| 2006/0117302 A1 | 6/2006 | Mercer et al. |
| 2006/0129937 A1 | 6/2006 | Shafron |
| 2006/0132812 A1 | 6/2006 | Barnes et al. |
| 2006/0155689 A1 | 7/2006 | Blakeley et al. |
| 2006/0161849 A1 | 7/2006 | Miller et al. |
| 2006/0161863 A1 | 7/2006 | Gallo |
| 2006/0165105 A1 | 7/2006 | Shenfield et al. |
| 2006/0168522 A1 | 7/2006 | Bala |
| 2006/0173824 A1 | 8/2006 | Bensky |
| 2006/0173961 A1 | 8/2006 | Turski et al. |
| 2006/0184867 A1 | 8/2006 | Shpigel |
| 2006/0184896 A1 | 8/2006 | Foucher et al. |
| 2006/0200432 A1 | 9/2006 | Flinn et al. |
| 2006/0200455 A1 | 9/2006 | Wilson |
| 2006/0218500 A1 | 9/2006 | Suave et al. |
| 2006/0224946 A1 | 10/2006 | Barrett et al. |
| 2006/0242557 A1 | 10/2006 | Nortis, III |
| 2006/0242575 A1 | 10/2006 | Winser |
| 2006/0242591 A1 | 10/2006 | Van dok et al. |
| 2006/0248012 A1 | 11/2006 | Kircher et al. |
| 2006/0253830 A1 | 11/2006 | Rajanala et al. |
| 2006/0259449 A1 | 11/2006 | Betz et al. |
| 2006/0271869 A1 | 11/2006 | Thanu et al. |
| 2006/0271910 A1 | 11/2006 | Burcham et al. |

(56) References Cited

U.S. PATENT DOCUMENTS

| | | |
|---|---|---|
| 2006/0282784 A1 | 12/2006 | Taylor et al. |
| 2006/0282817 A1 | 12/2006 | Darst et al. |
| 2006/0294452 A1 | 12/2006 | Matsumoto |
| 2006/0294526 A1 | 12/2006 | Hambrick et al. |
| 2006/0294528 A1 | 12/2006 | Lund et al. |
| 2007/0006075 A1 | 1/2007 | Lection et al. |
| 2007/0006206 A1 | 1/2007 | Dhanjal et al. |
| 2007/0006327 A1 | 1/2007 | Lal et al. |
| 2007/0011258 A1 | 1/2007 | Koo |
| 2007/0016857 A1 | 1/2007 | Polleck et al. |
| 2007/0033250 A1 | 2/2007 | Levin et al. |
| 2007/0050182 A1 | 3/2007 | Sneddon et al. |
| 2007/0050401 A1 | 3/2007 | Young et al. |
| 2007/0050469 A1 | 3/2007 | Gupta et al. |
| 2007/0055936 A1 | 3/2007 | Dhanjal et al. |
| 2007/0055943 A1 | 3/2007 | McCormack et al. |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0061705 A1 | 3/2007 | Ammerlaan et al. |
| 2007/0061738 A1 | 3/2007 | Taboada et al. |
| 2007/0083813 A1 | 4/2007 | Lui et al. |
| 2007/0094230 A1 | 4/2007 | Subramaniam et al. |
| 2007/0094597 A1 | 4/2007 | Rostom |
| 2007/0094608 A1 | 4/2007 | Getsch |
| 2007/0101299 A1 | 5/2007 | Shaw et al. |
| 2007/0106951 A1 | 5/2007 | McCormack et al. |
| 2007/0124696 A1 | 5/2007 | Mullender |
| 2007/0130276 A1 | 6/2007 | Zhang et al. |
| 2007/0143662 A1 | 6/2007 | Carlson et al. |
| 2007/0143671 A1 | 6/2007 | Paterson et al. |
| 2007/0156519 A1 | 7/2007 | Agassi et al. |
| 2007/0179841 A1 | 8/2007 | Agassi et al. |
| 2007/0180040 A1 | 8/2007 | Etgen et al. |
| 2007/0185826 A1 | 8/2007 | Brice et al. |
| 2007/0186212 A1 | 8/2007 | Mazzaferri et al. |
| 2007/0203991 A1 | 8/2007 | Fisher et al. |
| 2007/0209008 A1 | 9/2007 | Mori et al. |
| 2007/0234223 A1 | 10/2007 | Leavitt et al. |
| 2007/0234290 A1 | 10/2007 | Ronen et al. |
| 2007/0240057 A1 | 10/2007 | Satterfield et al. |
| 2007/0260996 A1 | 11/2007 | Jakobson |
| 2007/0266017 A1 | 11/2007 | Held et al. |
| 2007/0279417 A1 | 12/2007 | Garg et al. |
| 2007/0282956 A1 | 12/2007 | Staats |
| 2007/0283287 A1 | 12/2007 | Taylor et al. |
| 2007/0300168 A1 | 12/2007 | Bosma et al. |
| 2008/0005247 A9 | 1/2008 | Khoo |
| 2008/0005249 A1 | 1/2008 | Hart |
| 2008/0005274 A1 | 1/2008 | Subbanna et al. |
| 2008/0005686 A1 | 1/2008 | Singh |
| 2008/0034304 A1 | 2/2008 | Feuerbacher et al. |
| 2008/0040682 A1 | 2/2008 | Sorenson et al. |
| 2008/0046518 A1 | 2/2008 | Tonnison et al. |
| 2008/0046828 A1 | 2/2008 | Bibliowicz et al. |
| 2008/0052670 A1 | 2/2008 | Espinosa et al. |
| 2008/0077571 A1 | 3/2008 | Harris et al. |
| 2008/0098229 A1 | 4/2008 | Hartrell et al. |
| 2008/0104505 A1 | 5/2008 | Keohane et al. |
| 2008/0109787 A1 | 5/2008 | Wang et al. |
| 2008/0134138 A1 | 6/2008 | Chamieh et al. |
| 2008/0141156 A1 | 6/2008 | Reik et al. |
| 2008/0141242 A1* | 6/2008 | Shapiro .................. G06F 8/61 717/174 |
| 2008/0155555 A1 | 6/2008 | Kwong |
| 2008/0168146 A1 | 7/2008 | Fletcher |
| 2008/0178110 A1 | 7/2008 | Hill et al. |
| 2008/0182651 A1 | 7/2008 | Marshall et al. |
| 2008/0209316 A1 | 8/2008 | Zandstra |
| 2008/0216014 A1 | 9/2008 | Kurtenbach et al. |
| 2008/0244440 A1 | 10/2008 | Bailey |
| 2008/0263462 A1 | 10/2008 | Mayer-ullmann et al. |
| 2009/0007003 A1 | 1/2009 | Dukhon et al. |
| 2009/0012984 A1 | 1/2009 | Ravid et al. |
| 2009/0031295 A1 | 1/2009 | Zhao et al. |
| 2009/0034618 A1 | 2/2009 | Fu et al. |
| 2009/0064090 A1 | 3/2009 | Anonsen et al. |
| 2009/0083656 A1 | 3/2009 | Dukhon et al. |
| 2009/0100009 A1 | 4/2009 | Karp |
| 2009/0106375 A1 | 4/2009 | Carmel et al. |
| 2009/0144651 A1 | 6/2009 | Sprang et al. |
| 2009/0152349 A1 | 6/2009 | Bonev |
| 2009/0158173 A1 | 6/2009 | Palahnuk et al. |
| 2009/0163183 A1 | 6/2009 | O'donoghue et al. |
| 2009/0192845 A1 | 7/2009 | Gudipaty et al. |
| 2009/0205013 A1 | 8/2009 | Lowes |
| 2009/0217192 A1 | 8/2009 | Dean et al. |
| 2009/0217263 A1 | 8/2009 | Gebhart et al. |
| 2009/0222763 A1 | 9/2009 | Dukhon et al. |
| 2009/0249339 A1 | 10/2009 | Larsson et al. |
| 2009/0259950 A1 | 10/2009 | Sullivan et al. |
| 2009/0319619 A1 | 12/2009 | Affronti |
| 2009/0319911 A1 | 12/2009 | McCann |
| 2010/0011310 A1 | 1/2010 | Rainisto |
| 2010/0011319 A1 | 1/2010 | Gourdol et al. |
| 2010/0060645 A1 | 3/2010 | Garg et al. |
| 2010/0146478 A1 | 6/2010 | Head et al. |
| 2010/0159967 A1 | 6/2010 | Pounds et al. |
| 2010/0180226 A1 | 7/2010 | Satterfield et al. |
| 2010/0191818 A1 | 7/2010 | Satterfield et al. |
| 2010/0199261 A1 | 8/2010 | Shenfield et al. |
| 2010/0211889 A1 | 8/2010 | Durazo et al. |
| 2010/0223575 A1 | 9/2010 | Leukart et al. |
| 2010/0239470 A1 | 9/2010 | Pham-huu et al. |
| 2010/0293470 A1 | 11/2010 | Zhao et al. |
| 2011/0041092 A1 | 2/2011 | Zhang |
| 2011/0055673 A1 | 3/2011 | Teng et al. |
| 2011/0055690 A1 | 3/2011 | Wason |
| 2011/0072396 A1 | 3/2011 | Giesen et al. |
| 2011/0138273 A1 | 6/2011 | Radtke et al. |
| 2011/0225249 A1 | 9/2011 | Forstall et al. |
| 2011/0296322 A1 | 12/2011 | Dhanjal et al. |
| 2011/0307798 A1 | 12/2011 | Lezama guadarrama et al. |
| 2012/0179993 A1 | 7/2012 | Himberger et al. |
| 2012/0215866 A1 | 8/2012 | Satterfield et al. |
| 2012/0324394 A1 | 12/2012 | Harris et al. |
| 2013/0014048 A1 | 1/2013 | Satterfield et al. |
| 2013/0159879 A1 | 6/2013 | Affronti et al. |
| 2013/0283207 A1 | 10/2013 | Dukhon et al. |
| 2013/0305141 A1 | 11/2013 | Wason |
| 2014/0019896 A1 | 1/2014 | Satterfield et al. |
| 2014/0115526 A1 | 4/2014 | Hartwell et al. |
| 2014/0132609 A1 | 5/2014 | Garg et al. |
| 2014/0258933 A1 | 9/2014 | Dukhon et al. |
| 2015/0220263 A1 | 8/2015 | Zhao et al. |
| 2015/0309679 A1 | 10/2015 | Dean et al. |
| 2015/0339281 A1 | 11/2015 | Dukhon et al. |
| 2015/0363049 A1 | 12/2015 | Sadouski et al. |
| 2015/0370771 A1 | 12/2015 | Dukhon et al. |
| 2016/0117069 A1 | 4/2016 | Harris et al. |
| 2017/0075952 A1 | 3/2017 | Hartwell et al. |
| 2017/0205971 A1 | 7/2017 | Himberger et al. |
| 2017/0212877 A1 | 7/2017 | Dukhon et al. |
| 2017/0262810 A1 | 9/2017 | McCann et al. |
| 2017/0337715 A1 | 11/2017 | Garg et al. |
| 2017/0357392 A1 | 12/2017 | Satterfield et al. |
| 2019/0197037 A1 | 6/2019 | Hartwell et al. |
| 2020/0081594 A1 | 3/2020 | Harris et al. |
| 2020/0285356 A1 | 9/2020 | Satterfield et al. |

FOREIGN PATENT DOCUMENTS

| | | |
|---|---|---|
| AU | 2006287408 B2 | 5/2011 |
| AU | 2007255043 | 8/2012 |
| AU | 2010216342 | 7/2014 |
| BR | PI0503986 | 3/2006 |
| CA | 2512047 A1 | 2/2006 |
| CA | 2750422 A1 | 8/2010 |
| CA | 2650016 | 9/2015 |
| CA | 2512036 | 11/2015 |
| CN | 1746914 | 3/2006 |
| CN | 1755599 | 4/2006 |
| CN | 1790243 A | 6/2006 |
| CN | 101604243 A | 12/2009 |

(56) References Cited

FOREIGN PATENT DOCUMENTS

| | | |
|---|---|---|
| CN | 102422255 A | 4/2012 |
| CN | 101243439 | 6/2012 |
| CN | 102067166 | 6/2013 |
| CN | 102317897 | 7/2013 |
| CN | 102077163 | 10/2013 |
| CN | 102077199 | 1/2014 |
| CN | 102422255 B | 11/2014 |
| CN | 201080021957.4 | 11/2014 |
| CN | 1553377 | 12/2014 |
| EP | 291162 A | 11/1988 |
| EP | 0584269 | 3/1994 |
| EP | 587394 | 3/1994 |
| EP | 0715247 A1 | 6/1996 |
| EP | 0774722 | 5/1997 |
| EP | 0851368 | 7/1998 |
| EP | 0910007 | 4/1999 |
| EP | 1077405 | 2/2001 |
| EP | 1104151 | 5/2001 |
| EP | 1223503 | 7/2002 |
| EP | 1376337 | 1/2004 |
| EP | 1394713 | 3/2004 |
| EP | 1462951 A1 | 9/2004 |
| EP | 1462999 | 9/2004 |
| EP | 1542133 | 6/2005 |
| EP | 1564652 | 8/2005 |
| EP | 1628197 | 2/2006 |
| EP | 1628198 | 2/2006 |
| EP | 1628199 | 2/2006 |
| EP | 1645972 | 4/2006 |
| EP | 1672518 | 6/2006 |
| EP | 1835434 | 9/2007 |
| EP | 1915001 | 4/2008 |
| GB | 2329813 | 3/1999 |
| GB | 2382683 A | 6/2003 |
| GB | 2391148 | 1/2004 |
| ID | P0027717 | 3/2011 |
| ID | P0027754 | 3/2011 |
| ID | P0029297 | 10/2011 |
| JP | 03-043824 | 2/1991 |
| JP | 04-186425 | 7/1992 |
| JP | 04-312186 | 11/1992 |
| JP | 05-204579 | 8/1993 |
| JP | 06-052282 | 2/1994 |
| JP | H06202842 A | 7/1994 |
| JP | 06-342357 | 12/1994 |
| JP | H08255066 A | 10/1996 |
| JP | 09-204289 | 8/1997 |
| JP | 10-074217 | 3/1998 |
| JP | 10-326171 | 12/1998 |
| JP | 11-039292 | 2/1999 |
| JP | 11-175258 | 7/1999 |
| JP | 11-259200 | 9/1999 |
| JP | 2000353130 A | 12/2000 |
| JP | 2001-034775 | 2/2001 |
| JP | 2001056741 A | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2002324055 A | 11/2002 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-526820 | 9/2003 |
| JP | 2003-308145 | 10/2003 |
| JP | 2003-316630 | 11/2003 |
| JP | 2004-078512 | 3/2004 |
| JP | 2004-086893 | 3/2004 |
| JP | 2004086896 A | 3/2004 |
| JP | 2004-102803 | 4/2004 |
| JP | 2004-512578 | 4/2004 |
| JP | 2004-145569 | 5/2004 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-025550 | 1/2005 |
| JP | 2005-31995 | 2/2005 |
| JP | 2005-032041 | 2/2005 |
| JP | 2005115914 | 4/2005 |
| JP | 2005-182353 | 7/2005 |
| JP | 2005-236089 | 9/2005 |
| JP | 2005322082 A | 11/2005 |
| JP | 2005-352849 | 12/2005 |
| JP | 2006-059358 | 3/2006 |
| JP | 2007-280180 | 10/2007 |
| JP | 2007-531165 | 11/2007 |
| JP | 2008-047067 | 2/2008 |
| JP | 2008-117019 | 5/2008 |
| JP | 2009-507311 | 2/2009 |
| JP | 4832024 | 12/2011 |
| JP | 5021185 | 6/2012 |
| JP | 5079701 | 9/2012 |
| JP | 5139984 | 11/2012 |
| JP | 5190452 | 2/2013 |
| JP | 5193042 | 2/2013 |
| JP | 5221757 | 3/2013 |
| JP | 5266384 | 5/2013 |
| JP | 5480894 | 2/2014 |
| JP | 5486595 | 2/2014 |
| JP | 5559817 | 6/2014 |
| JP | 5559845 | 6/2014 |
| JP | 5597698 | 8/2014 |
| KR | 1020010008081 A | 2/2001 |
| KR | 100450881 B1 | 10/2001 |
| KR | 20010091344 A | 10/2001 |
| KR | 1020010091344 A | 10/2001 |
| KR | 1020020004723 A | 1/2002 |
| KR | 1020020011415 A | 2/2002 |
| KR | 1020020037560 A | 5/2002 |
| KR | 1020020066643 | 8/2002 |
| KR | 1020020072039 A | 9/2002 |
| KR | 100359378 | 10/2002 |
| KR | 10-2003-0070685 | 2/2003 |
| KR | 100388254 B1 | 6/2003 |
| KR | 1020030072539 A | 9/2003 |
| KR | 20040071813 | 8/2004 |
| KR | 10-2005-0023805 | 3/2005 |
| KR | 10-2005-0036702 | 4/2005 |
| KR | 1020050072073 A | 7/2005 |
| KR | 1020060023005 A | 3/2006 |
| KR | 10-2006-0046735 | 5/2006 |
| KR | 10-2007-0000506 | 1/2007 |
| KR | 1020070116957 A | 12/2007 |
| KR | 10-2008-0002811 | 1/2008 |
| KR | 1020080021262 A | 3/2008 |
| KR | 10-2008-0041234 | 5/2008 |
| KR | 10-2008-0042852 | 5/2008 |
| KR | 20080041211 A | 5/2008 |
| KR | 1020080072073 A | 8/2008 |
| KR | 10-1130421 | 3/2012 |
| KR | 101129221 | 3/2012 |
| KR | 10-1149960 | 5/2012 |
| KR | 10-1149990 | 5/2012 |
| KR | 10-1159334 | 6/2012 |
| KR | 101161564 | 7/2012 |
| KR | 10-1238559 | 2/2013 |
| KR | 10-1298338 | 8/2013 |
| KR | 10-1298461 | 8/2013 |
| KR | 10-1312867 | 9/2013 |
| KR | 10-1323011 | 10/2013 |
| MX | 315932 | 12/2013 |
| MX | 322458 | 4/2014 |
| MX | 323275 | 9/2014 |
| MX | 323276 | 9/2014 |
| MY | 146456 | 8/2012 |
| MY | 147334 | 7/2013 |
| MY | 149803 | 10/2013 |
| PH | 1-2005-000404 | 8/2011 |
| PH | 1-2005-000495 | 3/2014 |
| PH | 1-2008-500356 | 8/2014 |

(56) References Cited

FOREIGN PATENT DOCUMENTS

| | | |
|---|---|---|
| RU | 2001-122576 | 9/2003 |
| RU | 2216119 C2 | 11/2003 |
| RU | 2222045 C2 | 1/2004 |
| RU | 2242050 C1 | 12/2004 |
| RU | 2004108142 A | 8/2005 |
| RU | 2005103645 A | 7/2006 |
| RU | 2005-116667 | 11/2006 |
| RU | 2005-120362 | 1/2007 |
| RU | 2005-130357 | 4/2007 |
| RU | 2322687 | 4/2008 |
| RU | 2327205 | 6/2008 |
| RU | 2328034 | 6/2008 |
| RU | 2332728 | 8/2008 |
| RU | 2347261 C2 | 2/2009 |
| RU | 2537776 | 1/2015 |
| TW | 420953 | 2/2001 |
| TW | 460839 | 10/2001 |
| TW | 490652 | 6/2002 |
| TW | 527812 | 4/2003 |
| TW | 2003-05097 | 10/2003 |
| TW | 569122 | 1/2004 |
| TW | 200514018 | 4/2005 |
| TW | I254878 | 5/2006 |
| TW | 2008-14632 | 3/2008 |
| TW | I368852 | 7/2012 |
| TW | I389002 | 3/2013 |
| TW | I389043 | 3/2013 |
| TW | I401577 | 7/2013 |
| TW | 201424755 A | 7/2014 |
| TW | I512591 | 12/2015 |
| WO | 92/21091 | 11/1992 |
| WO | 94/20921 | 9/1994 |
| WO | 96/10231 | 4/1996 |
| WO | 96/39654 | 12/1996 |
| WO | 98/20410 | 5/1998 |
| WO | 99/04353 | 1/1999 |
| WO | 99/27495 | 6/1999 |
| WO | 01/055894 | 8/2001 |
| WO | 0155894 A2 | 8/2001 |
| WO | 0177795 A2 | 10/2001 |
| WO | 02/091162 | 11/2002 |
| WO | 03/003240 | 1/2003 |
| WO | 3058519 A2 | 7/2003 |
| WO | 03/098500 | 11/2003 |
| WO | 2004/027672 | 4/2004 |
| WO | 2004056250 A1 | 7/2004 |
| WO | 2004086250 A1 | 10/2004 |
| WO | 2005103900 A1 | 11/2005 |
| WO | 2007001636 A2 | 1/2007 |
| WO | 07/027737 A1 | 3/2007 |
| WO | 07/033159 | 3/2007 |
| WO | 2007/030696 | 3/2007 |
| WO | 2007/030727 | 3/2007 |
| WO | 2007/036762 | 4/2007 |
| WO | 2007064480 A1 | 6/2007 |
| WO | 2008/027477 | 3/2008 |
| WO | 2008/121718 | 10/2008 |
| WO | 2009123801 A1 | 10/2009 |
| WO | 2009/158151 | 12/2009 |
| WO | 2009/158171 | 12/2009 |
| WO | 2009/158172 | 12/2009 |
| ZA | 2010/07809 | 2/2012 |
| ZA | 2010/07810 | 2/2012 |
| ZA | 2010/07875 | 2/2012 |
| ZA | 2011/04850 | 12/2012 |

OTHER PUBLICATIONS

John Wiley & Sons (hereinafter Wiley), Microsoft Office Outlook 2007 for Dummies (2006). (Year: 2006).*
Venolia et al, Supporting Email Workflow (2001).*
"Office Action Issued in Russian Patent Application No. 2005125836", dated Sep. 10, 2009, 6 Pages.
"Office Action Issued in Brazil Patent Application No. PI0615237-6", dated Apr. 2, 2018, 6 Pages.
"Final Office Action Issued in U.S. Appl. No. 14/816,844", dated Jan. 18, 2019, 20 Pages.
"NEO Pro—the total "find that email" solution!", Retrieved from <<http://www.caelo.com/products/learn/>>, Retrieved Date: Sep. 15, 2005, 1 Page.
"VisNetic Mail Flow", Retrieved from <<https://web.archive.org/web/20050924035746/http://www.deerfield.com/products/visnetic-mailflow/>>, Retrieved Date: Sep. 15, 2005, 1 Page.
"International Search Report and Written Opinion Issued in PCT Application No. PCT/US2009/044059", dated Nov. 30, 2009, 11 Pages.
"Amendment and Response Filed in U.S. Appl. No. 13/427,939", filed Aug. 3, 2016, 14 Pages.
"Amendment and Response Filed in U.S. Appl. No. 13/615,668", filed Jun. 2, 2016, 12 Pages.
"Amendment and Response Filed in U.S. Appl. No. 14/226,421", filed Jul. 25, 2016, 8 Pages.
"International Search Report & Written Opinion Issued in PCT Application No. PCT/US2009/044292", dated Dec. 24, 2009, 14 Pages.
"Office Action Issued in Israel Patent Application No. 209011", dated Dec. 25, 2013, 5 Pages.
"Office Action Issued in Thailand Patent Application No. 0501003163", dated Oct. 8, 2018, 4 Pages.
"Office Action Issued in Thailand Patent Application No. 0501003164", dated Oct. 11, 2018, 3 Pages.
"Non Final Office Action Issued in U.S. Appl. No. 13/437,031", dated Nov. 26, 2018, 8 Pages.
"Non Final Office Action Issued in U.S. Appl. No. 14/816,844", dated Nov. 5, 2018, 19 Pages.
"Notice of Allowance Issued in U.S. Appl. No. 14/981,404", dated Sep. 26, 2018, 10 Pages.
"Non Final Office Action Issued in U.S. Appl. No. 15/359,575", dated Oct. 2, 2018, 12 Pages.
"Non Final Office Action Issued in U.S. Appl. No. 15/670,765", dated Oct. 17, 2018, 11 Pages.
Shoup, Richard G., "Menu-Driven User Interfaces for Videographics", In Proceedings of the 17th Annual SMPTE Television Conference, Feb. 4, 1983, 3 Pages.
"First Examination Report Issued in Indian Patent Application No. 5323/CHENP/2011", dated Mar. 8, 2019, 7 Pages.
"First Examination Report Issued in Indian Patent Application No. 8285/CHENP/2011", dated Mar. 15, 2019, 7 Pages.
"Non Final Office Action Issued in U.S. Appl. No. 15/476,220", dated Mar. 21, 2019, 7 Pages.
"Office Action Issued in European Patent Application No. 09770706.1", dated Feb. 27, 2019, 5 Pages.
Notice of Allowance Issued in Korean Patent Application No. 10-2004-0048176, dated Jul. 12, 2013, 2 Pages.
"Non Final Office Action Issued in U.S. Appl. No. 14/816,844", dated Apr. 22, 2019, 19 Pages.
"Maintain" Merriam Webster's Collegiate Dictionary in the book of Merriam Webster's Collegiate Dictionary, 1997, 10th Edition pp. 702.
"Adobe Photoshop 7.0 for Windows Student Edition Complete", Retrieved from: https://www.salford.ac.uk/library/help/workbooks/photoshop7.pdf, 335 Pages.
"Google desktop search", Retrieved from: http://web.archive.org/web/20100924031219/http://www.pandia.com/resources/desktop.html, Sep. 22, 2010, 6 Pages.
"International Search Report Issued in PCT Application No. PCT/US2009/034618", dated Aug. 7, 2009, 12 Pages.
"Office Action Issued in Mexican Patent Application No. MX/a/2008/014849", dated Jan. 20, 2014, 6 Pages.
"Notice of Allowance Issued in U.S. Appl. No. 13/437,031", dated Jul. 2, 2018, 9 pages.
"Office Action Issued in European Patent Application No. 09767220.8", dated Apr. 11, 2017, 9 Pages.
"First Examination Report Issued in Indian Patent Application No. 8262/CHENP/2010", dated Jul. 19, 2018, 7 pages.

(56) References Cited

OTHER PUBLICATIONS

"Decision to Grant Issued in Russian patent Application No. 2014136806", dated Jun. 4, 2018, 29 Pages.
"Final Office Action Issued in U.S. Appl. No. 14/981,404", dated Jul. 30, 2018, 11 Pages.
"Office Action Issued in Mexican Patent Application No. PA/a/2005/008350", dated Jun. 11, 2013, 24 Pages (W/o English Translation).
"Office Action Issued in Mexican Patent Application No. MX/a/2008/003342", dated May 7, 2012, 8 Pages.
"MSN Desktop Search (beta)", Retrieved From http://www.pcmag.com/article2/0,1759,1771841,00.asp, Mar. 2, 2005, 2 Pages.
"Office 11 and Office Family Pre Release Program Installation Instructions", In Letter by Microsoft on Beta, 2002, 6 Pages.
"Office 2007", IT media News, IT media Inc, Retrieved from http://www.itmedia.co.jp/news/articles/0604/20/news063_3.html, Apr. 20, 2006, 6 Pages.
"Run for the Border: Using Borders in Word", Retrieved on: Feb. 7, 2014, Retrieved from https://web.archive.org/web/20160703125655/http://word.mvps.org:80/FAQs/TblsFldsFms/Borders.htm, 5 Pages.
"Office Action Issued in Mexican Patent Application No. MX/a/2008/002889", dated Sep. 20, 2012, 6 Pages.
"Office Action Issued in Mexican Patent Application No. PA/a/2005/008349", dated Dec. 3, 2009, 5 Pages.
"Screen Shot of MS Office 2003", Microsoft Office Professional Edition 2003, 2003, 6 Pages.
"Office Action Issued in Mexican Patent Application No. MX/a/2010/010506", dated Nov. 20, 2015, 7 Pages.
"Office Action Issued in Mexican Patent Application No. MX/a/2010/010506", dated Apr. 24, 2013, 3 pages.
"Office Action Issued in Mexican Patent Application No. MX/a/2010/014056", dated Feb. 6, 2013, 2 Pages.
"Screendumps—Microsoft Office Outlook", Microsoft Corporation, Microsoft Office Outlook Professional Edition 2003, 2 Pages.
"Software License Use Management (XSLM)", Retrieved From http://pubs.opengroup.org/onlinepubs/9691999399/toc.pdf, Mar. 1999, 286 Pages.
"Office Action Issued in Mexican Patent Application No. MX/a/2008/003342", dated Jan. 28, 2014, 4 Pages.
"Supplementary European Search Report Issued in European Patent Application No. 06790087.8", dated Dec. 2, 2008, 7 Pages.
Agha, Gul A.., et al. "Modular Heterogeneous System Development: A Critical Analysis of Java", In Proceedings of the Seventh Heterogeneous Computing Workshop 1998 (HCW 98), Mar. 30, 1998,12 Pages.
"Office Action Issued in Thailand Patent Application No. 0401003526", dated Aug. 31, 2016, 2 Pages.
"Search Report Issued in European Patent Application No. 04021618.6", dated May 24, 2005, 5 Pages.
"European Communication Issued in EP Patent Application No. 04102463.9", dated Oct. 20, 2005, 4 Pages.
"Office Action Issued in European Patent Application No. 04102463.9", dated May 31, 2006, 9 Pages.
"Office Action Issued in Canadian Patent Application No. 2848667", dated Feb. 19, 2015, 5 Pages.
"Office Action Issued in Mexican Patent Application No. PA/a/2005/008351", dated Dec. 1, 2009, 4 Pages.
"Office Action Issued in Thailand Patent Application No. 0501002670.", dated Jun. 13, 2018, 2 Pages.
"Office Action Issued in European Patent Application No. 05107151.8", dated Jul. 3, 2017, 6 pages.
"Search Report Issued in European Patent Application No. 05107184.3", dated Mar. 7, 2012, 7 Pages.
"Office Action Issued in Mexican Patent Application No. PA/a/2005/008351", dated Mar. 26, 2013, 27 Pages.
"Search Report Issued in European Patent Application No. 05107186.8", dated Mar. 26, 2012, 8 Pages.
"Office Action Issued in Mexican Patent Application No. PA/a/2005/008354", dated Apr. 24, 2012, 20 Pages.
"First Office Action Issued in Indian Patent Application No. 05584/CHENP/2010", dated Mar. 23, 2018, 7 Pages.

"European Search Report Issued in Application No. 06790087", dated Dec. 2, 2008, 7 Pages.
"Office Action Issued in Indian Patent Application No. 06296/CHENP/2008", dated Jul. 13, 2016, 9 Pages.
"Search Report Issued in European Patent Application No. 06790087.8", dated Jul. 22, 2016, 5 Pages.
"Office Action Issued in European Patent Application No. 06814358.5", dated Sep. 18, 2017, 6 Pages.
"Search Report Issued in European Patent Application No. 06814358.5", dated Apr. 7, 2010, 4 Pages.
"Office Action Issued in Indian Patent Application No. 8936/DELNP/2010", dated May 16, 2018, 7 Pages.
"Examination Report Issued in New Zealand Patent Application No. 541301", dated Nov. 8, 2006, 1 Page.
"Office Action Issued in Canadian Patent Application No. 2848700", dated Feb. 19, 2015, 4 Pages.
"Office Action Issued in European Patent Application No. 09727331.2", dated Jan. 5, 2016, 4 Pages.
"Office Action Issued in European Patent Application No. 09727331.2", dated Mar. 19, 2018, 4 Pages.
"Office Action Issued in Brazilian Patent Application No. PI04043766", dated Jul. 15, 2016, 4 Pages.
"Final Official Action Issued in U.S. Appl. No. 12/414,317", dated Aug. 29, 2012, 30 Pages.
"Non-Final Office Action Issued in U.S. Appl. No. 12/414,317", dated Jan. 25, 2013, 29 Pages.
"Non-Final Official Action Issued in U.S. Appl. No. 12/414,317", dated Jan. 17, 2012, 24 Pages.
"Office Action Issued in U.S. Appl. No. 12/414,317", dated Mar. 22, 2011, 40 Pages.
"Extended European Search Report Issued in European Patent Application No. PCT/US2009/034618", dated Aug. 7, 2009, 6 Pages.
"Office Action Issued in Brazilian Patent Application No. PI0503986-0", dated Apr. 27, 2018, 7 Pages.
"First Office Action Issued in Chinese Patent Application No. 200980124644.9", dated Feb. 29, 2012, 9 Pages.
"Non-Final Official Action Issued in U.S. Appl. No. 12/814,084", dated Jan. 19, 2012, 35 Pages.
"International Search Report & Written Opinion Issued in PCT Application No. PCT/US2011/037458", dated Feb. 9, 2012, 5 Pages.
"Third Office Action Issued in Chinese Patent Application No. 200980112454.5", dated Jul. 18, 2013, 7 Pages.
"Office Action Issued in Philippines Patent Application No. 12005000495.", dated Apr. 23, 2009, 2 Pages.
"Office Action Issued in Philippines Patent Application No. PH/1/2005/404", dated Jan. 23, 2006, 1 Page.
"Office Action issued in U.S. Appl. No. 13/102,622", dated Jun. 3, 2013, 5 Pages.
"Office Action Issued in U.S. Appl. No. 13/437,031", dated Feb. 23, 2018, 9 Pages.
"Fourth Office Action Issued in Chinese Patent Application No. 200980112454.5", dated Dec. 4, 2013,10 Pages.
"Final Office Action Issued in Chinese Patent Application No. 200980112454.5", dated Jun. 5, 2012, 8 Pages.
"Office Action Issued in Australian Patent Application No. 2009232301", dated Nov. 22, 2013, 3 Pages.
"Final Office Action Issued in U.S. Appl. No. 14/226,421", dated Apr. 27, 2018, 7 Pages.
"Final Office Action Issued in U.S. Appl. No. 14/816,844.", dated Apr. 18, 2018, 22 Pages.
"Final Office Action Issued in U.S. Appl. No. 14/841,698", dated Apr. 18, 2018, 27 Pages.
"Office Action Issued in Chilean Patent Application No. 1559-2010", dated Apr. 18, 2012, 7 Pages.
"Office Action Issued in Chile Patent Application No. 1560-2010", dated Dec. 24, 2010, 5 Pages.
"Office Action Issued in Chilean Patent Application No. 1560-2010", dated Apr. 18, 2012, 7 Pages.
"Office Action Issued in Israeli Patent Application No. 170668", dated Dec. 25, 2014, 2 Pages.

(56) References Cited

OTHER PUBLICATIONS

"Office Action Issued in Mexican Patent Application No. PA/a/2005/008350", dated Dec. 4, 2009, 4 Pages.
"Office Action Issued in Mexican Patent Application No. MX/a/2008/014849", dated May 14, 2013, 9 Pages.
"Office Action Issued in Mexican Patent Application No. MX/a/2008/014849", dated Sep. 12, 2012, 8 Pages.
"Office Action Issued in Chinese Patent Application No. 200910148820.4", dated Oct. 30, 2014, 14 Pages.
"Notice of Allowance Issued in Korean Patent Application No. 2008-7005659", dated Jul. 25, 2013, 2 Pages.
"Notice of Allowance Issued in Malaysian Patent Application No. PI 20080508", dated Mar. 15, 2016, 3 Pages.
"Office Action Issued in Norway Patent Application No. 20084584", dated Nov. 19, 2016, 4 Pages.
"Office Action Issued in India Patent Application No. 1921/DEL/2004", dated Sep. 12, 2014, 2 Pages.
"Office Action Issued in Israel Patent Application No. 194785", dated Feb. 28, 2012, 4 Pages.
"Office Action Issued in Israel Patent Application No. 194785", dated Jul. 29, 2015, 2 Pages.
"Office Action Issued in Canadian Patent Application No. 2,482,182", dated Feb. 26, 2016, 8 Pages.
"Office Action Issued in Canadian Patent Application No. 2,482,182", dated Nov. 26, 2013, 6 pages.
"Office Action Issued in Canadian Patent Application No. 2,482,182", dated Jun. 27, 2014, 4 pages.
"Second Office Action Issued in Canadian Patent Application No. 2,482,182", dated Feb. 20, 2015, 8 Pages.
"Office Action Issued in Canadian Patent Application No. 2,617,182.", dated Sep. 16, 2013, 2 Pages.
"Office Action Issued in Norway Patent Application No. 20084584", dated Dec. 19, 2017, 4 Pages.
"Notice of Allowance Issued in Russian Patent Application No. 2008109034", dated Mar. 21, 2011, 15 Pages.
"Office Action Issued in Australian Patent Application No. 2008005225", dated Apr. 15, 2009, 4 Pages.
"Office Action Issued in Chinese Patent Application No. 2006800304212", dated Apr. 3, 2009, 7 Pages.
"Office Action Issued in Japanese Patent Application No. 2014-188926", dated May 21, 2010, 3 Pages.
"Office Action Issued in Norway Patent Application No. 20054097.", dated May 11, 2015, 6 Pages.
"Office Action Issued in Norweign Patent Application No. 20053658", dated Dec. 16, 2014, 4 Pages.
"Office Action Issued in Norweign Patent Application No. 20053655", dated Dec. 16, 2014, 3 Pages.
"Office Action Issued in Norway Patent Application No. 20053655", dated Jul. 16, 2015, 2 Pages.
"Office Action Issued in Patent Application No. 200501770", dated May 27, 2008, 2 Pages.
"Notice of Allowance Issued in Japanese Patent Application No. 2005-236090", dated May 20, 2011, 6 Pages.
European Office Action Issued in Patent Application No. 06803424.8, dated Aug. 17, 2017, 12 Pages.
Woody Leonhard, et al., "Saving Time with Google", In Book—Windows XP Timesaving Techniques for Dummies, Wiley Publishing Inc., Jan. 13, 2005, pp. 229-238.
U.S. Appl. No. 14/226,421, Office Action dated Nov. 2, 2017, 8 pgs.
U.S. Appl. No. 14/665,112, USPTO Response after 312 Amendment dated Oct. 4, 2017, 2 pgs.
U.S. Appl. No. 14/981,404, Office Action dated Nov. 1, 2017, 16 pgs.
European Decision to Refuse in Application 09767220.8, dated Sep. 18, 2017, 4 pages.
U.S. Appl. No. 12/163,758, Notice of Allowance dated Apr. 4, 2013, 7 Pages.
Chinese Notice of Allowance Issued in Chinese Patent Application No. 200980124945.1, dated Jun. 26, 2013, 4 Pages.
Russian Notice of Allowance Issued in Russian Patent Application No. 2010153223, dated May 23, 2013, 20 Pages.
Japanese Notice of Allowance Issued in Japanese Patent Application No. 2011-516400, dated Apr. 2, 2013, 6 Pages.
Canadian Notice of Allowance Issued in Canadian Patent Application No. 2725298, dated Oct. 27, 2015, 1 Page.
Canadian Office Action Issued in Canadian Patent Application No. 2725298, dated Jun. 30, 2014, 1 Page.
Taiwan Notice of Allowance Issued in Taiwan Patent Application No. 98119245, dated Oct. 15, 2014, 4 Pages.
Canadian Office Action Issued in Canadian Patent Application No. 2848700, dated Sep. 29, 2017, 4 Pages.
Brazilian Office Action Issued in Brazil Patent Application No. PI0506081-8, dated Sep. 19, 2017, 5 Pages.
U.S. Appl. No. 14/816,844, Office Action dated Dec. 5, 2017, 27 pages.
Jensen Harris, "Picture This: A New Look for Office", Mar. 9, 2006; blogs.msdn.microsoft.com; pp. 1-91.
Scott Lowe, "An introduction to the Microsoft Office 2007 ribbon interface", Dec. 11, 2006; TechRepublic; pp. 1-11.
U.S. Appl. No. 14/841,698, Office Action dated Dec. 4, 2017, 29 pages.
European Supplementary Search Report Issued in European Patent Application No. 09770706.1, dated Nov. 14, 2017, 8 Pages.
"Search Report Issued in European Patent Application No. 09770705.3", dated Dec. 14, 2017, 8 Pages.
"Office Action Issued in European Patent Application No. 09798374.6", dated Jan. 19, 2018, 2 Pages.
"Office Action Issued in Canadian Patent Application No. 2724681", dated Oct. 16, 2015, 7 Pages.
"Office Action Issued in Canadian Patent Application No. 2724201", dated Aug. 3, 2015, 5 Pages.
"Final Office Action Issued in U.S. Appl. No. 10/780,547", dated Sep. 15, 2009, 20 Pages.
"Final Office Action Issued in U.S. Appl. No. 10/780,547", dated May 14, 2008, 16 Pages.
"Non-Final Office Action Issued in U.S. Appl. No. 10/780,547", dated Feb. 20, 2009, 20 Pages.
"Non-Final Office Action Issued in U.S. Appl. No. 10/780,547", dated Mar. 3, 2010, 20 Pages.
"Office Action Issued in Mexican Patent Application No. MX/a/2008/014849", dated Jan. 25, 2012, 8 Pages.
"Office Action Issued in Canadian Patent Application No. 2618169", dated Dec. 5, 2013, 3 Pages.
"Office Action Issued in Indonesian Patent Application No. W00200800746", dated Sep. 7, 2009, 2 Pages.
"Office Action Issued in Mexican Patent Application No. MX/a/2008/014849", dated May 3, 2017, 20 Pages.
"Non-Final Office Action Issued in U.S. Appl. No. 10/836,154", dated Jul. 24, 2008, 17 Pages.
"Office Action Issued in India Patent Application No. 1017/DEL2004", dated Oct. 21, 2013, 2 Pages.
"Office Action Issued in Canadian Patent Application No. 2617182", dated Sep. 30, 2014, 3 Pages.
"Office Action Issued in Israeli Patent Application No. 252770.", dated May 8, 2018, 2 Pages.
"Office Action Issued in Russian Patent Application No. 2512-2005", dated May 20, 2009, 4 Pages.
"Office Action Issued in Canadian Patent Application No. 2512155", dated Jul. 30, 2014, 8 Pages.
"Notice of Allowance Issued in Korean Patent Application No. 10-2005-0067236", dated Mar. 12, 2012, 2 Pages.
"Office Action Issued in Canadian Patent Application No. 2512102", dated Nov. 15, 2013, 3 Pages.
"Office Action Issued in Canadian Patent Application No. 2512102", dated Nov. 23, 2012, 5 Pages.
"Office Action Issued in Canadian Patent Application No. 2512102", dated Jul. 30, 2014, 7 Pages.
"Office Action Issued in Canadian Patent Application No. 2512047", dated Oct. 30, 2013, 3 Pages.
"Office Action Issued in Korean Patent Application No. 10-2010-7024459", dated Nov. 25, 2015, 5 Pages.

(56) References Cited

OTHER PUBLICATIONS

"Office Action Issued in Korean Patent Application No. 10-2010-7024459", dated May 18, 2015, 4 Pages.
"Office Action Issued in Canadian Patent Application No. 2512047", dated Nov. 29, 2012, 4 Pages.
"International Search Report and Written Opinion Issued in PCT Application No. PCT/US2006/035079", dated Feb. 26, 2007, 10 Pages.
"Office Action Issued in Korean Patent Application No. 10-2016-7024123", dated Nov. 18, 2016, 6 Pages.
"Office Action Issued in Korean Patent Application No. 10-2016-7024123", dated May 31, 2017,12 Pages.
"Office Action Issued in European Patent Application No. 10775348.5", dated Nov. 2, 2015, 7 Pages.
"Office Action Issued in European Patent Application No. 10775348.5", dated Mar. 3, 2015, 3 Pages.
"Office Action Issued in Canadian Patent Application No. 2512036", dated Sep. 4, 2014, 3 Pages.
"Office Action Issued in Canadian Patent Application No. 2512036", dated Nov. 29, 2012, 2 Pages.
"Office Action Issued in Canadian Patent Application No. 2512036", dated Sep. 18, 2013, 3 Pages.
"Final Office Action Issued in U.S. Appl. No. 12/059,644", dated Jan. 25, 2012,16 Pages.
"Final Office Action Issued in U.S. Appl. No. 12/059,644", dated Jun. 21, 2013, 19 Pages.
"Non Final Office Action Issued in U.S. Appl. No. 12/059,644", dated Aug. 29, 2012, 19 Pages.
"Non Final Office Action Issued in U.S. Appl. No. 12/059,644", dated Jun. 7, 2011, 15 Pages.
"Non Final Office Action Issued in U.S. Appl. No. 12/059,644", dated Feb. 14, 2014, 21 Pages.
"Non Final Rejection Issued in U.S. Appl. No. 12/059,644", dated Feb. 16, 2016, 29 Pages.
"Office Action Issued in U.S. Appl. No. 12/059,644", dated Jul. 22, 2015, 35 Pages.
"Office Action Issued in U.S. Appl. No. 12/059,644", dated Sep. 29, 2014, 37 Pages.
"Office Action Issued in Canadian Patent Application No. 2511101", dated Nov. 29, 2012, 3 Pages.
"Office Action Issued in Patent Application No. 201101987", dated Jul. 29, 2013,12 Pages.
"Final Office Action Issued in U.S. Appl. No. 12/414,317", dated Aug. 6, 2013, 26 Pages.
"Second Office Action Issued in Russian Patent Application No. 2010140069", dated Aug. 15, 2013, 3 Pages.
"Office Action Issued in Brazilian Patent Application No. PI0615782-3", dated Dec. 20, 2017, 5 Pages.
"Office Action Issued in Brazilian Patent Application No. PI0404376-6", dated Mar. 6, 2017, 6 Pages.
"International Search Report & Written Opinion Issued in PCT Application No. PCT/US2009/34618", dated Aug. 7, 2009, 12 Pages.
"Office Action Issued in Russian Patent Application No. 2005120363", dated Jun. 24, 2009, 5 Pages.
"2007 Microsoft Office System Is Golden", Microsoft News Center, Nov. 6, 2006, 23 Pages.
"About Google Desktop Search", http://www.desktop.google.com/about.html, Oct. 15, 2004, 8 pages.
"Convert to Word 2007," http://www.regencytraining.com/word-2007-conversion.html, Regency Training and Consulting, 2 pages (Date Printed Apr. 21, 2008).
"Create Office add-ins: ribbons, toolbars, taskpanes, menus etc.", http://www.add-in-express.com/creating-addins-blog/feed/, Jul. 4, 2007, 49 pgs. (added per B. Haslam, Jan. 26, 2011, references cited from U.S. Pat. No. 7,802,199 Sep. 21, 2010 Patent).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).

"ID & Class Selectors, Pseudoclasses," http://www.webreference.com/html/tutorial5/6.html, Aug. 20, 1998, 3 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs. (cited in Feb. 15, 2012 Search Report) (also cited in EESR Jan. 10, 2013 in 325993.09).
"Inter-Widget Communication," http://web.mit.edu/6.115/www/miscfiles/amulet/amulet-help/IWC.htm, 6 pages (Feb. 13, 2007).
"Look and Layout", retrieved at <<http://liv.ac.uk/csd/email/outlook/layout.htm>>, University of Liverpool, retrieved Mar. 3, 2008, 9 pgs. (Search Rpt).
"Lookout", http://www.lookoutsoft.com, Apr. 22, 2005, 20 pages.
"Menu Selection Method for Related Attributes"; IBM Technical Disclosure Bulletin, International Business Machines Corp., vol. 33, No. 6B, Nov. 1990, 3 pgs. (cited in Feb. 15, 2012 Search Report).
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Microsoft Enters Desktop Search Fray", http://www.internetnews.com/ent-news/article.php/3447331, Dec. 13, 2004, 5 pages.
"Microsoft Office 2003 Editions Product Guide", Published on: Sep. 2003, Available at: tp://www.google.ca/url?sa=t&rct=j&q=&esrc=s&frm=1&source=web&cd=3&ved=0CCoQFjAC&url=http%3A%2F%2Fdownload.microsoft.com%2Fdownload%2F0%2Ff%2F1%2F0f1d5b1f-53bc-47c3-bf6f-ac6d67cf9766%2FOffice2003Guide.doc&ei=CKTkVPBCgb-xBL6qgvAH&usg=AFQjCNEpNk4IFH6m27BXr48lKv1kRXo_xA, 167 pgs. (cited in Feb. 19, 2015 CA OA).
"Microsoft Office Professional Plus 2007", © 2006, Microsoft Corporation; 66 pgs. (cited in NOA Dec. 3, 2010).
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
"Preview Pane in Conversation: 4 pane view", 2005, Zinbra Inc., retrieved Mar. 3, 2008, 3 pgs. (Search Rpt).
"Primary Windows," Accessed at http://www-03.ibm.com/servers/eserver/iseries/navigator/guidelines/primary.html on Feb. 23, 2007, 23 pgs.
"Reading Pane in Conversation View", retrieved at <<http://www.zimbra.com/forums/users/5918-reading-pane-conversation-view.html>>, retrieved Mar. 3, 2008, 5 pgs. (Search Rpt).
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx (added per B. Haslam, Jan. 26, 2011, references cited from U.S. Pat. No. 7,802,199 Sep. 21, 2010 Patent).
"Separate Structure and Presentation," http://www.webreference.com/html/tutorial5/1.html, Aug. 20, 1998, 4 pgs.
"TeeChart for .NET Charting Control," Steema Software; accessed at: http://www.teechart.net/; accessed on Jan. 11, 2006.
"The New "Office 2007" User Interface", Microsoft Corporation © 2005, 32 pgs. (cited in IDS filed May 11, 2009).
"The New Look in Office 12 / Office 2007", Office Watch, posted Sep. 20, 2005, 9 pgs. (cited in IDS filed May 11, 2009).
"The Style Element & CSS Selectors," http://www.webreference.com/html/tutorial5/4.html, Aug. 20, 1998, 3 pgs.
"The Technology in Document and Check Security," http://www.securedoc.in/thetechnology.htm, 7 pages (Date Printed Apr. 21, 2008).
"User Interface Architecture", Retrieved from <<http://www.datamaster2003.com/uiarchitecture.htm>>, 2003, 2 Pages.
"What's Hot in Internet Services?" http://www.webreference.com/html/tutorial5/3, Aug. 20, 1998, 3 pgs.
"What's New in Excel 2007", Feb. 26, 2007 (added per B. Haslam, Jan. 26, 2011, references cited from U.S. Pat. No. 7,802,199 Sep. 21, 2010 Patent).
"Windows Desktop Search". Http://kunal.kundale.net/reviews/wds.html, Jul. 10, 2005, 7 pages.
"Yahoo to test desktop search", http://news.com.com/yahoo+to+test+desktop+searcach/2100-1032_3-5486381.html, Dec. 9, 2004, 6 pages.

(56) References Cited

OTHER PUBLICATIONS

"Managing the Code Editor and View" Microsoft Corporation, http://msdn.microsoft.com/en-us/library/z01zks9a(VS.71).aspx, 2008.
"Omni Web Help," Omni Group, 2004, http://www.omnigroup.com/documentation/omniweb/browser/tabs.html, 2 pages.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
Adler, "Emerging Standards for Component Software," Cybersquare, 1995 IEEE, 10 pgs. (added per B. Haslam, references cited from U.S. Pat. No. 7,865,868 Jan. 4, 2011 Patent).
Agarwal, Vikash K., "Creating a Visually Arresting User-Interface: A3D Tab Control Example," Jan. 4, 2008, http://microsoft.apress.com/asptodayarchive/71723/creating-a-visually-arresting-user-interface-a-3d-tab-control-example, 12 pages.
Akamatsu, "Touch with a Mouse, A Mouse Type Interface Device with Tactile and Force Display"; © IEEE; 1995; 5 pgs. (cited in Nov. 24, 2014 NOA).
Alexander, Keeping New Messages Marked 'Unread' (2007), http://certcities.com/editorial/colums/story.asp?EditorialsD=243, 2 pgs. (cited in Dec. 31, 2012 OA).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Andrew Dwelly, "Functions and Dynamic User Interface," 1989, ACM, pp. 371-381.
Aoyagi, Hideo, "Mail Mac Fan Special 33"; Manichi Communications Inc., Mar. 1, 2004, 5 pgs. (cited in JP NOR Nov. 25, 2011).
Atwood, "Sometime a Word is Worth a Thousand Icons", Coding Horror, Feb. 22, 2006, 9 pgs. (cited in IDS filed May 11, 2009).
Australia Notice of Allowance Issued in Patent Application No. 2010216342, dated Jun. 25, 2014, 2 Pages.
Australian Notice of Allowance Issued in Patent Application No. 2005203411, dated Jul. 15, 2010, 3 Pages.
Australian Notice of Allowance Received for Australia Patent Application No. 2009262833, dated Apr. 16, 2014, Filed Date: Jun. 5, 2009, 2 Pages.
Australian OA dated Jan. 17, 2011 cited in Application No. 2006287408; 2 pgs.
Australian Office Action dated Apr. 30 2014 in Appln No. 2010247882, 3 pgs.
Australian Office Action dated Apr. 8, 2010 cited in Appln No. 2005203410; 2 pgs.
Australian Office Action dated Aug. 31, 2011 cited in Appln. No. 2007255043; 3 pgs.
Australian Office Action dated Feb. 28, 2014 in Appln No. 2009262833, 3 pgs.
Australian Office Action dated Feb. 28, 2014 in Appln No. 2009262834, 3 pgs.
Australian Office Action dated Mar. 25, 2010 cited in Appln No. 2005203411, 2 pgs.
Australian Office Action dated Mar. 25, 2010 cited in Appln No. 2005203412; 2 pgs.
Australian Office Action dated Mar. 26, 2010 cited in Appln No. 2005203409; 1 pg.
Australian Office Action dated Mar. 4, 2014 in Appln No. 2009260596, 4 pgs.
Australian Office Action dated Mar. 4, 2014 in Appln No. 2009271517, 3 pgs.
Australian Office Action dated May 28, 2010 cited in Appln No. 2005202717; 2 pgs.
Australian Office Action dated Oct. 21, 2010 cited in Appln No. 2006284908; 2 pgs.
Australian Office Action Issued in Patent Application No. 2010216342, dated Mar. 14, 2014, Filed Date: Jan. 22, 2010, 3 Pages.
Australian Search Report dated Jan. 16, 2007 cited in Singapore Application No. 200504474-8; 8 pgs.
Australian Second Office Action dated Apr. 29, 2014 in Appln No. 2009271517, 3 pgs.
Australian Second Office Action Issued in Patent Application No. 2010216342, dated May 12, 2014, Filed Date: Jan. 22, 2010, 3 Pages.
Australian Written Opinion/Search Report cited in Singapore Application No. 200505257-6 dated Feb. 12, 2007; 6 pgs.
AutoCAD 2011—Customization Guide; Feb. 2010; Autodesk, Inc.; http://images.autodesk.com/adsk/files/acad_acg.pdf; 554 pgs. (Cited in Apr. 10, 2012 NOA).
Baker; "Configuring the Pages Pane in Acrobat"; Apr. 22, 2004; Planet PDF; 4 pgs. (cited in Mar. 19, 2015 NOA).
Barr, Jim, "Gmail Tips—The Complete Collection", Retrieved Date: Dec. 15, 2004, https://web.archive.org/web/20041215091758/http://g04.com/misc/GmailTipsComplete.html,18 pgs.
Bateman, et al., "Towards Constructive Text, Diagram, and Layout Generation for Information Presentation", In Association for Computational Linguistics, vol. 27, Issue 3, Sep. 2001, pp. 409-449.
Becker et al., "Virtual Folders: Database Support for Electronic Messages Classification," Pontificia Universidade Catolica do Rio Grande do Sul, Porto Alegre, Brazil, pp. 163-170, Oct. 1997.
Bellavista et al., "A Mobile Agent Infrastructure for Terminal, User, and Resource Mobility", Network Operations and Management Symposium, IEEE NOMS 2000, pp. 877-890, 2000.
Berliner E.M. et al., "Microsoft Office 2003", Feb. 24, 2004, p. 173-178 [D2], "Using the Insert Menu. Inserting and Formatting a Picture in Word", 13 pgs.
Berliner E.M. et al., "Microsoft Office 2003", Feb. 24, 2004, p. 39-40, 120-124, 175-177, 233-234 [D1], "Viewing a Document in the Microsoft Office 2003 Application Window",23 pgs.
Bill Dyszel, Microsoft Outlook 2000 for Windows for Dummies, Copyright 1999, pp. 82-86, 102-103, 141,143.
Billo, E. Joseph. "Creating Charts: An Introduction," in Excel for Chemists: A Comprehensive Guide, http://www.ahut.edu.cn/yxsz/ahk/Teaching/Excel%for%20Chemists/ChQ2.pdf, Second Edition, John Wiley & Sons, Mar. 16, 2001; 9 pages.
Bos, B, "Re: a proposal for addition to HTML 3.0: Frames," http://www.nyct.net/~aray/htmlwg/95q3/1141.html, 5 pages (Sep. 21, 1995).
Boyce, "Microsoft Outlook Inside Out," 2001, pp. 133, 134, 721-728.
Boyce, "Microsoft Outlook Inside Out," 2001, pp. 67, 68, 109, 110, 230, 231, 310, 316-318, 798.
Budinsky et al., "WebSphere Studio Overview," http://researchweb.watson.ibm.com/journal/sj/432/budinsky.html, May 6, 2004, 25 pgs.
Camarda, Using Microsoft Word 97, copyright 1997, QUE Corporation, pp. 412, 869.
Canada Notice of Allowance Issued in Patent Application No. 2,848,667, dated Oct. 6, 2015, 1 Page.
Canadian Notice of Allowance dated Jun. 2, 2015 in Appln No. 2,512,036, 1 pg.
Canadian Notice of Allowance in Application 2750422, dated Mar. 10, 2016, 1 page.
Canadian Notice of Allowance Issued in Patent Application No. 2512047, dated Oct. 2, 2014, 1 Page.
Canadian Office Action dated Apr. 25, 2014 in Appln No. 2,512,155, 9 pgs.
Canadian Office Action dated Aug. 3, 2015 in Appln No, 2,724,201, 5 pgs.
Canadian Office Action dated Dec. 5, 2013 in Appln No. 2,618,169, 3 pgs.
Canadian Office Action dated Feb. 19, 2015 in Appln No. 2,848,667, 5 pgs.
Canadian Office Action dated Feb. 19, 2015 in Appln No. 2,848,700, 4 pgs.
Canadian Office Action dated Jan. 18, 2013 in Appln No. 2,512,155, 6 pgs.
Canadian Office Action dated Jan. 28, 2014 in Appln No. 2,511,101, 4 pgs.

(56) References Cited

OTHER PUBLICATIONS

Canadian Office Action dated Jul. 14, 2015 in Appln No, 2,725,046, 5 pgs.
Canadian Office Action dated Jul. 30, 2014 cited in Appln No. 2,512,102, 7 pgs.
Canadian Office Action dated Jul. 30, 2014 cited in Appln No. 2,512,155, 8 pgs.
Canadian Office Action dated May 26, 2015 cited in Appln No. 2,618,169, 4 pgs.
Canadian Office Action dated Nov. 15, 2013 in Appln No. 2,512,102; 3 pgs.
Canadian Office Action dated Nov. 23, 2012 cited in Appln No. 2,512,102; 5 pgs.
Canadian Office Action dated Nov. 29, 2012 cited in Appln No. 2,511,101 3 pgs.
Canadian Office Action dated Nov. 29, 2012 cited in Appln No. 2,512,036, 2 pgs.
Canadian Office Action dated Nov. 29, 2012 cited in Appln No. 2,512,047; 4 pgs.
Canadian Office Action dated Oct. 16, 2015 in Appln No. 2,724,681, 7 pgs.
Canadian Office Action dated Oct. 30, 2013 in Appln No. 2,512,047; 3 pgs.
Canadian Office Action dated Oct. 7, 2013 in Appln No. 2,650,016; 2 pgs.
Canadian Office Action dated Sep. 18, 2013 in Appln No. 2,512,036; 3 pgs.
Canadian Office Action dated Sep. 30, 2014 in Appln No. 2,617,182, 3 pgs.
Canadian Office Action dated Sep. 4, 2014 in Appln No. 2,512,036, 3 pgs.
Canadian Office Action in Application 2512155, dated Aug. 26, 2016, 4 pgs.
Canadian Office Action Issued for Patent Application No. 2618169, dated Sep. 9, 2014, 4 pgs.
Canadian Office Action Issued in Application No. 2,848,700, dated Oct. 15, 2015, 4 Pages.
Canadian Office Action Issued in Patent Application No. 2,512,155, dated Nov. 30, 2015, 7 Pages.
Canadian Office Action Issued in Patent Application No. 2724681, dated Apr. 15, 2016, 5 Pages.
Canadian Office Action Issued in Patent Application No. 2848700, dated May 2, 2016, 04 Pages.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007] (added per B. Haslam, references cited from U.S. Pat. No. 7,865,868 Jan. 4, 2011 Patent).
Changing a Graph Type: Ultimate Illustration of Excel 2002 for Windows XP, General Book, X-media Corp., Aug. 31, 2002, p. 224 (cited in May 11, 2012 JP NOR).
Charles Rich et al., "Adding a Collaborative Agent to Graphical User Interfaces," 1996, ACM, pp. 21-30.
Charles Rich et al., "Segmented Interaction History in a Collaborative Interface Agent," 1997, ACM, pp. 23-30.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Chile Office Action Issued in Patent Application No. 1770-2005, dated Feb. 9, 2010, 7 Pages. (W/out English translation).
Chile Office Action Issued in Patent Application No. 1770-2005, dated Mar. 13, 2009, 10 Pages, with English translation.
Chilean Notice of Allowance in Application 201101987, dated Mar. 30, 2016, 2 pgs; (w/o English translation).
Chilean Office Action dated Mar. 28, 2008 cited in Appln No. 1770-05, no English Translation; 5 pgs.
Chilean Office Action dated Mar. 29, 2012 cited in Appln No. 1559-2010, w/English Language Summary; 7 pgs.
Chilean Office Action dated Mar. 29, 2012 cited in Appln No. 1560-2010, w/English Language Summary; 7 pgs.
Chilean Office Action dated Mar. 30, 2014 in Appln No. 2804-2011, 7 pgs.
Chilean Office Action dated Nov. 27, 2008 cited in Appln No. 1768-2005; 10 pgs.
Chilean Office Action dated Nov. 27, 2008 cited in Appln No. 1769-2005; 11 pgs.
Chilean Office Action dated Oct. 24, 2014 in Appln No. 2804-2011, 5 pgs. (w/o English Translation).
Chilean Office Action dated Sep. 23, 2008 cited in Appln No. 1770-2005; 10 pgs.
Chilean Office Action in Application 200501769, dated Sep. 2, 2016, 2 pgs. (no English translation).
Chilean Office Action in Application 200501770, dated Sep. 2, 2016, 2 pgs. (no English translation).
Chilean Office Action in Appln No. 2005-01769, dated Jul. 15, 2005, 11 pgs. (with English translation).
Chilean Office Action Received in Patent Application No. 2804-2011, dated Apr. 4, 2014, 7 Pages. (w/o English Translation).
Chilean Second Office Action dated Dec. 4, 2009 cited in Appln No. 1768-2005; 6 pgs.
Chilean Second Office Action dated Jan. 29, 2010 cited in Appln No. 1769-2005; 7 pgs.
Chilean Second Office Action dated Jun. 6, 2014 in Appln No. 1987-2011, 12 pgs.
Chilean Second Office Action dated Mar. 4, 2009 cited in Appln No. 2512-2005; 12 pgs.
Chilean Second Office Action dated Nov. 21, 2012 cited in Appln No. 1559-2010; 6 pgs.
Chilean Second Office Action dated Nov. 4, 2009 cited in Appln No. 1770-2005; 2 pgs.
Chilean Second Office Action dated Sep. 21, 2012 cited in Appln No. 1560-2010, w/English Language Summary; 8 pgs.
Chilean Third Office Action dated Oct. 9, 2013 in Appln No. 2512-2005; 7 pgs.
Chinese 2nd Notice on Reexamination dated Mar. 25, 2011 cited in Appln No. 200510089514.X; 9 pgs.
Chinese Decision on Reexamination dated Feb. 1, 2012 cited in Appln No. 200510089514.X; 23 pgs.
Chinese Decision on Reexamination dated Nov. 18, 2014 in Appln. No. 200910148820.4, 15 pgs.
Chinese Decision on Rejection dated Jan. 13, 2014 in Appln No. 200980124644.9, 9 pgs.
Chinese Decision on Rejection dated Jul. 21, 2011 cited in Appln No. 20068032789.2; 11 pgs.
Chinese Decision on Rejection dated Jul. 31, 2012 cited in Appln No. 200680018095.3; 17 pgs.
Chinese Decision on Rejection dated Mar. 7, 2012 cited in Appln No. 200780020312.7; 5 pgs.
Chinese Fifth Office Action dated Dec. 16, 2015 in Appln No. 200910148820.4, 6 pgs.
Chinese First Office Action dated Apr. 11, 2008 cited in Appln No. 200510092141.1; 22 pgs.
Chinese First Office Action dated Apr. 18, 2008 cited in Appln No. 200510092142.6; 22 pgs.
Chinese First Office Action dated Mar. 21, 2008 cited in Appln No. 200510092139.4; 25 pgs.
Chinese First Office Action dated Mar. 21, 2008 cited in Appln No. 200510092146.4; 21 pgs.
Chinese First Office Action dated May 23, 2008 cited in Appln No. 200510089514.X; 16 pgs.
Chinese Fourth Office Action dated Apr. 23, 2013 cited in Appln No. 200980124944.7, 7 pgs.
Chinese Fourth Office Action dated Apr. 27, 2012 cited in Appln No. 200680018095.3; 8 pgs.
Chinese Fourth Office Action dated Aug. 3, 2015 in Appln No. 200910148820.4, 6 pgs.
Chinese Fourth Office Action dated Feb. 15, 2015 in Appln No. 200780020312.7, 9 pgs.
Chinese Notice of Allowance Issued in Patent Application No. 200510092142.6, dated Jun. 18, 2010, 4 Pages.
Chinese Notice on Reexamination dated Jan. 21, 2011 cited in Appln No. 200510089514.X; 8 pgs.

(56) References Cited

OTHER PUBLICATIONS

Chinese Notice on Reexamination dated Jul. 8, 2015 cited in Appln No. 200980124644.9, 8 pgs.
Chinese Notice on Third Office Action dated Jun. 5, 2013 cited in Appln No. 200980124644.9; 10 pgs.
Chinese Office Action dated Apr. 3, 2009 cited in Appln No. 200510089514.X; 7 pgs.
Chinese Office Action dated Aug. 2, 2012 in Appln No. 200980124945.1; 8 pgs.
Chinese Office Action dated Feb. 29, 2012 cited in Appln No. 200980124664.9; 9 pgs.
Chinese Office Action dated Feb. 5, 2013 cited in Appln No. 200910148820.4, 5 pgs.
Chinese Office Action dated Jan. 22, 2010 cited in Appln No. 200680032564.7; 2 pgs.
Chinese Office Action dated Jan. 6, 2013 in Appln No. 201080021957.4, 9 pgs.
Chinese Office Action dated Jul. 12, 2012 in Appln No. 201080008789.5; 8 pgs.
Chinese Office Action dated Jul. 2, 2012 in Appln No. 200980124944.7; 8 pgs.
Chinese Office Action dated Jul. 3, 2009 cited in Appln. No. 200680018095.3; 14 pgs.
Chinese Office Action dated Mar. 11, 2010 cited in Appln No. 200780020312.7; 8 pgs.
Chinese Office Action dated Nov. 11, 2010 cited in CN Application No. 200680032789.2, w/translation; 11 pgs.
Chinese Office Action dated Nov. 18, 2011 cited in Appln. No. 200910148820.4; 10 pgs.
Chinese Office Action dated Nov. 27, 2009 cited in Appln No. 200680033212.3; 8 pgs.
Chinese Office Action dated Nov. 29, 2011 cited in Appln. No. 200980124383.0; 9 pgs.
Chinese Office Action dated Oct. 16, 2009 cited in Appln No. 200510092142.6; 9 pgs.
Chinese Office Action dated Sep. 15, 2014 in Appln No. 201210079579.6, 11 pgs.
Chinese Second Office Action dated Apr. 7, 2011 cited in Application No. 200680032789.2, w/translation; 9 pgs.
Chinese Second Office Action dated Aug. 5, 2013 in Appln No. 201080021957.4; 12 pgs.
Chinese Second Office Action dated Dec. 17, 2012 cited in Appln No. 200980124644.9, 10 pgs.
Chinese Second Office Action dated Dec. 31, 2012 in Appln No. 200980124945.1, 8 pgs.
Chinese Second Office Action dated Jan. 4, 2013 in Appln No. 201080008789.5, 8 pgs.
Chinese Second Office Action dated Jul. 14, 2011 cited in Appln No. 20680018095.3; 19 pgs.
Chinese Second Office Action dated Jul. 6, 2010 cited in Appln No. 200680033212.3; 6 pgs.
Chinese Second Office Action dated Jun. 18, 2012 in Appln No. 200910148820.4; 6 pgs.
Chinese Second Office Action dated Mar. 9, 2012 cited in Appln No. 200980124383.0; 10 pgs.
Chinese Second Office Action dated May 19, 2011 cited in Appln No. 200780020312.7; 9 pgs.
Chinese Second Office Action dated Nov. 21, 2008 cited in Appln No. 200510089514.X; 14 pgs.
Chinese Second Office Action dated Oct. 10, 2008 cited in Appln No. 200510092141.1; 22 pgs.
Chinese Second Office Action dated Oct. 17, 2008 cited in Appln No. 200510092139.4; 19 pgs.
Chinese Second Office Action dated Oct. 29, 2010 cited in Appln No. 200680030421.2; 13 pgs.
Chinese Second Office Action dated Sep. 12, 2012 in Appln No. 200980124944.7; 13 pgs.
Chinese Third Office Action dated Apr. 3, 2014 in Appln No. 201080021957.4, 6 pgs.
Chinese Third Office Action dated Aug. 12, 2014 cited in Appln No. 200780020312.7, 13 pgs.
Chinese Third Office Action dated Aug. 14, 2012 in Appln No. 200980124383.0; 8 pgs.
Chinese Third Office Action dated Dec. 31, 2012 in Appln No. 200980124944.7, 14 pgs.
Chinese Third Office Action dated Dec. 4, 2013 in Appln No. 200680032789.2; 6 pgs.
Chinese Third Office Action dated Dec. 5, 2011 cited in Appln. No. 200680018095.3; 6 pgs.
Chinese Third Office Action dated Feb. 10, 2011 cited in Appln No. 200680033212.3; 7 pgs.
Chinese Third Office Action dated Feb. 12, 2010 cited in Appln No. 200510092142.6; 7 pgs.
Chinese Third Office Action dated Feb. 2, 2015 in Appln No. 200910148820.4, 12 pgs.
Chinese Third Office Action dated Jun. 19, 2009 cited in Appln No. 200510092139.4; 7 pgs.
Chinese Third Office Action dated Jun. 21, 2011 cited in Appln No. 200680030421.2; 8 pgs.
Clifton, The Application Automation layer—Using XML to Dynamically Generale GUI Elements—forms and controls, The Code Project, Jun. 2003, pp. 1-37.
Cole; "New Arrival! Forefront of Downloading"; Mac People; vol. 11, No. 10; ASCII Corporation; Aug. 31, 2005; 1 pg. (cited in JP NOR Nov. 25, 2011).
European Communication Pursuant to Rule 69 EPC Issued in European Patent Application 05107153.8, dated Apr. 2, 2012, 1 Page.
Danish Search Report Appl. No. SG 200504475-5 dated Sep. 19, 2006; 6 pgs.
Danish Written Opinion Appl. No. SG 200504508-3 dated Sep. 18, 2006; 9 pgs.
De Candussio, N., "Common GUI Features Report," Herschel CSDT Meeeting, pp. 1-21 (Sep. 2007).
Douglas et al., "Dynamic Popup Menu Titles"; IP.Com Journal, ip.com Inc., West Henrietta, NY, Aug. 1, 1992, 2 pgs. (cited in Feb. 28, 2012 Search Report).
Dr. Dobb's Journal; "Windows 95 Common Controls"; May 1, 1995; 12 pgs. (cited in Dec. 6, 2011 EP Search Rpt).
Egypt Official Decision dated Mar. 14, 2011 cited in Appln No. 2005080371; 2 pgs.
Egyptian Office Action Issued in Patent Application No. 3712005, dated Apr. 9, 2010, 4 Pages.
Embedding and Linking Excel Worksheets into Word; 2001, The McGraw-Hill Companies, Inc, 6 pgs. (cited in Dec. 24, 2014 OA).
EP Communication dated Feb. 11, 2014 cited in Appln No. 09 798 374.6, 6 pgs.
EP Communication dated Jan. 10, 2013 cited in Appln No. 10744106.5, PCT/US2010/021888, 8 pgs. (also known as EP10744106.5).
EP Communication dated Jan. 27, 2014 in Appln No. 09 767 2208, 7 pgs.
EP Communication dated Jul. 17, 2013 in Appln No. EP 07 795 391.7; 9 pgs.
EP Communication dated Jun. 2, 2014 in Appln No. 07 795 391.7, 9 pgs.
EP Communication dated Mar. 23, 2016 in Appln No. 06 790 087.8, 6 pgs.
EP Communication dated May 18, 2015 cited in 10 775 348.5, 7 pgs.
EP Communication dated Sep. 26, 2012 cited in Appln No. PCT/US2006/034993; 10 pgs. (also known as EP 06814334.6).
EP Communication on Decision to Refuse dated Feb. 20, 2014 cited in Appln No. 09 006 972.5, 19 pgs.
EP Search Report dated Apr. 18, 2013 in Appln No. PCT/US2006/012724, 12 pgs. (also known as EP 06814334.6).
EP Search Report dated Jan. 30, 2013 in Appln No. PCT/US2009/044059, 8 pgs. (also known as EP 09767220.8).
EP Search Report dated Jun. 2, 2014 in Appln No. PCT/US2010/034277, 6 pgs.
EP Search Report dated May 10, 2013 cited in Appln No. PCT/US2009/044292; 6 pgs. (also known as EP09798374.6).

(56) References Cited

OTHER PUBLICATIONS

EP Summons to Attend Oral Proceedings dated Oct. 4, 2013 in Appln No. 09 006 972.5; 13 pgs.
European Communicated dated Oct. 20, 2005 cited in EP Application No. 04102463.0-2211 PCT; 4 pgs.
European Communication dated Sep. 14, 2009 cited in Appln. No. 07795391.7-1225; 5 pgs.
European Communication dated Sep. 28, 2009 cited in Appln No. 09006972.5-2211; 6 pgs.
European Extended Search Report in Application No. 10775348.5, dated Jun. 2, 2014, 6 Pages.
European Office Action dated Jun. 15, 2010 cited in EP Application No. 06814358.5; 1 pg.
European Office Action in Application 05107153.8, dated Jul. 22, 2016, 6 pgs.
European Office Action in Application 05107186.8, dated Jul. 27, 2016, 6 pgs.
European Office Action in Appln No. 05107157.9, dated Jul. 20, 2016, 6 pgs.
European Office Action Issued in Patent Application 05107153.8, dated Apr. 2, 2012, 1 Page.
European Office Action dated Mar. 9, 2009, Application No. 06790087. 8; 5 pgs.
European Search Report dated Dec. 6, 2011 cited in Appln No. 06803424.8; 8 pgs.
European Search Report dated Feb. 23, 2012 cited in Appln No. 05107153.8; 8 pgs.
European Search Report dated Feb. 28, 2012 cited in Appln No. 05107184.3; 8 pgs. (alternative dated Feb. 28, 2012—same report).
European Search Report dated Mar. 1, 2012 cited in Appln No. 05107157.9; 8 pgs.
European Search Report dated Mar. 26, 2012 cited in Appln No. 05107186.6; 8 pgs.
European Search Report dated Nov. 25, 2008 cited in Application EP 06 79 0087; 2 pgs.
European Search Report dated Sep. 7, 2009 cited in EP Application No. 09006972.5-2211; 5 pgs. (alternative date is Sep. 15, 2009).
European Search Report Issued in Patent Application No. 09727331. 2, dated Aug. 1, 2014, 1 Page.
European Summons to Attend Oral Proceedings dated Jun. 23, 2008 cited in Appln No. 04102463.9; 76 pgs.
Feiner, Steven, "A Grid-Based Approach to Automating Display Layout", In Book Readings in Intelligent User Interfaces, Morgan Kaufmann Publishers Inc., pp. 249-254.
Fifth Office Action Issued in Chinese Patent Application 200980112454. 5, dated Apr. 2, 2014, 19 Pages.
Find any file or email on your PC as fast as you can type!, http://www.x1.com, 2003, 1 page.
First Office Action Issued in Chinese Patent Application 200980112454. 5, dated Aug. 26, 2011, 9 Pages.
FrontPage 11 Beta Layperson's Specification, Copyright 2002, Microsoft Corporation, 12 pages.
Furman, et al., "Positioning HTML Elements with Cascading Style Sheets", W3C Working Draft, Aug. 19, 1997, 14 Pages.
G. Kurtenbach et al., "The Hotbox: Efficient Access to a Large Number of Menu-items," CHI 99 15-20, pp. 231-237, May 1999.
Gajos, et al., "Supple: Automatically Generating User Interfaces", In Proceedings of the 9th International Conference on Intelligent User Interfaces, Jan. 13, 2004, pp. 1-8.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Goldberg et al., "Using Collaborative Filtering to Weave an Information Tapestry," Communication of the ACM, vol. 35, No. 12, pp. 61-70, Dec. 1992.
Gordon Padwick, Using Microsoft Outlook 2000, Que, Sp. Ed., May 1999, 5 pp.
Gorniak, Peter; "Sorting email messages by topic"; 1998; 1 pg. (provided to us by MS Sep. 2, 2014 in post grant search).
Habraken, Microsoft Office XP 8 in 1, published Jun. 5, 2001, http://proquest.safaribooksonline.com/0789725096/, 12 pp.
Haden et al.; "Scrollable Popup Menu with Selection Tracking Display of Graphical Objects"; IP.Com Journal, ip.com Inc., West Henrietta, NY, Aug. 1, 1994, 6 pgs. (cited in Feb. 28, 2012 Search Report).
Halvorson et al., "Microsoft Office XP Inside Out," 2001, pp. 1005-1009, 1015, 1023-1028, 1036-1039, 1093.
Halvorson et al., "Microsoft Office XP Inside Out," 2001, pp. 4, 5, 10, 11, 70-74, 281-288, 1010-1014.
Halvorson et al., Microsoft Office Professional Official Manual, Aug. 20, 2002, 10 pgs. (cited in JP Patent Application May 21, 2010).
Hepfner, Troy, "New SOCET CXP Interface Improves Usability," Sep. 2008, http://www.socetset.com/gxpmosaic/?p=95, 4 pages.
Hock, "Yahoo! To the Max"; May 10, 2005; 5 excerpted pgs. (cited in Feb. 1, 2011 OA).
Homeworking Forum; archived Dec. 6, 2004; 11 pgs. (Cited in Jun. 7, 2011 OA).
http://www.webreference.com/html/tutorial5/5.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
India Examination Report dated Feb. 17, 2015 in Appln No. 1568/DEL/2005, 3 pgs.
India First Examination Report dated Dec. 23, 2014 in Appln No. 1819/del/2005, 2 pgs.
India First Examination Report dated Mar. 19, 2014 in Appln No. 1818/DEL/2005, 1 pg.
India First Examination Report dated Mar. 30, 2012 cited in Appln No. 1817/DEL/2005; 2 pgs.
India First Examination Report dated May 6, 2015 cited in Appln No. 1979/DELNP/2008, 2 pgs.
India First Examination Report dated Oct. 21, 2013 cited in Appln No. 1017/DEL/2004; 2 pgs.
India First Examination Report Issued in Patent Application No. 1820/DEL/2005, dated Mar. 20, 2014, 1 Page.
Indonesian Office Action Issued in Patent Application No. P00200500444, dated Jan. 16, 2015, 3 Pages. (w/o English Translation).
Inoue, Risako, "Learn from Demonstration How to Use Power Point", In Nikkei PC21, Nikkei Business Publications, vol. 13, Issue 7, Apr. 1, 2008, pp. 168-171 (no English Translation provided) (cited in Oct. 21, 2015 JP OA).
Inoue; "Let's Learn PowerPoint Using Actual Samples"; Nikkei PC21, Japan, Nikkei Business Publications, Inc., Apr. 1, 2008, vol. 13, No. 7, 5 pgs.—no English Translation (cited in Jan. 9, 2014 JP OA).
International Search Report dated Nov. 27, 2007 in PCT/US2007/012573, 9 pages.
International Search Report dated Oct. 17, 2007 cited in International Application No. PCT/US2006/012724; 11 pgs.
Islam et al., "Email Categorization Using Multi Stage Classification Technique", 2007, 3 pgs. (Search Rpt).
Israel Office Action in Application 169718, dated Oct. 17, 2013, 4 pages. (with English translation).
Israel Office Action in Application 233533, dated May 31, 2016, 2 pgs. (W/out English Translation).
Israel Office Action Issued in Patent Application No. 169717, dated Oct. 26, 2009, 2 Pages.
Israel Office Action Issued in Patent Application No. 169717, dated Oct. 29, 2014, 1 Page; (w/o English Translation).
Israeli Office Action dated Aug. 29, 2012 in Appln No. 169717; 4 pgs.
Israeli Office Action dated Feb. 23, 2012 cited in Appln No. 170668; 20 pgs.
Israeli Office Action dated Feb. 28, 2014 in Appln No. 209012, 6 pgs.
Israeli Office Action dated Jul. 5, 2010 cited in Appln No. 169718; 2 pgs.

(56) References Cited

OTHER PUBLICATIONS

Israeli Office Action dated Jun. 18, 2013 cited in Appln No. 170668; 4 pgs.
Israeli Office Action dated Jun. 3, 2012 cited in Appln No. 189293; 4 pgs.
Israeli Office Action dated Mar. 2, 2015 in Appln No. 213908, 5 pgs.
Israeli Office Action dated Mar. 6, 2014 in Appln No. 194785, 5 pgs.
Israeli Office Action dated May 15, 2014 in Appln No. 209047, 6 pgs.
Israeli Office Action dated May 15, 2014 in Appln No. 209048, 15 pgs.
Israeli Office Action dated May 3, 2012 cited in Appln No. 169718; 4 pgs.
Israeli Office Action dated Oct. 12, 2009 cited in Appln No. 170668; 2 pgs.
Israeli Office Action dated Oct. 17, 2013 cited in Appln No. 1611334; 4 pgs.
Israeli Office Action dated Oct. 28, 2010 cited in Appln No. 169716; 4 pgs.
Israeli Office Action dated Sep. 6, 2009 cited in Appln No. 169716; 2 pgs.
Israeli Office Action dated Sep. 7, 2009 cited in Appln No. 169718; 2 pgs.
Israeli Office Action Issued in Patent Application No. 215418, dated Apr. 28, 2015, 3 Pages.
Israeli Office Action Issued in Patent Application No. 213908, dated Feb. 3, 2015, 3 pages. (w/o English Translation).
Israeli Office Action Issued in Patent Application No. 221792, dated Feb. 16, 2016, 4 pgs.
Israeli Office Action Received in Patent Application No. 209011, dated Sep. 10, 2013, 5 Pages.
Jacobs, et al., "Adaptive Grid-Based Document Layout", In Proceedings of ACM transactions on Graphics, SIGGRAPH 2003, vol. 22, Issue 3, Jul. 2003, 11 Pages.
Jane Dorothy Calabria Burke, Ten Minute Guide to Lotus Notes 4.6, Publication date: Dec. 23, 1997, 2 pgs.
Japanese 3rd Official Notice, Mailing No. 134028, dated Sep. 16, 2011 cited in Appln. No. PH1707009; 2 pgs.
Japanese 4th Official Notice, Mailing No. 134052, dated Sep. 16, 2011 cited in Appln. No. PH1707009; 2 pgs.
Japanese Final Decision of Rejection dated May 27, 2014 in Appln No. 2012-110939, 4 pgs.
Japanese Notice of Allowance dated Apr. 11, 2012 cited in Appln No. 2008-530229; 6 pgs.
Japanese Notice of Allowance Issued in Patent Application No. 2005-236089, dated Aug. 23, 2011, 6 Pages.
Japanese Notice of Allowance Issued in Patent Application No. 2011-550149, dated May 8, 2014, Filed Date: Jan. 22, 2010, 4 Pages.
Japanese Notice of Allowance Issued in Patent Application No. 2012-510906, dated Jul. 10, 2014, 3 Pages. (w/o English Translation).
Japanese Notice of Final Rejection dated Mar. 9, 2012 cited in Appln No. 2008-513476; 2 pgs.
Japanese Notice of Preliminary Rejection dated Mar. 12, 2013 in Appln No. 2011-516371, 4 pgs.
Japanese Notice of Preliminary Rejection dated Mar. 19, 2013 in Appln No. 2011-514652, 6 pgs.
Japanese Notice of Rejection dated Aug. 12, 2011 cited in Appln. No. 2005-184990; 6 pgs.
Japanese Notice of Rejection dated Dec. 16, 2011 cited in Appln No. 2008-529218; 3 pgs.
Japanese Notice of Rejection dated Feb. 3, 2012 cited in Appln No. 2008-530218; 6 pgs.
Japanese Notice of Rejection dated May 11, 2012 cited in Appln No. 2009-513223; 6 pgs.
Japanese Notice of Rejection dated May 6, 2011 cited in Appln No. 2005-236087; 4 pgs.
Japanese Notice of Rejection dated May 6, 2011 cited in Appln No. 2005-236089; 4 pgs.
Japanese Notice of Rejection dated Nov. 11, 2011 cited in Appln. No. 2008-530229; 58 pgs.
Japanese Notice of Rejection dated Nov. 25, 2011 cited in Appln. No. 2008-531249; 8 pgs.
Japanese Notice of Rejection dated Nov. 4, 2011 cited in Appln No. 2008-513476; 4 pgs.
Japanese Notice of Rejection dated Sep. 19, 2013 in Appln No. 2012-153634; 6 pgs.
Japanese Office Action dated Jan. 9, 2014 cited in JP Application No. 2012-510906 w/translation, 4 pgs.
Japanese Office Action dated Jun. 10, 2011 cited in JP Application No. 2008-530229, w/translation; 4 pgs.
Japanese Office Action Issued in Japan Patent Application No. 2012-510906, dated Jan. 16, 2014, 4 Pages.
Japanese Office Action Issued in Patent Application No. 2005-236089, dated Sep. 20, 2011, 2 Pages.
Japanese Office Action Issued in Patent Application No. 2011-550149, dated Jan. 20, 2014, Filed Date: Jan. 22, 2010, 5 Pages.
Japanese Office Action Issued in Patent Application No. 2014-163396, dated Oct. 21, 2015, 5 Pages.
Khare et al., "The Origin of (Document) Species," University of California, 1998, 9 pgs.
Kim, et al., "Migrating Legacy Software Systems to CORBA based Distributed Environments through an Automatic Wrapper Generation Technique", In Proceedings SCI 2000 and the 6th International Conference on Information Systems Analysis and Synthesis ISAS 2000, vol. 10, Aug. 9, 2001, 6 Pages.
Korean Final Notice of Preliminary Rejection dated May 20, 2013 cited in Appln No. 10-2008-7005939; 3 pgs.
Korean Notice of Allowance Issued in Patent Application No. 10-2005-0067411, dated Mar. 12, 2012, 2 Pages. (Without English Translation).
Korean Notice of Allowance Issued in Patent Application No. 10-2010-7029199, dated Apr. 24, 2015, 2 Pages. (w/o English Translation).
Korean Notice of Final Rejection in Application 10-2010-7028097, dated Apr. 28, 2016, 4 pgs. (No English translation).
Korean Notice of Final Rejection in Application 10-2010-7028989, dated Apr. 28, 2016, 4 pgs. (No English translation).
Korean Notice of Preliminary Rejection dated Jul. 19, 2012 cited in Appln No. 10-2007-7024571; 6 pgs.
Korean Notice of Preliminary Rejection dated Jul. 2, 2012 cited in Appln No. 10-2012-0024393; 5 pgs.
Korean Notice of Preliminary Rejection dated Jul. 22, 2011 cited in Appln No. 10-2005-0058160; 5 pgs.
Korean Notice of Preliminary Rejection dated Mar. 19, 2013 in Appln No. 10-2008-7005659, 4 pgs.
Korean Notice of Preliminary Rejection dated Nov. 12, 2012 cited in KR-10-2008-7005939; 7 pgs.
Korean Notice of Preliminary Rejection dated Nov. 7, 2013 cited in KR-10-2008-7029272; 7 pgs.
Korean Notice of Preliminary Rejection dated Oct. 19, 2015 in Appln No. 10-2010-7028989, 7 pgs. (No English Language Translation).
Korean Notice of Preliminary Rejection dated Sep. 30, 2015 in Appln No. 10-2010-7028097, 7 pgs. (No English translation).
Korean Notice of Preliminary Rejection Issued in Patent Application No. 10-2011-7018813, dated Jan. 8, 2016, 4 Pages.
Korean Notice of Rejection dated Feb. 22, 2013 in Appln No. 10-2008-7005078 13 pgs.
Korean Notice of Rejection dated Feb. 25, 2013 in Appln No. 10-2008-7005366, 5 pgs.
Korean Notice of Rejection dated Jan. 30, 2012 cited in Appln No. 10-2004-0048176; 5 pgs.
Korean Notice of Rejection dated May 17, 2011 cited in Appln No. 10-2004-48176; 9 pgs.
Korean Notice of Rejection dated Nov. 3, 2011 cited in Appln No. 10-2005-0067257; 4 pgs.
Korean Office Action in Application 10-2011-7026740, dated Mar. 11, 2016, 4 Pages.
Korean Office Action in Patent Application No. 10-2011-7018813, dated Jul. 29, 2016, 3 pgs; w/o English translation).

(56) References Cited

OTHER PUBLICATIONS

Korean Preliminary Rejection dated Aug. 23, 2011 cited in Appln. No. 10-2005-0067236; pp. 11.
Korean Preliminary Rejection dated Aug. 23, 2011 cited in Appln. No. 10-2005-0067411; 9 pgs.
Korean Preliminary Rejection dated Aug. 29, 2011 cited in Appln. No. 10-2005-0066460; 7 pgs.
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Kumar et al., "A personal agent application for the semantic web"; In AAAI Fall Symposium on Personalized Agents; 2002; pp. 1-8 (provided to us by MS Sep. 2, 2014 in post grant search).
Lisa K. Averett; Joshua R. Knisley; Mark A. Marvin; Haiti: Projecting Tactical Network and Systems Management; 1995 IEEE pp. 906-910.
Liu et al., "Continual Queries for Internet Scale Event-Driven Information Delivery," IEEE Transactions on Knowledge and Data Engineering, vol. 11, Issue 1, pp. 610-628, 1999.
Louw, et al., "Extensible Web Browser Security", In Proceedings of the 4th International Conference on Detection of Intrusions and Malware, and Vulnerability Assessment, Jul. 12, 2007, 20 Pages.
Lyons et al., The Oval Menu-Evolution and Evaluation of a Wedget, © 1996; IEEE; 8 pgs. (cited in Apr. 16, 2015 NOA).
M. Williams, "Programming Windows NT4: Unleashed," Sams Publishing, Indianapolis, 1996, pp. index & 167-185.
Maes et al., "Learning Interface Agents"; In AAAI (vol. 93); 1993; pp. 459-465 (provided to us by MS Sep. 2, 2014 in post grant search).
Malaysia Substantive Examination Adverse Report dated Jan. 15, 2013 in Appln No. PI 20084401, 3 pgs.
Malaysia Substantive Examination Report dated Jun. 30, 2015 in Appln No. PI 2010005439, 2 pgs.
Malaysian Adverse Report in Application PI 2011003348, dated Mar. 15, 2016, 3 pgs.
Malaysian Examination Report dated Aug. 30, 2012 in Appln No. PI 20080400; 3 pgs.
Malaysian Modified Substantive Examination Report dated Jan. 30, 2015 in Appln No. PI 2010005558, 3 pgs.
Malaysian Notice of Allowance Issued in Patent Application No. PI20053258, dated Oct. 15, 2012, 2 Pages.
Malaysian Notice of Allowance Received in Patent Application No. PI 20080400, dated Sep. 13, 2013, Filed Date: Aug. 29, 2006, 2 Pages.
Malaysian Substantive Examination Adverse Report dated Jan. 31, 2012 cited in Appln No. PI 20053258; 3 pgs.
Malaysian Substantive Examination Adverse Report dated Jan. 31, 2012 cited in Appln No. PI 20053259; 3 pgs.
Malaysian Substantive Examination Adverse Report dated Mar. 15, 2011 cited in Appln No. PI 20053260; 3 pgs.
Malaysian Substantive Examination Adverse Report dated Sep. 30, 2010 cited in Appln No. PI 20052959; 4 pgs.
Malaysian Substantive Examination Adverse Report in Application PI 2011004990, dated Mar. 15, 2016, 3 pgs.
Malaysian Substantive Examination Report dated Jan. 15, 2014 in Appln No. PI 20080508, 3 pgs.
Malaysian Substantive Examination Report dated Jan. 30, 2015 in Appln No. PI 2010005439, 3 pgs.
Malaysian Substantive Examination Report dated Nov. 14, 2014 in Appln No. PI 2010005637, 3 pgs.
Malaysian Substantive Examination Report dated Oct. 31, 2012 cited in Appln No. PI 20053260, 2 pgs.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Marshall School of Business, Workshop 1—Introduction to Outlook & E-mail, Apr. 6, 2000, pp. 1-11.
Marshall School of Business: "Workshop IV—Calendar," http://www.marshall.usc.edu/computing/PDF_Files/Outlook/Workshop4, PDF, Apr. 10, 2000, pp. 1-4.
Mexican Notice of Allowance Issued in Patent Application No. PA/a/2005/008349, dated Dec. 16, 2014, 1 Page (No English translation).
Mexican Notice of Allowance Received in Patent Application No. MX/a/2008/002889, dated Apr. 1, 2014, Filed Date: Aug. 29, 2006, 1 Page. (w/o English Translation).
Mexican Office Action dated Aug. 12, 2010 cited in Appln No. 2005/008354; 6 pgs.
Mexican Office Action dated Aug. 14, 2014 cited in Appln No. PA/a/2005/008349, 18 pgs.
Mexican Office Action dated Aug. 20, 2013 in Appln No. MX/a/2011/011749, 10 pgs.
Mexican Office Action dated Feb. 11, 2014 cited in Appln No. MX/a/2008/003342, 8 pgs.
Mexican Office Action dated Feb. 25, 2013 in Appln No. MX/a/2008/002889, 11 pgs.
Mexican Office Action dated Feb. 3, 2012 cited in Appln No. MX/a/2008/002889 with summary; 12 pgs.
Mexican Office Action dated Feb. 5, 2009 cited in Appln No. PA/a/2005/008349; 10 pgs.
Mexican Office Action dated Feb. 5, 2013 cited in Appln No. MX/a/2008/014849, 8 pgs.
Mexican Office Action dated Jan. 22, 2013 cited in Appln No. MX/a/2008/003342; 8 pgs.
Mexican Office Action dated Jan. 6, 2011 cited in Appln No. PA/a/2005/008354; 26 pgs.
Mexican Office Action dated Jul. 9, 2013 in Appln No. MX/a/2008/002889, 13 pgs.
Mexican Office Action dated Jun. 11, 2013 cited in Appln. No. MX/a/2008/003342, 9 pgs.
Mexican Office Action dated Jun. 11, 2013 in Appln No. PA/a/2005/008351; 31 pgs.
Mexican Office Action dated Jun. 19, 2009 cited in Appln. No. PA/a/2005/007073; 6 pgs.
Mexican Office Action dated Jun. 20, 2013 in Appln No. MX/a/2010-014056; 6 pgs.
Mexican Office Action dated Jun. 6, 2012 cited in Appln No. MX/a/2008/014849; 8 pgs.
Mexican Office Action dated Mar. 22, 2013 in Appln No. PA/a/2005/008350; 28 pgs.
Mexican Office Action dated Mar. 3, 2009 cited in Appln No. PA/a/2005/008351; 4 pgs. English language only.
Mexican Office Action dated Mar. 31, 2011 cited in Appln No. PA/a/2005/008349; 40 pgs.
Mexican Office Action dated Mar. 31, 2011 cited in Appln No. PA/a/2005/008350; 40 pgs.
Mexican Office Action dated Mar. 31, 2011 cited in Appln No. PA/a/2005/008351; 46 pgs.
Mexican Office Action dated May 23, 2013 in Appln No. MX/a/2008/003342; 8 pgs.
Mexican Office Action dated May 26, 2011 cited in Appln. No. MX/a/2009/004151; 4 pgs.
Mexican Office Action dated May 4, 2010 cited in Appln No. 2005/008354; 5 pgs.
Mexican Office Action dated Oct. 28, 2013 cited in Appln. No. MX/a/2010/013566; 8 pgs.
Mexican Office Action dated Oct. 3, 2011 cited in Appln. No. MX/a/2008/014849; 10 pgs.
Mexican Office Action dated Sep. 27, 2013 in Appln No. MX/a/2008/014849; 9 pgs.
Mexican Office Action Issued in Mexico Patent Application No. MX/a/2011/011749, dated Aug. 2, 2013, 6 Pages. (w/o English Translation).
Mexican Office Action Received for Mexican Patent Application No. PA/a/2005/008349, dated Mar. 14, 2014, Filed Date: Aug. 5, 2005, 16 Pages.
Mexican Office Action Received in Patent Application No. MX/a/2010/013566, dated Jun. 12, 2013, 3 Pages.
Mexican Office Action Summary dated Jun. 25, 2012 in Appln No. PA/a/2005/008354; 25 pgs.

(56) References Cited

OTHER PUBLICATIONS

Mexican Office Action Summary dated Sep. 18, 2012 in Appln No. MX/a/2008/003342; 8 pgs.
Mexican Office Action Summary dated Sep. 22, 2011 cited in Appln. No. MX/a/2008/003342; 10 pgs.
Microsoft Office 11 Beta Layperson's Specification, Copyright 2002, Microsoft Corporation, 28 pages.
Microsoft Office 2003, Microsoft Office Professional Edition 2003, Microsoft Corporation, 10 pages.
Microsoft Office 2007 Word Help, 3 pgs. (cited in Dec. 31, 2012 OA).
Microsoft Office Word 2003, Part of Microsoft Office Professional Edition 2003, 1983-2003 Microsoft Corporation, 5 pp.
Microsoft Office Word 2003, Part of Microsoft Office Professional Edition 2003, 1983-2003 Microsoft Corporation, screen shot 1, 1 pp.
Microsoft Office XP/2002, Wikipedia, http://en.wikipedia.org/wiki/Microsoft_Office_XP, May 31, 2001 (May 31, 2001); 3 pgs. (cited in Sep. 4, 2014 CA OA).
Microsoft Press, Microsoft Computer Dictionary, Microsoft Press, Fifth Edition, 2002, pp. 374, 382.
Microsoft Publisher 11 Beta Layperson's Specification, Copyright 2002, Microsoft Corporation, 13 pages.
Microsoft Windows XP Professional, Version 2002, Service pack 2, 3 pgs.
Microsoft XDocs Beta Layperson Specification, Copyright 2002, Microsoft Corporation, 3 pages.
Milstein, Sarah; "The Missing Manual: The book that should have been in the box", First Edition; O'Reilly Japan, Inc.; Nov. 25, 2004; 1 pg. (cited in JP NOR Nov. 25, 2011).
Miser, "Special Edition Using Mac OS X v10.2"; Pub. Date Jan. 3, 2003; QUE; Spe. Ed.; pp. 272-275 (cited in Apr. 18, 2013 OA).
Mock et al., "An Experimental Framework for Email Categorization and Management", Sep. 9-12, 2001, 3 pgs. (Search Rpt).
Mori et al., "Design and Development of Multidevice User Interfaces through Multiple Logical Descriptions"; Aug. 2004; vol. 30; 14 pgs. (cited in Apr. 25, 2013 NOA).
Morita, Utako; "Literature Searching System, 'JDream'"; Online Search; vol. 23, No. 4; The Society of Japan Terminal, Dec. 2002; 5 pgs. (cited in JP NOR Nov. 25, 2011).
Murray; First Look 2007 Microsoft Office System; Jun. 21, 2006; Microsoft Press; 16 pgs. (cited in Mar. 19, 2015 NOA).
New Zealand Application No. 541299, Examination Report dated Nov. 8, 2006, 1 page.
New Zealand Application No. 541299, Examination Report dated Jul. 25, 2005; 2 pgs.
New Zealand Application No. 541300, Examination Report dated Jul. 25, 2005; 2 pgs.
New Zealand Application No. 541301, Examination Report dated Jul. 25, 2005; 2 pgs.
New Zealand Office Action dated Oct. 14, 2009 cited in NZ Application No. 566363; 1 pg.
Nielsen, Jacob. "Tabs, Used Right," Alertbox, Sep. 17, 2007, http://www.useit.com/alertbox/tabs.html, 6 pages.
Non-Final Office Action Issued in U.S. Appl. No. 10/780,547, dated Oct. 4, 2007, 16 Pages.
Norway Notice of Allowance Issued in Patent Application No. 20053656, dated Jun. 22, 2015, 2 Pages. (W/out English Translation).
Norway Office Action dated Sep. 15, 2015 in Appln No. 20053658, 1 page (no English translation).
Norway Office Action dated Feb. 10, 2014 in Appln No. 20053655, 4 pgs.
Norway Office Action dated Feb. 10, 2014 in Appln No. 20053658, 4 pgs.
Norway Office Action dated in Appln No. 20053655, dated Mar. 2, 2016, 3 pgs.
Norway Office Action dated Jan. 22, 2016 in Appln No. 20054097, 1 pg. (No english translation).
Norway Office Action Issued in Patent Application No. 20053656, dated Feb. 22, 2014, 5 Pages.
Norwegian Office Action dated Jul. 27, 2015 in Appln No. 20053655, 3 pgs.
Norwegian Office Action dated Nov. 29, 2014 in Appln No. 20053655, 3 pgs.
Norwegian Office Action dated Nov. 29, 2014 in Appln No. 20053658 4 pgs.
Norwegian Office Action Received for Patent Application No. 20053656, dated Nov. 19, 2014, 2 pgs.
Notice of Allowance dated Apr. 16, 2015 in U.S. Appl. No. 13/595,084, 19 pgs.
Notice of Allowance dated Jul. 28, 2015 in U.S. Appl. No. 13/595,084, 15 pgs.
Notice of Allowance dated Mar. 15, 2016 in U.S. Appl. No. 14/032,094, 30 pgs.
Notice of Allowance dated Mar. 19, 2015 in U.S. Appl. No. 13/464,572, 40 pgs.
Notice of Allowance dated Nov. 20, 2015 in U.S. Appl. No. 13/769,598, 15 pgs.
Notice of Allowance Issued in Chinese Patent Application No. 200680032789.2, dated May 15, 2014, Filed Date: Sep. 8, 2006, 3 Pages.
Notice of Allowance Received for Korea Republic of (KR) Patent Application No. 10-2008-7005939, dated Nov. 20, 2013, Filed Date: Sep. 12, 2006, 2 Pages. (w/o English Translation).
Office 11 Beta Letter, Copyright 2002, Microsoft Corporation, 6 pages.
Office 2007, Microsoft, Released on Nov. 6, 2006, 23 pgs. (Cited in Jun. 9, 2011 OA).
Office Action Issued in Mexican Patent Application No. MX/a/2011/008461, dated May 19, 2016, 10 Pages. (No English Translation).
Office Action Issued in Philippines Patent Application 1200500404, dated Apr. 12, 2011, 1 Page.
Office Action Issued in Russian Patent Application 200512583709, dated Oct. 30, 2009, 12 Pages. (with English translation).
Ohmori, Yasuo et al., "Eigyo Mind—A Sales Support Tool," PFU Tech. Rev., vol. 10, No. 1, pp. 32-38, PFU Limited, May 1, 1999, (cited in Aug. 12, 2011 JP Notice of Rej.).
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Padwick, Gordon "Using Microsoft Outlook 2000", 1999 Que Publishing, pp. 530-533.
Parry, Dominic Charles, "CREWS: A Component-Driven, Run-Time Extensible Web Service Framework", In Thesis Submitted in fulfilment of the requirements for the Degree of Master of Science, Rhodes University, Dec. 2003, 103 Pages.
PCT Search Report and Written Opinion dated Dec. 29, 2009 cited in International Application No. PCT/US2009/046344; 2 pgs.
PCT Search Report and Written Opinion dated Nov. 30, 2009 cited in International Application No. PCT/US2009/046341; 11 pgs.
PCT Search Report dated Feb. 26, 2007 cited in International Application No. PCT/US2006/034993; 11 pgs.
PCT Search Report dated Feb. 6, 2007 cited in International Application No. PCT/US2006/035467; 10 pgs.
PCT Written Opinion and Search Report dated Jan. 9, 2007 cited in International Application No. PCT/US2006/033809; 6 pgs.
PCT Written Opinion and Search Report dated Nov. 29, 2010 cited in International Application No. PCT/US2010/034277; 10 pgs.
PCT Written Opinion and Search Report dated Sep. 2, 2010 cited in International Application No. PCT/US2010/021888; 9 pgs.
Perronne et al. "Building Java Enterprise Systems with J2EE", Publisher: Sams, Pub Date: Jun. 7, 2000 (pp. 1-8).
Philippines Examiner's Action dated Apr. 12, 2011 cited in Appln No. 1-2005-00404; 1 pg.
Philippines Examiner's Action dated Apr. 21, 2008 cited in Appln No. 1-2005-000405; 1 pg.
Philippines Examiner's Action dated Apr. 21, 2008 cited in Appln No. 1-2005-000406; 1 pg.
Philippines Examiner's Action dated Aug. 19, 2008 cited in Appln No. 12005000405; 1 pg.

(56) References Cited

OTHER PUBLICATIONS

Philippines Examiner's Action dated Jul. 31, 2008 cited in Appln No. 12005000495; 1 pg.
Philippines Examiner's Action dated Mar. 11, 2010 cited in Appln No. 1-2005-000405; 1 pg.
Philippines Examiner's Action dated Sep. 12, 2008 cited in Appln No. 1200500406; 1 pg.
Philippines Substantive Examination Report dated Apr. 25, 2013 cited in Appln No. 1-2005-000495; 2 pgs.
Philippines Substantive Examination Report dated Apr. 30, 2014 cited in Appln No. 1-2008-500356, 1 pg.
Philipines Office Action Issued in Patent Application No. PH12005405, dated Jan. 19, 2006, 1 Page.
Pogue, David. "Windows XP Home Edition: The Missing Manual," O'Reilly, 1st Edition, May 1, 2002, pp. 37, 38, 41.
Ramamritham et al., Scheduling Algorithms and Operating Systems Support for Real-Time Systems; © 1994; IEEE; 13 pages. (cited in May 7, 2014 NOA).
Raman, "Cascaded Speech Style Sheets," 1997, 7 pgs.
Redmond, Tony; Excerpt from Book; Microsoft Exchange Server 2003; Published 2003; 14 pgs. (provided to M&G Aug. 9, 2012 by Microsoft).
Ribbons; Microsoft; © 2012 Microsoft; http://msdn.microsoft.com/en- us/library/windows/desktop/cc872782.aspx; 45 pgs. (Cited in Apr. 10, 2012 NOA).
Rice, F, "Customizing the 2007 Office System Document Inspector," http://msdn2.microsoft.com/en-us/library/aa338203(d=printer).aspx, 10 pages (May 2006).
Riggsby et al., "Mastering Lotus Notes and Domino 6," 2003, pp. 135-138, 607-612.
Riggsby et al., "Mastering Lotus Notes and Domino 6," 2003, pp. 135-139.
Riggsby, McCoy, Haberman and Falciani, "Mastering Lotus Notes and Domino 6." 2003, pp. 18, 22, 33-35, 47, 122, 123, 215-241, 378.
Ringel et al., "Automated Message Prioritization: Making Voicemail Retrieval More Efficient"; In CHI'02 Extended Abstracts on Human Factors in Computing Systems; Apr. 20, 2002; 2 pgs. (provided to us by MS Sep. 2, 2014 in post grant search).
Russel et al., (hereinafter "Russel"); "Special Edition Using Microsoft ® Office Outlook ® 2003"; Que publishing on Sep. 25, 2003, 71 pgs. (cited in Jun. 6, 2012 OA).
Russian Decision on Grant dated Aug. 12, 2013 in Appln No. 2010151922/08; 18 pgs.
Russian Decision on Grant dated Jul. 20, 2014 in Appln No. 2010138162, 21 pgs.
Russian Decision on Grant dated May 20, 2014 in Appln No. 2011145984/08, 24 pgs.
Russian Notice of Allowance Issued in Patent Application No. 2005125837, dated Jul. 10, 2010, 23 Pages.
Russian Notice of Allowance Issued in Patent Application No. 2011134380, dated Apr. 5, 2014, Filed Date: Jan. 22, 2010, 22 Pages.
Russian Notice of Allowance Issued in Patent Application No. 2010152843, dated Feb. 20, 2014, 16 Pages.
Russian Office Action dated Dec. 12, 2012 cited in Appln No. 2010140069, 8 pgs.
Russian Office Action dated Dec. 28, 2009 cited in Appln No. 2005125836/09(029010); 2 pgs.
Russian Office Action dated Jul. 21, 2009 cited in Appln No. 2005125837/09(029011); 12 pgs.
Russian Office Action dated Jul. 26, 2010 cited in RU Application No. 2008109034, w/translation; 9 pgs.
Russian Office Action dated Jul. 30, 2009 cited in Appln No. 2005125831/09(029005); 17 pgs.
Russian Office Action dated Jun. 14, 2011 cited in Appln No. 2008147090; 2 pgs.
Russian Office Action dated Jun. 24, 2009 cited in Appln No. 2005120363/28(023023); 8 pgs.
Russian Office Action dated May 13, 2013 cited in Appln No. 2010-151922; 7 pgs.
Russian Office Action dated Nov. 12, 2010 cited in Application No. 2008109034, w/translation; 9 pgs.
Russian Office Action dated Oct. 26, 2009 cited in Appln No. 2005120363/09(023023); 12 pgs.
Russian Office Action dated Oct. 30, 2009 cited in Appln No. 2005125837/09(029011); 5 pgs.
Russian Office Action dated Oct. 9, 2009 cited in Appln No. 2005125836/09(029010); 10 pgs.
Russian Office Action dated Sep. 10, 2009 cited in Appln No. 2005125839/09(029013); 16 pgs.
Sada, Morihiro; "Clue for Managing Common Data Filed on Server"; Business Personal Computer Age; vol. 15, No. 7; Dempa Publications, Inc.; Jul. 1, 1997; 1 pg. (cited in JP NOR Nov. 25, 2011).
Schumaker, "User Interface Standards," http://msdn2.microsoft.com/en-us/library/aa217660(office.11.d=printer).aspx, Sep. 2001, 5 pgs.
Schwartz, Microsoft Office 2007 for Windows: Visual QuickStart Guide, 11 pgs. (cited in Mar. 27, 2015 OA).
Screen Dumps Microsoft Corporation, Microsoft Office Professional Edition 2003, 5 pp.
Screen Dumps Microsoft Corporation, Microsoft Office Professional Edition 2003, 4 pp.
Screen Dumps of Microsoft Outlook (1999, pp. 1-3).
Screendumps—Microsoft Office (Microsoft Corporation, Microsoft Office Word , Part of Microsoft Office Professional Edition 2003; Copyright © 1983-2003; 16 pages) (as on Aug. 4, 2009 in related U.S. Appl. No. 10/955,942).
Screendumps—Microsoft Office Outlook, Microsoft Office Outlook Professional Edition 2003, Microsoft Corporation, 2 pages.
Screendumps—Microsoft Office, Microsoft Corporation, Microsoft Office Professional Edition 2003, Copyright © 1983-2003 Microsoft Corporation; 13 pgs.
Screendumps—Microsoft Office, Microsoft Office Professional Edition 2003, Microsoft Corporation, 10 pages.
ScreenShot/Screendumps of MS_Office_2003; Microsoft Corporation, Microsoft Office Professional Edition 2003; 5 pages), (as on Apr. 15, 2008 in related U.S. Appl. No. 10/955,942).
Selca, et al., "Customizing the Office Fluent User interface in Access 2007", Retrieved from <<http://msdn.microsoft.com/en-us/library/bb187398(printer).aspx>>, Dec. 2006, 22 Pages.
Seo et al, "Hangul Office 2000 Tutoring Book", Sep. 15, 2000, 16 pgs. (Cited in Korean Notice of Rejection May 17, 2011).
Shih, et al., "A Stepwise Refinement Approach to Multimedia Presentation Designs", In IEEE International Conference on Systems, Man, and Cybernetics Computational Cybernetics and Simulation, vol. 1, Oct. 12, 1997, pp. 117-122.
Shinder, Deb, "Locate and organize e-mail messages with Outlook 2003 search folders", retrieved at: http://www.techrepublic.com/article/locate-and-organize-e-mail-messages-with-outlook-2003-search-folders/, Aug. 5, 2004, obtained Sep. 28, 2016, 12 pgs.
Slovak, Ken, "Absolute Beginner's Guide to Microsoft Office Outlook 2003," 2003 Que Publishing, pp. 237-241.
Stephanos Piperoglou, "External Style Sheets," http://www.webreference.com/html/tutorial5/9.html, Aug. 20, 1998, 3 pgs.
Stephanos Piperoglou, "The Style Attribute and CSS Declarations," http://www.webreference.com/html/tutorial5/2, Aug. 20, 1998, 4 pgs.
Supplementary European Search Report dated Jun. 9, 2009 cited in EP Application No. 07795391.7-1225; 7 pgs.
Supplementary Search Report Issued in European Patent Application 09727331.2, dated Jul. 16, 2014, 6 Pages.
Supplementary Search Report Issued in European Patent Application 09767220.8, dated Jan. 30, 2013, 8 Pages.
Supplementary Search Report Issued in European Patent Application 09798374.6, dated May 10, 2013, 6 Pages.
Taiwan Notice of Allowance dated Mar. 29, 2012 cited in Appln No. 10120306600; 6 pgs.
Taiwan Notice of Allowance Issued in Patent Application No. 102112935, dated Aug. 31, 2015, 4 Pages.
Taiwan Notice of Allowance Issued in Patent Application No. 94123640, dated Mar. 12, 2013, 4 Pages. (with English translation).
Taiwan Notice of Allowance Issued in Patent Application No. 98145363, dated Aug. 13, 2015, 4 Pages.

(56) References Cited

OTHER PUBLICATIONS

Taiwan Office Action and Search Report Issued in Patent Application No. 98145363, dated Oct. 2, 2014, 25 Pages.
Taiwan Office Action dated Feb. 8, 2012 cited in Appln No. 94123640, with Eng Lang Summary; 15 pgs.
Taiwan Office Action dated Mar. 17, 2014 in Appln. No. 98118252, 10 pgs.
Taiwan Office Action dated May 14, 2012 cited in Appln No. 94122180, with Eng Lang Summary; 5 pgs.
Taiwan Office Action dated May 22, 2015 cited in Appln No. 101133155 with Eng Lang Summary, 4 pgs.
Taiwan Office Action dated May 25, 2015 cited in Appln No. 102112935 with Eng Lang Summary, 4 pgs.
Taiwan Search Report dated Mar. 14, 2012 cited in Appln No. 094123420; 7 pgs.
Taiwan Search Report dated May 12, 2014 cited in Appln No. 098119245, 11 pgs.
Taiwan Search Report dated May 7, 2014 cited in Appln No. 098117357, 13 pgs.
Thailand Notice of Allowance in Application 0501003162, dated Sep. 13, 2016, 1 page. No English translation.
The Discussion Board Component of Blackboard: An Instructor's Guide; Aug. 2004; 23 pgs. (cited in Feb. 1, 2011 OA).
U.S. Final Official Action dated Jan. 23, 2007 in U.S. Appl. No. 10/741,407.
U.S. Final Official Action dated Jan. 28, 2008 cited in U.S. Appl. No. 10/836,154.
U.S. Final Official Action dated Oct. 19, 2006 in U.S. Appl. No. 10/800,056.
U.S. Notice of Allowance dated Apr. 10, 2007 in U.S. Appl. No. 10/741,407, 8 pgs.
U.S. Notice of Allowance dated Aug. 24, 2004 in U.S. Appl. No. 09/896,384, 9 pgs.
U.S. Notice of Allowance dated Jul. 5, 2007 in U.S. Appl. No. 10/607,020, 6 pgs.
U.S. Official Action dated Apr. 1, 2013 in U.S. Appl. No. 12/163,784, 39 pgs.
U.S. Official Action dated Apr. 12, 2007 cited in U.S. Appl. No. 10/851,506.
U.S. Official Action dated Apr. 15, 2008 cited in U.S. Appl. No. 10/955,942, 14 pgs.
U.S. Official Action dated Apr. 15, 2010 in U.S. Appl. No. 11/823,999.
U.S. Official Action dated Apr. 16, 2008 cited in U.S. Appl. No. 10/955,967.
U.S. Official Action dated Apr. 18, 2013 in U.S. Appl. No. 10/851,506, 34 pgs.
U.S. Official Action dated Apr. 18, 2014 in U.S. Appl. No. 11/782,059, 42 pgs.
U.S. Official Action dated Apr. 19, 2012 in U.S. Appl. No. 13/102,633.
U.S. Official Action dated Apr. 21, 2011 in U.S. Appl. No. 11/445,393.
U.S. Official Action dated Apr. 21, 2011 in U.S. Appl. No. 12/574,256.
U.S. Official Action dated Apr. 23, 2010 in U.S. Appl. No. 12/144,642.
U.S. Official Action dated Apr. 23, 2015 in U.S. Appl. No. 11/332,822, 40 pgs.
U.S. Official Action dated Apr. 25, 2014 in U.S. Appl. No. 12/028,797, 42 pgs.
U.S. Official Action dated Apr. 26, 2012 in U.S. Appl. No. 11/782,059.
U.S. Official Action dated Apr. 27, 2006 in U.S. Appl. No. 10/800,056.
U.S. Official Action dated Apr. 28, 2009 in U.S. Appl. No. 12/028,797.
U.S. Official Action dated Apr. 29, 2008 cited in U.S. Appl. No. 10/955,941.
U.S. Official Action dated Apr. 29, 2013 in U.S. Appl. No. 12/954,952, 18 pgs.
U.S. Official Action dated Apr. 29, 2015 in U.S. Appl. No. 13/427,939, 43 pgs.
U.S. Official Action dated Apr. 4, 2013 in U.S. Appl. No. 11/782,059, 39 pgs.
U.S. Official Action dated Apr. 5, 2012 in U.S. Appl. No. 12/163,758.
U.S. Official Action dated Apr. 7, 2009 in U.S. Appl. No. 10/955,940.
U.S. Official Action dated Aug. 14, 2013 in U.S. Appl. No. 11/332,822, 102 pgs.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Aug. 19, 2013 in U.S. Appl. No. 10/851,506, 24 pgs.
U.S. Official Action dated Aug. 2, 2010 in U.S. Appl. No. 10/955,942, 19 pgs.
U.S. Official Action dated Aug. 2, 2013 in U.S. Appl. No. 12/777,287, 47 pgs.
U.S. Official Action dated Aug. 25, 2014 in U.S. Appl. No. 13/464,572, 117 pgs.
U.S. Official Action dated Aug. 3, 2011 in U.S. Appl. No. 12/142,927.
U.S. Official Action dated Aug. 30, 2013 in U.S. Appl. No. 12/574,256, 31 pgs.
U.S. Official Action dated Aug. 4, 2009 in U.S. Appl. No. 10/955,942, 19 pgs.
U.S. Official Action dated Aug. 4, 2009 in U.S. Appl. No. 10/955,967.
U.S. Official Action dated Aug. 6, 2010 in U.S. Appl. No. 11/401,470.
U.S. Official Action dated Aug. 7, 2012 in U.S. Appl. No. 10/836,154.
U.S. Official Action dated Dec. 10, 2009 in U.S. Appl. No. 10/955,940.
U.S. Official Action dated Dec. 12, 2012 in U.S. Appl. No. 10/851,506, 76 pgs.
U.S. Official Action dated Dec. 12, 2012 in U.S. Appl. No. 12/954,952, 86 pgs.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 21, 2007 in U.S. Appl. No. 10/851,506.
U.S. Official Action dated Dec. 23, 2003 in U.S. Appl. No. 09/896,384.
U.S. Official Action dated Dec. 23, 2008 in U.S. Appl. No. 10/955,942, 23 pgs.
U.S. Official Action dated Dec. 24, 2008 in U.S. Appl. No. 10/955,967.
U.S. Official Action dated Dec. 24, 2014 in U.S. Appl. No. 13/102,633, 42 pgs.
U.S. Official Action dated Dec. 28, 2007 in U.S. Appl. No. 10/800,056.
U.S. Official Action dated Dec. 29, 2010 in U.S. Appl. No. 12/028,797, 16 pgs.
U.S. Official Action dated Dec. 31, 2012 in U.S. Appl. No. 12/142,927, 49 pgs.
U.S. Official Action dated Dec. 4, 2007 in U.S. Appl. No. 10/955,940.
U.S. Official Action dated Dec. 5, 2012 in U.S. Appl. No. 12/777,287.
U.S. Official Action dated Dec. 6, 2013 in U.S. Appl. No. 10/851,506, 25 pgs.
U.S. Official Action dated Dec. 8, 2009 in U.S. Appl. No. 11/151,686.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 9, 2009 in U.S. Appl. No. 12/028,797.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Feb. 11, 2011 in U.S. Appl. No. 11/401,470.
U.S. Official Action dated Feb. 18, 2010 in U.S. Appl. No. 11/782,059.
U.S. Official Action dated Feb. 19, 2010 in U.S. Appl. No. 10/955,942, 19 pgs.
U.S. Official Action dated Feb. 20, 2008 cited in U.S. Appl. No. 10/848,774.
U.S. Official Action dated Feb. 21, 2008 cited in U.S. Appl. No. 10/851,442.
U.S. Official Action dated Feb. 22, 2008 in U.S. Appl. No. 11/445,393.
U.S. Official Action dated Feb. 22, 2010 in U.S. Appl. No. 11/401,470.
U.S. Official Action dated Feb. 24, 2015 in U.S. Appl. No. 11/782,059, 37 pgs.
U.S. Official Action dated Feb. 24, 2015 in U.S. Appl. No. 13/769,598, 33 pgs.
U.S. Official Action dated Feb. 26, 2014 in U.S. Appl. No. 12/954,952, 38 pgs.
U.S. Official Action dated Feb. 27, 2012 in U.S. Appl. No. 12/372,386.
U.S. Official Action dated Feb. 4, 2014 in U.S. Appl. No. 10/607,020, 149 pgs.
U.S. Official Action dated Jan. 12, 2012 in U.S. Appl. No. 11/782,059.
U.S. Official Action dated Jan. 15, 2015 in U.S. Appl. No. 12/028,797, 47 pgs.

(56) References Cited

OTHER PUBLICATIONS

U.S. Official Action dated Jan. 16, 2014 in U.S. Appl. No. 13/102,633, 45 pgs.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Jan. 26, 2012 in U.S. Appl. No. 12/464,584.
U.S. Official Action dated Jan. 29, 2014 in U.S. Appl. No. 12/777,287, 44 pgs.
U.S. Official Action dated Jan. 29, 2016 in U.S. Appl. No. 14/142,132, 149 pgs.
U.S. Official Action dated Jan. 4, 2007 in U.S. Appl. No. 10/607,020.
U.S. Official Action dated Jan. 4, 2016 in U.S. Appl. No. 13/615,668, 28 pgs.
U.S. Official Action dated Jan. 5, 2011 in U.S. Appl. No. 11/823,999.
U.S. Official Action dated Jan. 6, 2009 in U.S. Appl. No. 10/955,941.
U.S. Official Action dated Jan. 6, 2010 in U.S. Appl. No. 10/607,020.
U.S. Official Action dated Jan. 6, 2011 in U.S. Appl. No. 12/142,927.
U.S. Official Action dated Jan. 7, 2010 in U.S. Appl. No. 11/430,562.
U.S. Official Action dated Jan. 8, 2008 cited in U.S. Appl. No. 10/955,928.
U.S. Official Action dated Jan. 9, 2009 in U.S. Appl. No. 11/430,561.
U.S. Official Action dated Jul. 1, 2010 in U.S. Appl. No. 11/782,059.
U.S. Official Action dated Jul. 1, 2014 in U.S. Appl. No. 12/372,386, 93 pgs.
U.S. Official Action dated Jul. 11, 2007 in U.S. Appl. No. 10/955,941.
U.S. Official Action dated Jul. 11, 2007 in U.S. Appl. No. 10/955,942, 18 pgs.
U.S. Official Action dated Jul. 11, 2007 in U.S. Appl. No. 10/955,967.
U.S. Official Action dated Jul. 13, 2007 in U.S. Appl. No. 10/800,056.
U.S. Official Action dated Jul. 17, 2008 cited in U.S. Appl. No. 10/955,940.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2008 cited in U.S. Appl. No. 11/151,686.
U.S. Official Action dated Jul. 24, 2013 in U.S. Appl. No. 12/142,927, 42 pgs.
U.S. Official Action dated Jul. 26, 2006 in U.S. Appl. No. 10/741,407.
U.S. Official Action dated Jul. 30, 2014 in U.S. Appl. No. 13/102,633, 36 pgs.
U.S. Official Action dated Jul. 6, 2010 in U.S. Appl. No. 10/955,967.
U.S. Official Action dated Jul. 8, 2011 in U.S. Appl. No. 11/401,470.
U.S. Official Action dated Jul. 8, 2011 in U.S. Appl. No. 12/163,784.
U.S. Official Action dated Jul. 9, 2008 cited in U.S. Appl. No. 11/136,800.
U.S. Official Action dated Jun. 1, 2009, U.S. Appl. No. 11/445,393.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 12, 2015 in U.S. Appl. No. 13/615,668, 26 pgs.
U.S. Official Action dated Jun. 14, 2007 in U.S. Appl. No. 10/836,154.
U.S. Official Action dated Jun. 17, 2015 in U.S. Appl. No. 13/437,031, 12 pgs.
U.S. Official Action dated Jun. 19, 2008 cited in U.S. Appl. No. 10/851,506.
U.S. Official Action dated Jun. 19, 2009 in U.S. Appl. No. 11/430,562.
U.S. Official Action dated Jun. 19, 2012 in U.S. Appl. No. 12/769,787.
U.S. Official Action dated Jun. 19, 2015 in U.S. Appl. No. 14/150,531, 135 pgs.
U.S. Official Action dated Jun. 2, 2014 in U.S. Appl. No. 13/769,598, 32 pgs.
U.S. Official Action dated Jun. 20, 2008 cited in U.S. Appl. No. 10/955,928.
U.S. Official Action dated Jun. 21, 2007 in U.S. Appl. No. 10/955,928.
U.S. Official Action dated Jun. 22, 2010 in U.S. Appl. No. 11/430,562.
U.S. Official Action dated Jun. 23, 2010 in U.S. Appl. No. 10/955,940.
U.S. Official Action dated Jun. 24, 2009 in U.S. Appl. No. 10/607,020.
U.S. Official Action dated Jun. 24, 2015 in U.S. Appl. No. 13/769,598, 20 pgs.
U.S. Official Action dated Jun. 25, 2010 in U.S. Appl. No. 11/332,822.
U.S. Official Action dated Jun. 27, 2008 cited in U.S. Appl. No. 11/430,416.
U.S. Official Action dated Jun. 3, 2010 in U.S. Appl. No. 12/028,797.
U.S. Official Action dated Jun. 3, 2013 in U.S. Appl. No. 13/102,633, 29 pgs.
U.S. Official Action dated Jun. 30, 2015 in U.S. Appl. No. 11/782,059, 30 pgs.
U.S. Official Action dated Jun. 4, 2007 in U.S. Appl. No. 10/955,940.
U.S. Official Action dated Jun. 6, 2012 in U.S. Appl. No. 12/777,287.
U.S. Official Action dated Jun. 7, 2011 in U.S. Appl. No. 11/332,822.
U.S. Official Action dated Jun. 8, 2009 in U.S. Appl. No. 10/982,073.
U.S. Official Action dated Jun. 9, 2011 in U.S. Appl. No. 12/464,584.
U.S. Official Action dated Mar. 1, 2013 in U.S. Appl. No. 11/430,562, 66 pgs.
U.S. Official Action dated Mar. 14, 2011 in U.S. Appl. No. 12/163,784.
U.S. Official Action dated Mar. 14, 2012 in U.S. Appl. No. 12/142,927.
U.S. Official Action dated Mar. 14, 2013 in U.S. Appl. No. 12/574,256, 73 pgs.
U.S. Official Action dated Mar. 18, 2009 in U.S. Appl. No. 11/401,470.
U.S. Official Action dated Mar. 21, 2016 in U.S. Appl. No. 13/437,031, 41 pgs.
U.S. Official Action dated Mar. 27, 2015 in U.S. Appl. No. 12/142,927, 68 pgs.
U.S. Official Action dated Mar. 3, 2014 in U.S. Appl. No. 11/332,822, 38 pgs.
U.S. Official Action dated Mar. 30, 2010 in U.S. Appl. No. 11/217,071.
U.S. Official Action dated Mar. 4, 2014 in U.S. Appl. No. 12/142,927, 45 pgs.
U.S. Official Action dated May 12, 2011 in U.S. Appl. No. 12/753,923.
U.S. Official Action dated May 14, 2014 in U.S. Appl. No. 13/615,668, 34 pgs.
U.S. Official Action dated May 19, 2011 in U.S. Appl. No. 10/851,506.
U.S. Official Action dated May 19, 2011 in U.S. Appl. No. 11/430,562.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
U.S. Official Action dated May 25, 2010 in U.S. Appl. No. 10/607,020.
U.S. Official Action dated May 28, 2008 cited in U.S. Appl. No. 10/982,073.
U.S. Official Action dated May 30 2014 in U.S. Appl. No. 13/027,289, 188 pgs.
U.S. Official Action dated May 30, 2008 cited in U.S. Appl. No. 11/430,562.
U.S. Official Action dated May 5, 2010 in U.S. Appl. No. 10/851,506.
U.S. Official Action dated May 5, 2011 in U.S. Appl. No. 10/836,154.
U.S. Official Action dated May 8, 2012 in U.S. Appl. No. 12/144,642.
U.S. Official Action dated Nov. 10, 2015 in U.S. Appl. No. 14/150,531, 31 pgs.
U.S. Official Action dated Nov. 13, 2008 in U.S. Appl. No. 11/430,562.
U.S. Official Action dated Nov. 13, 2009 in U.S. Appl. No. 11/154,278.
U.S. Official Action dated Nov. 15, 2013 in U.S. Appl. No. 11/782,059, 33 pgs.
U.S. Official Action dated Nov. 2, 2011 in U.S. Appl. No. 10/836,154.
U.S. Official Action dated Nov. 22, 2010 in U.S. Appl. No. 11/782,059.
U.S. Official Action dated Nov. 23, 2012 in U.S. Appl. No. 11/782,059.
U.S. Official Action dated Nov. 24, 2009 in U.S. Appl. No. 11/445,393.
U.S. Official Action dated Nov. 25, 2008 cited in U.S. Appl. No. 11/154,278.
U.S. Official Action dated Nov. 26, 2010 in U.S. Appl. No. 12/753,923.
U.S. Official Action dated Nov. 28, 2014 in U.S. Appl. No. 13/437,031, 100 pgs.
U.S. Official Action dated Nov. 29, 2013 in U.S. Appl. No. 13/769,598, 73 pgs.
U.S. Official Action dated Nov. 8, 2013 in U.S. Appl. No. 13/615,668, 114 pgs.
U.S. Official Action dated Nov. 9, 2010 in U.S. Appl. No. 10/607,020.
U.S. Official Action dated Oct. 1, 2015 in U.S. Appl. No. 13/427,939, 25 pgs.

(56) References Cited

OTHER PUBLICATIONS

U.S. Official Action dated Oct. 10, 2014 in U.S. Appl. No. 11/332,822, 47 pgs.
U.S. Official Action dated Oct. 24, 2012 in U.S. Appl. No. 13/102,633.
U.S. Official Action dated Oct. 24, 2014 in U.S. Appl. No. 13/615,668, 35 pgs.
U.S. Official Action dated Oct. 25, 2011 in U.S. Appl. No. 12/144,642.
U.S. Official Action dated Oct. 28, 2008 cited in U.S. Appl. No. 11/151,686.
U.S. Official Action dated Oct. 5, 2009 in U.S. Appl. No. 11/332,822.
U.S. Official Action dated Oct. 9, 2007 in U.S. Appl. No. 10/982,073.
U.S. Official Action dated Sep. 10, 2014 in U.S. Appl. No. 12/954,952, 52 pgs.
U.S. Official Action dated Sep. 11, 2012 in U.S. Appl. No. 12/163,784.
U.S. Official Action dated Sep. 11, 2014 in U.S. Appl. No. 13/427,939, 133 pgs.
U.S. Official Action dated Sep. 13, 2011 in U.S. Appl. No. 12/372,386.
U.S. Official Action dated Sep. 13, 2012 in U.S. Appl. No. 13/437,031.
U.S. Official Action dated Sep. 14, 2011 in U.S. Appl. No. 12/163,758.
U.S. Official Action dated Sep. 14, 2015 in U.S. Appl. No. 12/142,927, 31 pgs.
U.S. Official Action dated Sep. 15, 2009 in U.S. Appl. No. 11/217,071.
U.S. Official Action dated Sep. 16, 2010 in U.S. Appl. No. 12/144,642.
U.S. Official Action dated Sep. 18, 2014 in U.S. Appl. No. 11/782,059, 41 pgs.
U.S. Official Action dated Sep. 21, 2010 in U.S. Appl. No. 11/217,071.
U.S. Official Action dated Sep. 23, 2009 in U.S. Appl. No. 11/401,470.
U.S. Official Action dated Sep. 26, 2007 in U.S. Appl. No. 11/151,686.
U.S. Official Action dated Sep. 27, 2010 in U.S. Appl. No. 10/836,154.
U.S. Official Action dated Sep. 30, 2014 in U.S. Appl. No. 13/595,084, 185 pgs.
U.S. Official Action dated Sep. 6, 2007 in U.S. Appl. No. 11/136,800.
U.S. Official Action dated Sep. 6, 2013 in U.S. Appl. No. 12/028,797, 113 pgs.
U.S. Official Action dated Oct. 8, 2008 cited in U.S. Appl. No. 11/445,393.
U.S. Official Action dated Dec. 11, 2008 in U.S. Appl. No. 10/982,073.
U.S. Appl. No. 13/427,939 filed Mar. 23, 2012 entitled "An Improved User Interface for Displaying a Gallery of Formatting Options Applicable to a Selected Object".
U.S. Appl. No. 13/595,084, filed Aug. 27, 2012 entitled "Command User Interface for Displaying Selectable Software Functionality Controls".
U.S. Appl. No. 13/615,668, filed Sep. 14, 2012 entitled "User Interface for Displaying Selectable Software Functionality Controls that are Relevant to a Selected Object".
U.S. Appl. No. 13/769,598, filed Feb. 18, 2013 entitled "Automatic Conversation Techniques".
U.S. Appl. No. 14/635,605, filed Mar. 2, 2015 entitled "Command User Interface for Displaying Selectable Software Functionality Controls".
U.S. Appl. No. 14/981,404, filed Dec. 28, 2015 entitled "Command User Interface for Displaying Selectable Software Functionality Controls".
U.S. Appl. No. 13/437,031, filed Apr. 2, 2012 entitled "Automatic Grouping of Electronic Mail".
U.S. Appl. No. 13/464,572, filed May 4, 2012 entitled "Accessing an Out-Space User Interface for a Document Editor Program".
U.S. Appl. No. 13/925,523, filed Jun. 24, 2013 entitled "Communication Between a Document Editor-in-Space User Interface and a Document Editor Out-Space User Interface", Dukhon et al.
U.S. Appl. No. 14/032,094, filed Sep. 19, 2013 entitled "User Interface for Displaying Selectable Software Functionality Controls that are Relevant to a Selected Object", Satterfield et al.
U.S. Appl. No. 14/142,132, filed Dec. 27, 2013 entitled "Expanded Search and Find User Interface".
U.S. Appl. No. 14/150,531, filed Jan. 8, 2014 entitled "Modifying and Formatting a Chart Using Pictorially Provided Chart Elements".
U.S. Appl. No. 14/226,421, filed Mar. 24, 2014 entitled "Exposing Non-Authoring Features Through Document Status Information in an Out-Space User Interface".
U.S. Appl. No. 14/665,112, filed Mar. 23, 2015 entitled "Hierarchically-Organized Control Galleries".
U.S. Appl. No. 14/816,844, filed Aug. 3, 2015 entitled "Accessing an Out-Space User Interface for a Document Editor Program".
U.S. Appl. No. 14/841,698, filed Aug. 31, 2015 entitled "Accessing an Out-Space User Interface for a Document Editor Program".
U.S. Appl. No. 10/780,547, Office Action dated Jun. 14, 2007, 6 Pages.
U.S. Appl. No. 10/800,056, Advisory Action dated Feb. 14, 2007, 3 pgs.
U.S. Appl. No. 10/955,967, Notice of Allowance dated Apr. 10, 2012, 18 Pages.
U.S. Appl. No. 11/332,822, Amendment and Response filed Aug. 11, 2016, 7 pgs.
U.S. Appl. No. 11/332,822, Notice of Allowance dated Jul. 6, 2016, 9 pgs.
U.S. Appl. No. 11/332,822, Notice of Allowance dated Aug. 26, 2016, 9 pgs.
U.S. Appl. No. 11/332,822, Notice of Allowance dated Sep. 14, 2016, 2 pgs.
U.S. Appl. No. 12/028,797, Notice of Allowance dated Feb. 27, 2015, 14 pgs.
U.S. Appl. No. 12/142,927, Office Action dated Apr. 7, 2016, 21 pgs.
U.S. Appl. No. 12/372,386 Notice of Allowance dated Mar. 10, 2015, 3 Pages.
U.S. Appl. No. 12/372,386, Notice of Allowance dated Mar. 23, 2015, 5 Pages.
U.S. Appl. No. 13/427,939, Office Action dated May 25, 2016, 18 pgs.
U.S. Appl. No. 13/427,939, Office Action dated Sep. 13, 2016, 13 pgs.
U.S. Appl. No. 13/615,668, Office Action dated Sep. 1, 2016, 18 pgs.
U.S. Appl. No. 13/769,598, Notice of Allowance dated Apr. 7, 2016, 4 pgs.
U.S. Appl. No. 13/925,523, Office Action dated Aug. 2, 2016, 7 pgs.
U.S. Appl. No. 14/032,094, Notice of Allowance dated Apr. 18, 2016, 2 pgs.
U.S. Appl. No. 14/032,094, Notice of Allowance dated Jun. 24, 2016, 8 pgs.
U.S. Appl. No. 14/032,094, Notice of Allowance dated Aug. 9, 2016, 2 pgs.
U.S. Appl. No. 14/032,094, Notice of Allowance dated Sep. 30, 2016, 9 pgs.
U.S. Appl. No. 14/142,132, Notice of Allowance dated Aug. 3, 2016, 17 pgs.
U.S. Appl. No. 14/150,531, Office Action dated May 20, 2016, 22 pgs.
U.S. Appl. No. 14/226,421, Notice of Allowance dated Aug. 31, 2016, 7 pgs.
U.S. Appl. No. 14/226,421, Office Action dated May 6, 2016, 18 pgs.
Venolia et al., Gina Danielle, Supporting Email Workflow, revised Dec. 2001; 11 pgs. (cited in OA Jan. 6, 2011).
Walther, Henrik, "Using Search Folders in Outlook 2003", retrieved at: http://www.outlookexchange.com/articles/henrikwalther/using_search_folders_in_outlook_2003.asp, published Jan. 2004, obtained Sep. 28, 2016, 5 pgs.
Whitechapel et al., "Microsoft Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91 b-7f62eaae754a/VSTO2005SE_Tutorial.doc+This+tutorial+focuses+on+the+new+features+introduced+in+VSTO+2005_SE&hl=en&ct=clnk&cd=3&gl=in (added per B. Haslam, Jan. 26, 2011, references cited from U.S. Pat. No. 7,802,199 Sep. 21, 2010 Patent).
Wiley, Microsoft® Office Outlook® 2007 for Dummies®, published Dec. 26, 2006; 9 pgs. (cited in Dec. 31, 2012 OA).

(56) References Cited

OTHER PUBLICATIONS

Word 2002, Chapter 14; Paradigm Publishing Inc., copyright 2002; http://www.emcp.com/tech_tutorials/sig_irc/Signature_Word_Chapter_14.ppt, 21 pp.
Word 2003 Introduction, Retrieved from: <<http://www.photoshoplondon.com/www/training-manuals/Word2003Intro.pdf>>, The Mouse Training Company, Sep. 9, 1999, 166 Pages.
Yang, "Email Categorization Using Fast Machine Learning Algorithms", 2002, 8 pgs. (Search Rpt).
Yaser, "Microsoft Office Word 2003", Retrieved from: <<http://www.just.edu.jo/~yaser/courses/cs98/slides/Microsoft%20Office%20Word%202003.ppt>>, 2003, 49 Pages.
Zweben et al., Scheduling and Rescheduling with Iterative Repair, © 1993; IEEE; 9 pages. (cited in May 7, 2014 NOA).
Zykov, Sergey V., "ConceptModeller: A Problem-Oriented Visual SDK for Globally Distributed Enterprise Systems", Proceedings of the 7th International Workshop on Computer Science and Information Technologies (CSIT'2005), vol. 1, Ufa State Aviation Technical University, USATA Editorial-Publishing Office, Ufa, 2005, pp. 114-117. (added per B. Haslam, references cited from U.S. Pat. No. 7,865,868 Jan. 4, 2011 Patent).
Korean Notice of Allowance Issued in Application 10-2011-7026740, dated Sep. 8, 2016, 2 Pages. (w/o English Translation).
European Notice of Allowance in Application 05107184.3, dated Aug. 31, 2016, 7 pgs.
Taiwan Notice of Allowance in Appln No. 101133155, dated Sep. 4, 2015, 4 pgs.
U.S. Appl. No. 11/332,822, Notice of Allowance dated Nov. 8, 2016, 3 pgs.
U.S. Appl. No. 11/332,822, Notice of Allowance dated Dec. 12, 2016, 2 pgs.
U.S. Appl. No. 14/150,531, Notice of Allowance dated Nov. 29, 2016, 5 pgs.
U.S. Appl. No. 14/226,421, Notice of Allowance dated Nov. 30, 2016, 8 pgs.
U.S. Appl. No. 13/925,523, Notice of Allowance dated Dec. 6, 2016, 5 pgs.
U.S. Appl. No. 12/142,927, Notice of Allowance dated Jan. 9, 2017, 10 pgs.
U.S. Appl. No. 13/437,031, Office Action dated Dec. 27, 2016, 8 pgs.
U.S. Appl. No. 13/615,668, Notice of Allowance dated Jan. 9, 2017, 10 pgs.
U.S. Appl. No. 14/032,094, Notice of Allowance dated Jan. 6, 2017, 9 pgs.
U.S. Appl. No. 12/142,927, Notice of Allowance dated Jan. 30, 2017, 7 pgs.
U.S. Appl. No. 13/427,939, Notice of Allowance dated Jan. 17, 2017, 9 pgs.
Canadian Office Action in Application 2848700, dated Jan. 26, 2017, 4 pgs.
European Summons to Attend Oral Hearing in Application 05105584.6, dated Jul. 22, 2016, 6 pgs.
Indian Office Action in Application 01489/DELNP/2008, dated Aug. 31, 2015, 3 pgs.
Korean Notice of Allowance in Application 10-2016-7034274, dated Jan. 31, 2017, 2 pgs. (no English translation).
Brazilian Office Action Issued in Patent Application No. PI0505014-6, dated Jan. 5, 2017, 6 Pages. (with English translation).
U.S. Appl. No. 12/142,927, Notice of Allowance dated Mar. 3, 2017, 2 pgs.
U.S. Appl. No. 10/607,020, Notice of Allowance dated Feb. 28, 2017, 20 pgs.
U.S. Appl. No. 13/615,668, Notice of Allowance dated Feb. 21, 2017, 2 pgs.
U.S. Appl. No. 14/032,094, Notice of Allowance dated Mar. 16, 2017, 2 pgs.
U.S. Appl. No. 13/427,939, Notice of Allowance dated Feb. 9, 2017, 2 pgs.
U.S. Appl. No. 13/427,939, Notice of Allowance dated Feb. 22, 2017, 3 pgs.
U.S. Appl. No. 14/226,421, Notice of Allowance dated Mar. 13, 2017, 8 pgs.
U.S. Appl. No. 14/150,531, Notice of Allowance dated Feb. 17, 2017, 5 pgs.
European Office Action in Application 06814334.6, dated Jan. 31, 2017, 5 pgs.
European Decision to Refuse and Minutes in Oral Proceeding in Application 05105584.6, dated Mar. 28, 2017, 20 pgs.
U.S. Appl. No. 13/615,668, Notice of Allowance dated Apr. 13, 2017, 2 pgs.
U.S. Appl. No. 14/032,094, Notice of Allowance dated Apr. 13, 2017, 2 pgs.
U.S. Appl. No. 13/427,939, Notice of Allowance dated Apr. 7, 2017, 2 pgs.
Indian Office Action in Application 08037/CHENP/2010, dated Mar. 29, 2017, 7 pgs.
U.S. Appl. No. 14/150,531, Notice of Allowance dated Apr. 19, 2017, 2 pgs.
U.S. Appl. No. 12/142,927, Notice of Allowance dated May 3, 2017, 2 pgs.
U.S. Appl. No. 14/635,605, Ex Parte Quayle Action mailed May 4, 2017, 8 pgs.
Brazilian Office Action Issued in Patent Application No. PI0506116-4, dated Apr. 20, 2017, 5 Pages (with English Summary).
European Summons to Attend Oral Proceedings in Application 09798374.6, dated Jun. 1, 2017, 11 pgs.
U.S. Appl. No. 14/150,531, Notice of Allowance dated May 26, 2017, 2 pgs.
U.S. Appl. No. 13/615,668, Notice of Allowance dated May 26, 2017, 2 pgs.
U.S. Appl. No. 14/032,094, Notice of Allowance dated May 25, 2017, 2 pgs.
U.S. Appl. No. 14/150,531, Notice of Allowance dated Jul. 7, 2017, 2 pgs.
U.S. Appl. No. 14/226,421, Notice of Allowance dated Jul. 6, 2017, 8 pgs.
U.S. Appl. No. 13/437,031, Office Action dated Jun. 15, 2017, 9 pgs.
Brazilian Office Action in Application PI0506081-8, dated Jun. 21, 2017, 7 pages.
Notice of Allowance Issued in U.S. Appl. No. No. 11/430,562, dated Sep. 5, 2013, 25 Pages.
U.S. Appl. No. 14/635,605, Response to Ex Parte Quayle Action filed Aug. 4, 2017, 3 pgs.
U.S. Appl. No. 14/635,605, Notice of Allowance dated Aug. 25, 2017, 9 pgs.
Chinese Notice of Allowance Issued in Chinese Patent Application No. 200680033212.3, dated May 26, 2011, 4 Pages.
European Office Action Issued in European Patent Application No. 06803424.8, dated Mar. 20, 2017, 2 Pages.
Notice of Allowance Issued in Japanese Patent Application No. 2008-531249, dated Aug. 24, 2012, 6 Pages.
U.S. Appl. No. 14/635,605, Notice of Allowance dated Sep. 12, 2017, 2 pgs.
U.S. Appl. No. 14/665,112, Notice of Allowance dated Sep. 8, 2017, 16 pgs.
Thailand Office Action in Application 0501003163, dated Aug. 22, 2017, 3 pgs.
Thailand Office Action in Application 0501003164, dated Aug. 22, 2017, 3 pgs.
European Summons to Attend Oral Proceedings in Application 05107157.9, dated Sep. 15, 2017, 7 pgs.
Notice of Allowance in U.S. Appl. No. 10/955,942, dated Oct. 14, 2011, 7 pgs.
Notice of Allowance in U.S. Appl. No. 10/955,942, dated Jun. 23, 2011, 17 pgs.
Notice of Allowance in U.S. Appl. No. 10/955,942, dated Mar. 15, 2011, 8 pgs.
Notice of Allowance in U.S. Appl. No. 10/955,942, dated Jan. 11, 2011, 10 pgs.
Notice of Allowance in U.S. Appl. No. 10/955,942, dated Dec. 3, 2010, 13 pgs.

(56) References Cited

OTHER PUBLICATIONS

Notice of Allowance in Australian Patent Application 2005203412, dated May 19, 2010, 3 pages.
Notice of Allowance Issued in Chinese Patent Application No. 200510092139.4, dated Oct. 16, 2009, 4 Pages.
Notice of Allowance Issued in Russian Patent Application No. 2005125836, dated Jun. 22, 2010, 21 Pages.
Notice of Allowance and Search Report Issued in Taiwan Patent Application No. 94123421, dated Mar. 29, 2012, 6 Pages.
Notice of Allowance Issued in Malaysian Patent Application No. PI20053259, dated Oct. 15, 2012, 2 Pages.
"Non Final Office Action Issued in U.S. Appl. No. 15/631,842", dated May 30, 2019, 14 Pages.
"Non Final Office Action Issued in U.S. Appl. No. 15/796,216", dated Jun. 11, 2019, 25 Pages.
"Office Action Issued in Brazilian Patent Application No. PI0914960-0", dated May 27, 2019, 5 Pages.
"Non Final Office Action Issued in U.S. Appl. No. 15/483,901", dated Jul. 10, 2019, 14 Pages.
"Getting Results with Microsoft Office 97", Published by Microsoft, 1997, 8 Pages.
"Office Action Issued in Brazilian Patent Application No. PI0913024-1", dated Jul. 7, 2019, 5 Pages.
"Office Action Issued in Brazilian Patent Application No. PI0914946-5", dated Jun. 13, 2019, 5 Pages.
"Notice of Allowance Issued in U.S. Appl. No. 15/476,220", dated Aug. 15, 2019, 10 Pages.
"Office Action Issued in Brazilian Patent Application No. PI10133348", dated Aug. 24, 2019, 5 Pages.
"Office Action Issued in Brazilian Patent Application No. PI10072640", dated Sep. 1, 2019, 5 Pages.
"Office Action Issued in Brazilian Patent Application No. PI0914960-0", dated Aug. 30, 2019, 6 Pages.
"Second Office Action Issued in Brazilian Patent Application No. PI0913024-1", dated Sep. 25, 2019, 4 Pages.
"Description of Digital Signatures and Code Signing in Word 2002 and in Later Versions of Word", Retrieved from: http://web.archive.org/web/20190907090343/https://support.microsoft.com/en-us/help/920627/description-of-digital-signatures-and-code-signing-in-word-2002-and-in, Sep. 7, 2019, 7 Pages.
"Summons to Attend Oral Proceedings in European Patent Application No. 09770706.1", dated Nov. 29, 2019, 7 Pages.
"Office Action Issued in Brazil Patent Application No. PI0913024-1", dated Nov. 21, 2019, 5 Pages.
"Office Action Issued in Brazilian Patent Application No. PI0914946-5", dated Oct. 30, 2019, 4 Pages.
"Non Final Office Action Issued in U.S. Appl. No. 16/545,836", dated Apr. 29, 2020, 19 Pages.
"Non Final Office Action Issued in U.S. Appl. No. 16/289,093", dated May 1, 2020, 17 Pages.
"Examiner's Decision of Final Refusal Issued in Indian Patent Application No. 01489/DELNP/2008", dated Jan. 30, 2020, 7 Pages.
"Office Action Issued in Brazilian Patent Application No. PI0712171-7", dated Jul. 22, 2020, 5 Pages.
"Non Final Office Action Issued in U.S. Appl. No. 16/825,044", dated Oct. 5, 2020, 21 Pages.
"Final Office Action Issued in U.S. Appl. No. 16/545,836", dated Dec. 8, 2020, 22 Pages.
"Notice of Allowance Issued in U.S. Appl. No. 16/825,044", dated Jan. 22, 2021, 9 Pages.
"Notice of Allowance Issued in U.S. Appl. No. 16/545,836", dated Feb. 23, 2021, 9 Pages.

* cited by examiner

SYNCHRONIZED CONVERSATION-CENTRIC MESSAGE LIST AND MESSAGE READING PANE

RELATED APPLICATIONS

This application is a continuation of and claims priority to co-pending application Ser. No. 12/142,927, now U.S. Pat. No. 9,665,850, filed Jun. 20, 2008, entitled SYNCHRONIZED CONVERSATION-CENTRIC MESSAGE LIST AND MESSAGE READING PANE, the disclosure of which is hereby incorporated by reference in its entirety.

BACKGROUND

Some modern applications for reading electronic mail (e-mail) messages are able to group messages into logical conversations. Such conversations are established by grouping together all messages that are replies to one another or to a common root message. The displaying of messages in conversation groupings is supported by various e-mail reading applications such as the OUTLOOK e-mail client from MICROSOFT CORPORATION; the OUTLOOK WEB ACCESS (OWA) e-mail application from MICROSOFT CORPORATION; the ZIMBRA e-mail client from ZIMBRA, INCORPORATED; and the GMAIL e-mail client from GOOGLE, INCORPORATED.

In previous implementations, there generally are two distinct models for conversation based e-mail reading. Some e-mail reading applications provide a list of messages grouped by conversations. A user can select an item from the list to see the contents, or body, of that single selected message in another window or pane of the user interface. Other e-mail reading applications provide a list of conversations, as groups of messages, from which users can choose to view the message contents of all of the messages within a given conversation at once.

The first of the traditional two models for e-mail reading applications generally provides a view of the all conversation messages in a concise list. The second of the traditional two models for e-mail reading applications generally provides all of a conversation's message contents in a single view. However, the display and synchronization of both a message list and a message content view with respect to message conversations is not traditionally supported.

It is with respect to these considerations and others that the disclosure made herein is presented.

SUMMARY

Technologies are described herein for a user interface uniting two primary components, a list view and a reading pane, both within an e-mail reading application. Technologies related to the synchronization functionality between the two primary user interface components are also described. In particular, a user interface for reading email can represent a conversation with both a list view for presenting a message map and a reading pane for presenting a content view, all within a single user interface display.

According to one aspect presented herein, a first primary user interface component for an e-mail reading application can be a list view. The list view can present a list of messages grouped by conversation. Each grouping can have a header section that shows aggregate information about the messages in the conversation. The conversation can be selected and expanded in the list to show all of the component messages of the conversation. The items can be selected using a mouse, keyboard, or other user input mechanisms. The list view can provide the user a map of a conversation. The map can indicate a reply structure of the messages, a time ordering in which the messages were received, or both.

According to another aspect presented herein, a second primary user interface component for an e-mail reading application can be a reading pane. The reading pane window can contain smaller windows or frames. Each of the smaller windows or frames can contain a message within a given conversation. These frames may be called message parts and can be expanded or collapsed to show more or less of the messages contents or details. The frames within the reading pane can be selected and acted upon in a similar fashion as those in the list view.

According to yet another aspect presented herein, synchronization can be provided between the list view and a reading pane. By synchronizing actions in the list view and the reading pane, the contents can be cross referenced and navigated. For example, a message can be selected with an appropriate user input device, such as through a mouse click, in the list view resulting in that message also being selected and displayed in the reading pane. Similarly, a message can be selected in the reading pane causing that message to become highlighted in the list view indicating its position in the reply structure of the conversation. Message selection in one message UI component can also inspire the other primary message UI component to scroll the corresponding item into view. Thus, the two components can maintain a view on the same selected message items.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
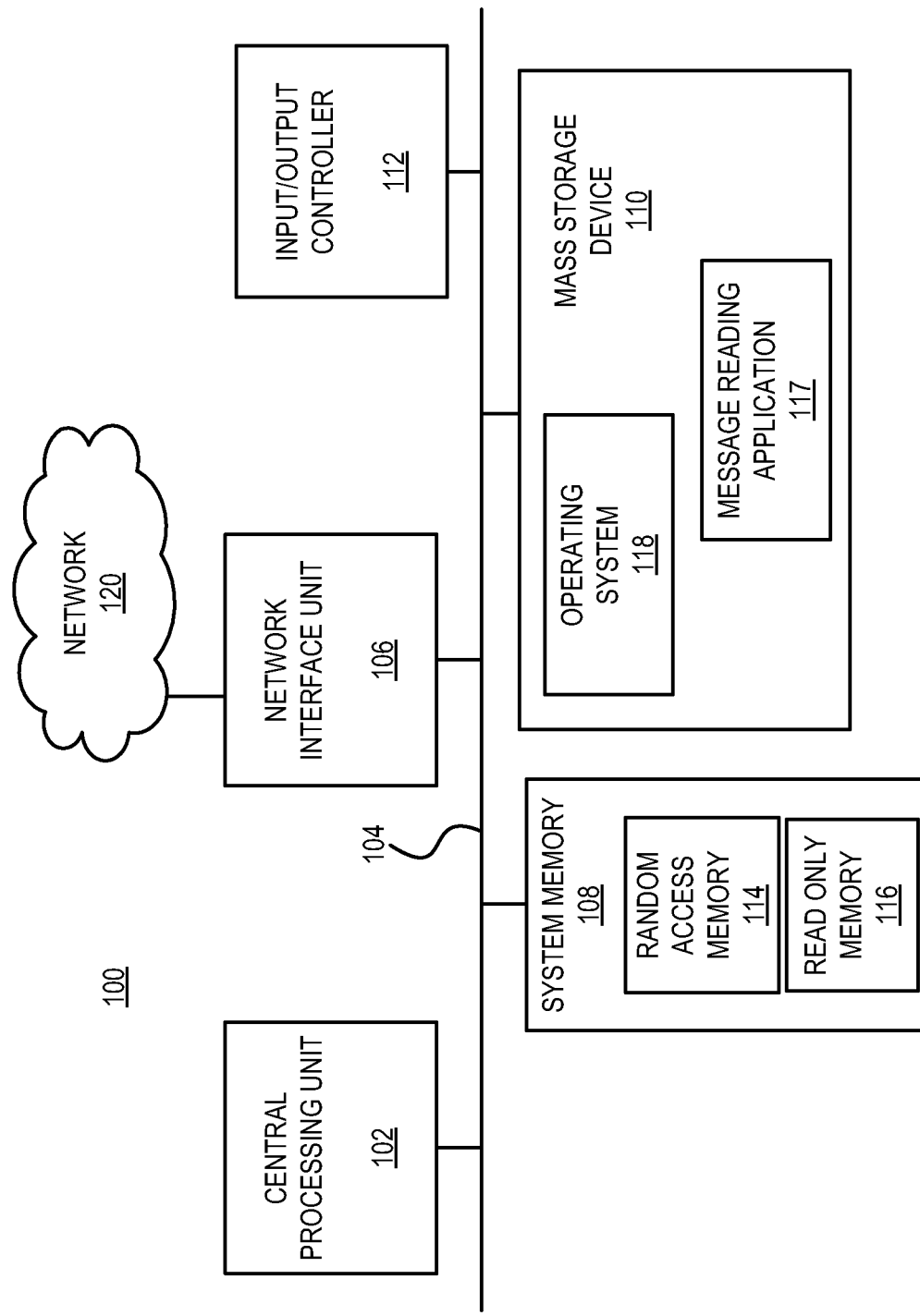
FIG. 1 is a computer architecture diagram showing an illustrative computer hardware and software architecture for a computing system capable of implementing aspects of an embodiment presented herein.

The following detailed description is directed to technologies for displaying and synchronizing a unified list view and reading pane within the user interface of a message reading application. Through the use of the technologies and concepts presented herein, both a list view for presenting a message map and a reading pane for presenting a content view can be unified within a single user interface display. Synchronization between the two views can also be provided.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for displaying and synchronizing a unified list view and a reading pane for organizing, previewing, navigating, and reading electronic messages will be described.

Turning now to FIG. 1, an illustrative computer architecture 100 can execute software components described herein for displaying and synchronizing a unified list view and a reading pane within the user interface of a message reading application. The computer architecture shown in FIG. 1 illustrates a conventional desktop, laptop, or server computer and may be utilized to execute any aspects of the software components presented herein. It should be appreciated however, the described software components can also be executed on other example computing environments, such as mobile devices, television, set-top boxes, kiosks, vehicular information systems, mobile telephones, embedded systems, or otherwise.

The computer architecture shown in FIG. 1 includes a central processing unit 102 (CPU), a system memory 108, including a random access memory 114 (RAM) and a read-only memory 116 (ROM), and a system bus 104 that can couple the system memory 108 to the CPU 102. A basic input/output system containing the basic routines that help to transfer information between elements within the computer 100, such as during startup, can be stored in the ROM 116. The computer 100 may further include a mass storage device 110 for storing an operating system 118, application programs, and other program modules, such as a message reading application 117 which can execute the software components described in greater detail herein.

The mass storage device 110 can be connected to the CPU 102 through a mass storage controller (not shown) connected to the bus 104. The mass storage device 110 and its associated computer-readable media can provide non-volatile storage for the computer 100. Although the description of computer-readable media contained herein refers to a mass storage device, such as a hard disk or CD-ROM drive, it should be appreciated by those skilled in the art that computer-readable media can be any available computer storage media that can be accessed by the computer 100.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network such as the network 120. The computer 100 may connect to the network 120 through a network interface unit 106 connected to the bus 104. It should be appreciated that the network interface unit 106 may also be utilized to connect to other types of networks and remote computer systems. The computer 100 may also include an input/output controller 112 for receiving and processing input from a number of other devices, including a keyboard, mouse, or electronic stylus (not illustrated). Similarly, an input/output controller may provide output to a display screen, a printer, or other type of output device (also not illustrated).

As mentioned briefly above, a number of program modules and data files may be stored in the mass storage device 110 and RAM 114 of the computer 100, including an operating system 118 suitable for controlling the operation of a networked desktop, laptop, server computer, or other computing environment. The mass storage device 110, ROM 116, and RAM 114 may also store one or more program modules. In particular, the mass storage device 110, the ROM 116, and the RAM 114 may store a message reading application 117 for execution by the CPU 102. The e-mail message reading application 117 can include software components for implementing the processes discussed in detail with respect to FIGS. 3-5. The mass storage device 110, the ROM 116, and the RAM 114 may also store other types of program modules.

Figure 2:
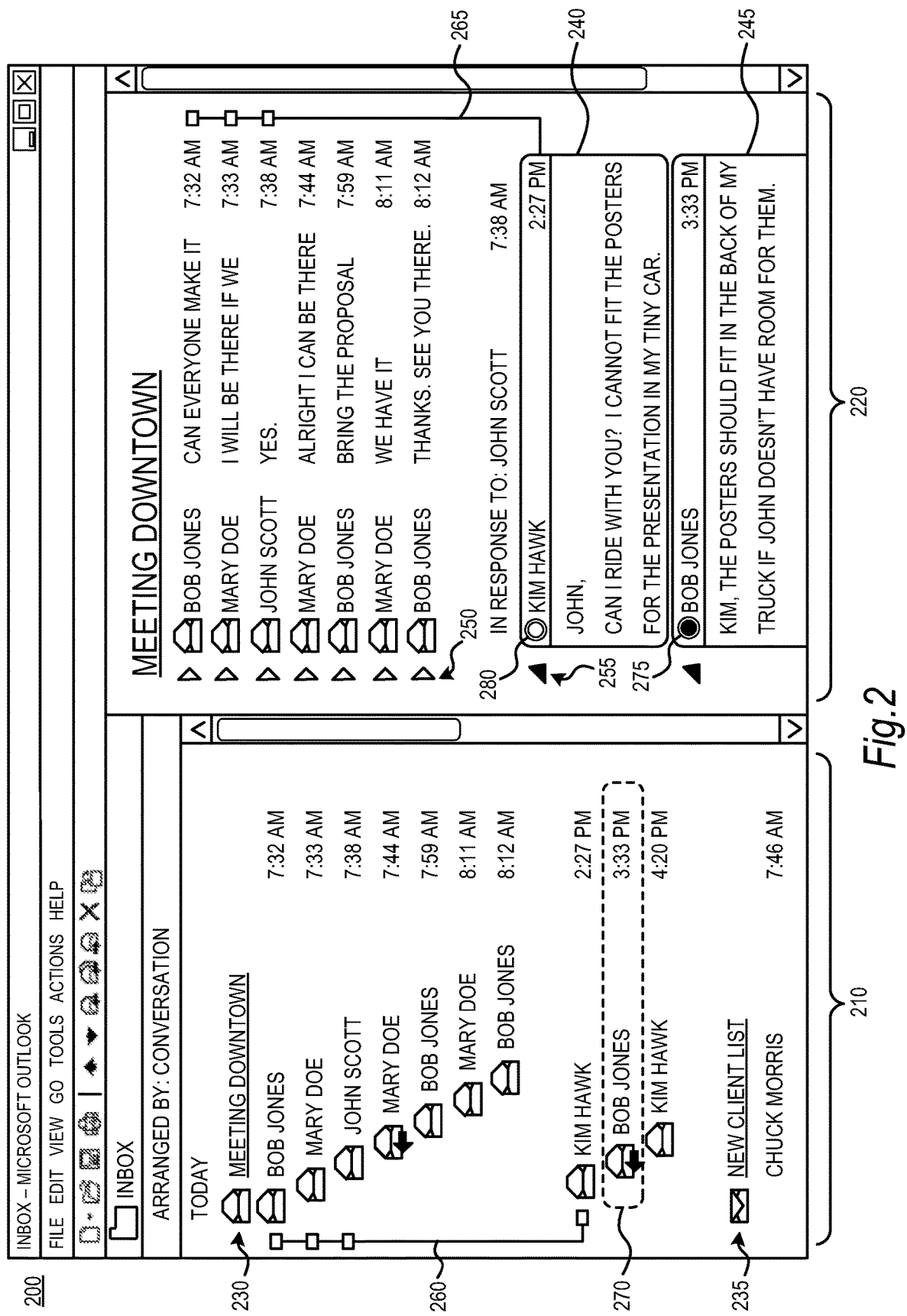
FIG. 2 is a user interface diagram illustrating a list view and a reading pane content view integrated into one display for reading electronic messages according to aspects of an embodiment presented herein.

Turning now to FIG. 2, details will be provided regarding displaying and synchronizing a list view and a reading pane within a unified user interface of an e-mail message reading application. In particular, a user interface display 200 illustrates a list view 210 and a reading pane 220 content view integrated into one display for message reading.

An inbox folder is illustrated where e-mail messages (messages) are listed by conversation in a list view 210. The list view 210 of messages can serve as a visual map of the messages based upon the reply structure of the messages within each conversation. That is, a message can be displayed as below and indented from a message to which it was a reply. Since a reply was generally sent after the original message, such a structure also supports displaying the messages in time order. When specified by a user, the list view 210 can also be displayed in reverse time ordering within each conversation. Messages within a conversation, as shown in the list view 210, may be stored in multiple folders. For example, some messages of a conversation may be from a sent messages folder or a favorites folder. Even though a conversation may be shown in association with a specific folder, some messages of the conversation may be from other folders.

Within the list view 210, an expanded conversation 230 can be displayed with all of the messages within the conversation broken out explicitly in a time ordering or reply structure. A collapsed conversation 235 may show less information about the conversation to provide rapid access to concise information. For example, the collapsed conversation 235 may show the subject line of the conversation, the authors of messages within the conversation, and timestamps associated with messages within the conversation.

A broken out message within a conversation in a list view 210 can occur where a reply, or forwarded, message branches off to form a sub-thread within a conversation topic. A list view pipe 260 within the list view 210 can show the connection between a broken out message and the parent message that it was based upon, for example as a reply to. The list view pipe 260 can also have multiple indicators, such as the blocks along the list view pipe 260 as illustrated in FIG. 2. Such indicators can display the relationship of the entire chain of messages preceding the broken out message. For example, which messages in a larger conversation are part of a specific thread or reply chain.

Details and contents of messages can be displayed in a content view within a reading pane 220. The reading pane 220 can contain smaller windows or frames 240, 245. Each of the frames 240, 245 can contain a message within a given conversation. The frames 240, 245 can be expanded or collapsed to show more or less of the message contents or details. The collapsed frames can be displayed as a list of message, such as those in the top portion of the reading pane 220 illustrated in FIG. 2. A collapsed frame expander 250 user interface control may be provided for each collapsed frame where operating the collapsed frame expander 250 can expand the frame 240, 245. Once the associated frame is expanded, the frame expander can be displayed as an expanded frame expander 255 user interface control. An expanded frame expander 255 can be used to collapse the expanded frame 240, 245 back into the list of message within the reading pane 220.

A content view pipe 265 can be used to associate an expanded frame 240 with the parent message that it was based upon, for example, by being a reply to the parent message. The content view pipe 265 can also have multiple indicators, such as the blocks along the content view pipe 265 as illustrated in FIG. 2. Such indicators can display the relationship of the entire chain of messages preceding the message within the expanded frame 240.

Actions on the list view 210 or the reading pane 220 can be synchronized between one another. This can allow a user to cross reference or navigate the contents of the two views. For example, the user can click on a message in the list view 210 to indicate the message as a selected message 270 within list view 210. Synchronization can then cause the corresponding message within the reading pane 220 to be displayed as a selected message 245 within the reading pane 220. The selected message 245 can also thus be opened for reading within the reading pane 220. Similarly, a user can select a message from within the reading pane 220 and that message can be automatically shown as the selected message 270 within the list view 210. This can quickly indicate the position within the reply structure of the message being viewed in the reading pane 220. In other words, the synchronization between the list view 210 and the reading pane 220 can be bidirectional.

Item selection can also inspire the list view 210 and the reading pane 220 to scroll and place the appropriate item into view based on a selection within the other user interface component. For example, the selection of a message within the list view 210 can scroll the reading pane 220 such that the selected item is also viewable within the reading pane 220.

The selected message 245 within the reading pane 220 can be indicated as selected by various user interface techniques. One example for displaying a frame as selected within the reading pane 220 can use a highlighted select button 275 within the selected message frame 245. In contrast, a non-highlighted select button 280 can indicate that an expanded message frame 240 is not selected. Other techniques of displaying a message frame as selected can include coloring, highlighting, shading, shadowing, checkbox indication, bolding, blinking, modifying opacity, offsetting, or any other mechanism for indicating a message as being selected.

Synchronization can effectively combine the list view 210 and the reading pane 220 into a unified user interface. Synchronizing the actions between the two controls can provide the list view 210 as a map and navigation tool while also providing the reading pane 220 as a content viewer. The content viewer can display more or less details of each message within a conversation as specified by the user. While synchronization of selection is used as an example of synchronization, message status, deletion, movement, addition, or any other message action, or parameter, can also be synchronized between the list view 210 and the reading pane 220.

Figure 3:
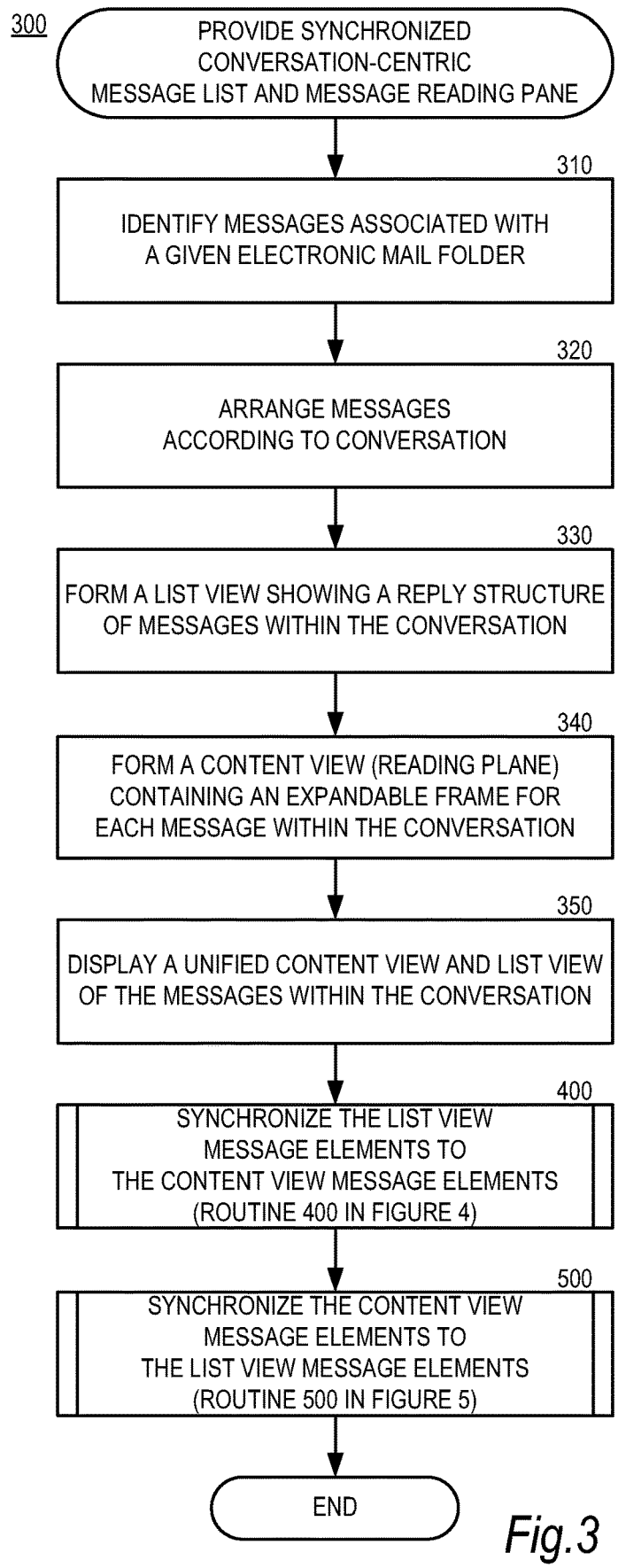
FIG. 3 is a logical flow diagram illustrating aspects of a process for presenting and synchronizing a conversation-centric message list and a message reading pane according to aspects of an embodiment presented herein.

Referring now to FIG. 3, additional details will be provided regarding the embodiments presented herein for displaying and synchronizing a unified list view and reading pane within the user interface of a message reading application. In particular, FIG. 3 is a flow diagram illustrating aspects of a process 300 for providing a synchronized conversation-centric message list and message reading pane.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The routine 300 begins at operation 310, where messages within a given collection or group are identified. The collection of messages or group of messages may be those associated with a specific user. At operation 320, the identified messages can be arranged according to conversations. A conversation can include all messages that are replies to one another or to a common root message.

At operation 330, a list view 210 can be formed showing the reply structure of all messages within each conversation.

The conversations, and the messages within each conversation, can be those determined in operation 320. At operation 340, a reading pane 220 can be formed to provide a content view. The reading pane 340 can contain a message frame 240, 245 for each message by conversation. Each message frame 240, 245 can be expanded to display detailed message content. Alternatively, each message frame 240, 245 can be collapsed to provide a concise message list within the reading pane 220.

At operation 350, a unified user interface can be displayed. The unified display can unite two primary user interface components, a list view 210 as formed in operation 330 and a reading pane 220 as formed in operation 340.

Routines 400 and 500 relate to synchronization between the list view 210 and the reading pane 220. In routine 400, list view 210 message elements can be synchronized to the message elements in the reading pane 220 as discussed in additional detail with respect to FIG. 4. In routine 500, message elements in the reading pane 220 can be synchronized to the list view 210 message elements as discussed in additional detail with respect to FIG. 5. Such synchronization can relate to indications of a message item, or items, being selected. Synchronization can also relate to the display, deletion, addition, modification, or reclassification of one or more message elements. Synchronizing between user interface views can provide simplified, powerful message navigation since the view that is most meaningful for a given navigation task can be used with the results propagating to the other synchronized view. For example, a message may be selected out of the map provided by a list view 210 resulting in the display of that message within a reading pane 220 of the unified display. The routine 300 can terminate after returning from routine 500.

Figure 4:
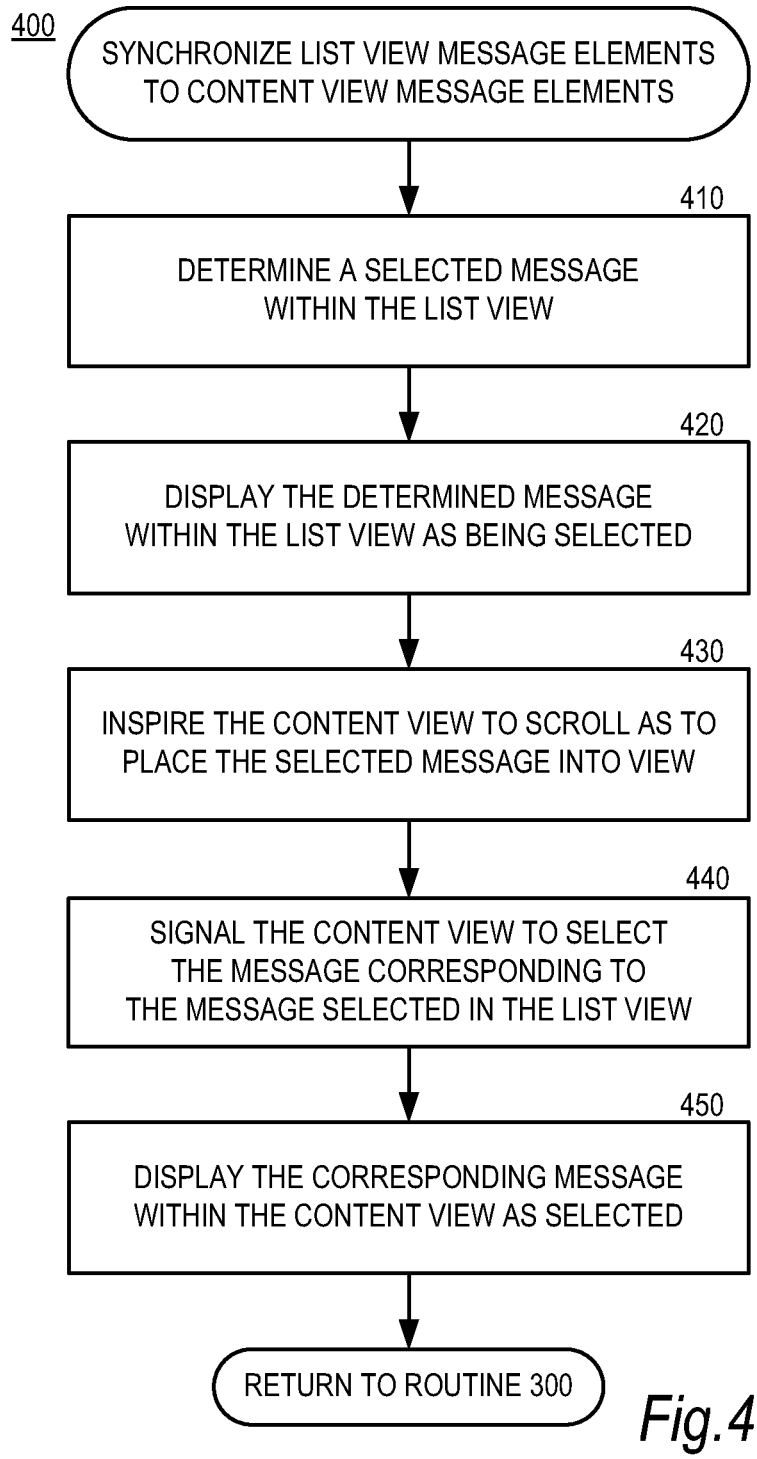
FIG. 4 is a logical flow diagram illustrating aspects of a process for synchronizing list view message elements to content view message elements according to aspects of an embodiment presented herein.

Referring now to FIG. 4, additional details will be provided regarding the embodiments presented herein for displaying and synchronizing a unified list view and reading pane within the user interface of a message reading application. In particular, FIG. 4 is a flow diagram illustrating aspects of a process 400 for synchronizing list view message elements to content view message elements. The routine 400 begins at operation 410, where a selected message 270 within a list view 210 is determined. The selected message 270 may have been selected by a user. For example, a user may have clicked on the message with a mouse pointer, or some other input device.

At operation 420, the selected message 270 that was determined in operation 410 can be displayed as selected within the list view 210 of the user interface display. Selection may be displayed by highlighting, blinking, shading, coloring, bolding, or inversing the selected message 270 within the list view 210 display. Any other mechanism for indicating selection may also be used according to embodiments.

At operation 430, the content view provided by the reading pane 220 can be signaled, or inspired, to scroll. The scrolling can operate so as to make visible the message within the reading pane 220 that corresponds to the selected message 270 within the list view 210. At operation 440, the content view provided by the reading pane 220 user interface component can be signaled to select the message within the reading pane 220 that corresponds to the selected message 270 within the list view 210. Accordingly, in operation 450, the selected message 245 within the reading pane 220 content view can be displayed as the currently selected message. Selection may be indicated by highlighting, or coloring the message select button 275 within the message frame of the reading pane 220 content view. Selection may be also be displayed by highlighting, blinking, shading, coloring, bolding, or inversing part, or all of, the selected message 245 within the reading pane 220 display. Any other mechanism for indicating selection may also be used according to embodiments.

Such synchronization can provide for the same message, or messages, being both visible and selected at the same time in both the list view 210 and the reading pane 220. While selection has been discussed as an example of message synchronization between the list view 210, and the reading pane 220, other message parameters may also be the subject of the synchronization. For example, deletion, modification, addition, movement, or other message actions, status, or properties may be synchronized between the list view 210 and the reading pane 220 according to the methods discussed herein. The routine 400 can return to routine 300 after operation 450.

Figure 5:
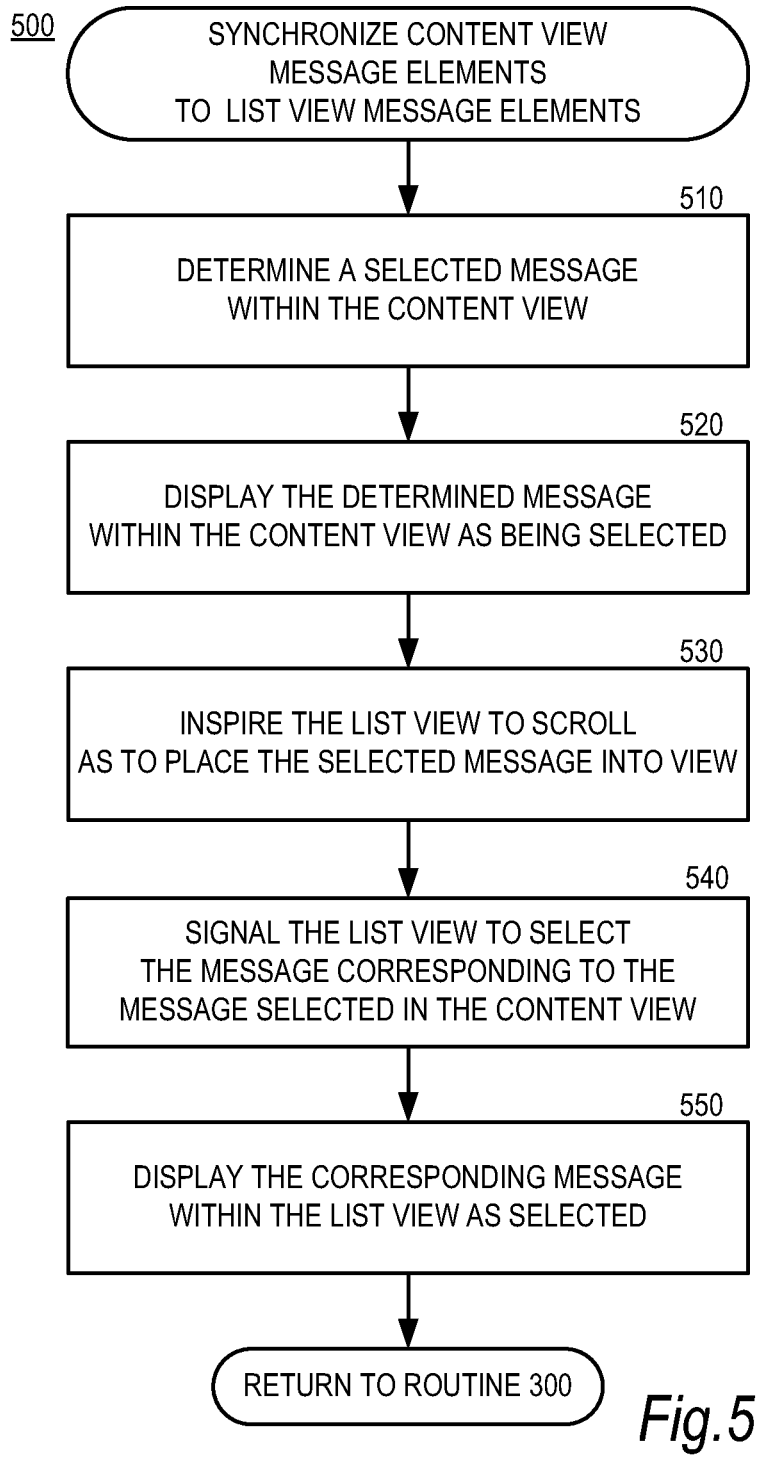
FIG. 5 is a logical flow diagram illustrating aspects of a process for synchronizing content view message elements to list view message elements according to aspects of an embodiment presented herein.

Referring now to FIG. 5, additional details will be provided regarding the embodiments presented herein for displaying and synchronizing a unified list view and reading pane within the user interface of a message reading application. In particular, FIG. 5 is a flow diagram illustrating aspects of a process 500 for synchronizing content view message elements to list view message elements. The routine 500 begins at operation 510, where a selected message 245 within a reading pane 220 content view is determined. The selected message 245 may have been selected by a user. For example, a user may have clicked on the message with a mouse pointer, or some other input device.

At operation 520, the selected message 245 that was determined in operation 510 can be displayed as selected within the reading pane 220 of the user interface display. Selection may be displayed by highlighting, blinking, shading, coloring, bolding, inversing, or using a highlighted selected button 275 within the frame of the selected message 245. Any other mechanism for indicating selection may also be used according to embodiments.

At operation 530, the list view 210 can be signaled, or inspired, to scroll. The scrolling can operate so as to make visible the message within the list view 210 that corresponds to the selected message 245 within the reading pane 220. At operation 540, the list view 210 user interface component can be signaled to select the message within the list view 210 that corresponds to the selected message 245 within the reading pane 220. Accordingly, in operation 550, the selected message 270 within the list view 210 can be displayed as the currently selected message. Such synchronization can provide for the same message, or messages, being both visible and selected at the same time in both the list view 210 and the reading pane 220. The routine 500 can return to routine 300 after operation 550.

Based on the foregoing, it should be appreciated that technologies for displaying and synchronizing a unified list view and a reading pane within the user interface of a message reading application are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing a unified conversation-centric message list and message reading pane, the method comprising:
    providing a list view of a plurality of messages organized chronologically by conversation;
    providing a content view of the plurality of messages organized chronologically by conversation;
    wherein the list view and the content view are integrated side by side in one display;
    indicating a first message within the list view as selected; and
    in response to indicating the first message within the list view as selected, bi-directionally synchronizing between the list view and the content view, wherein the bi-directionally synchronizing comprises:
        opening for reading a second message corresponding to the selected first message within the content view, wherein a read/unread status of the second message is updated when a read/unread status of the first message is updated of the display.

2. The method of claim 1, wherein the list view indicates a reply structure of each conversation.

3. The method of claim 1, wherein the content view comprises a reading pane with a message frame for each selected message.

4. The method of claim 1, wherein bi-directionally synchronizing further comprises scrolling the reading pane to display a message in response to a corresponding message within the list view being selected.

5. The method of claim 1, further comprising indicating a message within the list view as selected in response to a corresponding message within the content view being selected.

6. A computer storage device not including signal having computer executable instructions stored thereon which, when executed by a computer, cause the computer to:
    provide a list view of a plurality of messages organized chronologically by conversation;
    provide a content view of the plurality of messages organized chronologically by conversation;
    wherein the list view and the content view are integrated side by side in one display;
    indicating a first message within the list view as selected; and
    in response to indicating the first message within the list view as selected, bi-directionally synchronizing between the list view and the content view, wherein the bi-directionally synchronizing comprises:
        opening for reading a second message corresponding to the selected first message within the content view of the display, wherein a readlunread status of the second message is updated when a read/unread status of the first message is updated.

7. The computer storage device of claim 6, wherein the list view indicates a reply structure of each conversation.

8. The computer storage device of claim 6, wherein the content view comprises a reading pane with a message frame for each selected message.

9. The computer storage device of claim 6, wherein bi-directional synchronization further comprises updating a read/unread status of a message in the content view in response to a read/unread status being updated in association with a corresponding message within the list view.

10. The computer storage device of claim 6, further causing the computer to:
    present a unified user interface simultaneously displaying the list view and the content view; and
    maintain bi-directional synchronization between the list view and the content view, wherein the bi-directional synchronization is maintained by indicating the message within the list view as selected in response to the corresponding message within the content view being selected.

11. The computer storage device of claim 6, further causing the computer to display a list view pipe within the list view, the list view pipe showing a reply-to connection between at least a display of a broken out message and a display of a parent message in the conversation, the list view pipe comprising a plurality of indicators which display a relationship between an entire chain of displayed messages.

12. An electronic message reading system comprising:
    a processor; and
    a message reading application comprising one or more modules operable to cause the processor to;
    provide a list view of a plurality of messages organized chronologically by conversation
    provide a content view of the plurality of messages organized chronologically by conversation, wherein the list view and the content view are integrated side by side in a one display, and to maintain bi directional synchronization between the list view and the
    content view, wherein the bi directional synchronization is maintained by
    indicating a first message within the list view as selected; and in response to indicating the first message within the list view as selected, bidirectionally synchronizing between the list view and the content view, wherein the bidirectionally synchronizing comprises:
    opening for reading a second message corresponding to the selected first message within the content view of the display, wherein a read/unread status of the second message is updated when a read/unread status of the first message is updated.

13. The system of claim 12, wherein the one or more modules are further operable to cause the processor to indicate a message within the list view as selected in response to a corresponding message within the content view being selected.

14. The system of claim 12, wherein bi-directional synchronization further comprises scrolling the content view to display a message in response to a corresponding message within the list view being selected.

15. The system of claim 12, wherein the list view indicates a reply structure of each conversation.

16. The system of claim 12, wherein the content view comprises a reading pane with a message frame for each selected message.

17. The system of claim 12, wherein the one or more modules are further operable to cause the processor to display a list view pipe within the list view, the list view pipe showing a reply to connection between at least a display of a broken out message and a display of a parent message in the conversation, the list view pipe comprising a plurality of indicators which display a relationship between an entire chain of displayed messages.

18. The system of claim 16, wherein the message frame for each selected message is expandable to display detailed message content.

19. The system of claim 12, wherein the plurality of messages are stored in a plurality of folders.

20. The system of claim 12, wherein the list view and the content view are displayed concurrently using a user interface of the electronic message reading system.

* * * * *